(12) United States Patent
DeFoy et al.

(10) Patent No.: US 12,232,194 B2
(45) Date of Patent: Feb. 18, 2025

(54) METHODS AND WIRELESS TRANSMIT/RECEIVE UNITS FOR SUPPORTING VIRTUAL MACHINE MIGRATION

(71) Applicant: INTERDIGITAL PATENT HOLDINGS, INC., Wilmington, DE (US)

(72) Inventors: Xavier DeFoy, Kirkland (CA); Ulises Olvera-Hernandez, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 259 days.

(21) Appl. No.: 17/421,993

(22) PCT Filed: Jan. 14, 2020

(86) PCT No.: PCT/US2020/013527
§ 371 (c)(1),
(2) Date: Jul. 9, 2021

(87) PCT Pub. No.: WO2020/150250
PCT Pub. Date: Jul. 23, 2020

(65) Prior Publication Data
US 2022/0117015 A1    Apr. 14, 2022

Related U.S. Application Data

(60) Provisional application No. 62/822,433, filed on Mar. 22, 2019, provisional application No. 62/792,267, filed on Jan. 14, 2019.

(51) Int. Cl.
*H04W 76/11*    (2018.01)
*H04W 8/26*    (2009.01)

(52) U.S. Cl.
CPC .............. *H04W 76/11* (2018.02); *H04W 8/26* (2013.01)

(58) Field of Classification Search
CPC . H04W 76/11; H04W 8/26; G06F 2009/4557; G06F 9/4555
See application file for complete search history.

(56) References Cited

U.S. PATENT DOCUMENTS

| 9,582,272 B1 | 2/2017 | Doucette et al. |
| 2010/0250744 A1* | 9/2010 | Hadad ................... G06F 9/4856 703/13 |

(Continued)

FOREIGN PATENT DOCUMENTS

| WO | 2017211431 A1 | 12/2017 |
| WO | 2021/062256 | 4/2021 |

OTHER PUBLICATIONS

Li et al. Split Network Virtualization Edge (Split-NVE) Control-Plane Requirements. (Year: 2018).*

(Continued)

*Primary Examiner* — Bryan Y Lee
(74) *Attorney, Agent, or Firm* — Volpe Koenig

(57) ABSTRACT

A method of supporting VM migration between a first WTRU and a second WTRU via a 5GLAN is disclosed. The first WTRU is a host of a VM and the second WTRU connects to the 5GLAN. The method comprises that the second WTRU receives the VM migrated from the first WTRU, wherein a tenant system interface (TSI) ID is associated with the VM; sends a PDU session request message to a session management function (SMF) of the 5GLAN, the PDU session request message comprising the TSI ID; and sends a PDU session response message from the SMF so as to establish a PDU session between the second WTRU and the 5GLAN.

9 Claims, 34 Drawing Sheets

(56) References Cited

U.S. PATENT DOCUMENTS

| | | | |
|---|---|---|---|
| 2015/0016461 A1* | 1/2015 | Qiang | H04L 61/5046 370/392 |
| 2019/0158408 A1* | 5/2019 | Li | H04L 12/189 |
| 2019/0182211 A1* | 6/2019 | Yang | H04L 69/326 |
| 2019/0191309 A1* | 6/2019 | Kweon | H04W 48/18 |
| 2022/0007251 A1* | 1/2022 | Allan | H04W 36/32 |

OTHER PUBLICATIONS

Hu et al. A Mobility-Oriented Scheme for Virtual Machine Migration in Cloud Data Center Network. (Year: 2016).*

Black et al., "An Architecture for Data-Center Network Virtualization over Layer 3 (NVO3)," Internet Engineering Task Force (IETF), RFC 8014 (Dec. 2016).

Conta et al., "Internet Control Message Protocol (ICMPV6) for the Internet Protocol Version 6 (IPv6) Specification," Network Working Group, RFC 4443 (Mar. 2006).

Defoy et al., "5G-Datacenter Interconnection Use Case," Network Working Group, Internet-Draft (Jan. 24, 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "IP/MAC addresses update over a 5GLAN connection to support indirect communications mode," SA WG2 Meeting #130, S2-1900367, Kochi, Japan (Jan. 21-25, 2019).

Interdigital Inc., "Update to Solution for 5GLAN Group Communication, to support mobility procedures within a 5GLAN," SA WG2 Meeting #129bis, S2-1812398, West Palm Beach, FL (Nov. 26-30, 2018).

Lasserre et al., "Framework for Data Center (DC) Network Virtualization," Internet Engineering Task Force (IETF), RFC 7365 (Oct. 2014).

Li et al., "Split Network Virtualization Edge (Split-NVE) Control-Plane Requirements," Internet Engineering Task Force (IETF), RFC 8394 (May 2018).

Li et al., "Split Network Virtualization Edge (Split-NVE) Control Plane Requirements," draft-ietf-nvo3-hpvr2nve-cp-req-14, NVO3 Working Group, Internet Draft (Feb. 8, 2018).

Narten et al., "Problem Statement: Overlays for Network Virtualization," Internet Engineering Task Force (IETF), RFC 7364 (Oct. 2014).

Third Generation Partnership Project, "Technical Specification Group Services and System Aspects; System Architecture for the 5G System; Stage 2 (Release 15)," 3GPP TS 23.501 V15.4.0 (Dec. 2018).

Third Generation Partnership Project, "Technical Specification Group Services and System Aspects; Procedures for the 5G System; Stage 2 (Release 15)," 3GPP TS 23.502 V15.4.1 (Jan. 2019).

Third Generation Partnership Project, "Technical Specification Group Core Network and Terminals; 5G System; Interworking between 5G Network and external Data Networks; Stage 3 (Release 16)," 3GPP TS 29.561 V16.2.0 (Dec. 2019).

Third Generation Partnership Project, "Technical Specification Group Core Network and Terminals; 5G System; Interworking between 5G Network and external Data Networks; Stage 3 (Release 15)," 3GPP TS 29.561 V15.3.0 (Sep. 2019).

Third Generation Partnership Project, "Technical Specification Group Core Network and Terminals; 5G System; Interworking between 5G Network and external Data Networks; Stage 3 (Release 15)," 3GPP TS 29.561 V15.1.0 (Sep. 2018).

Third Generation Partnership Project, "Technical Specification Group Services and System Aspects; Study on access traffic steering, switch and splitting support in the 5G system architecture (Release 16)," 3GPP TR 23.793 V16.0.0 (Dec. 2018).

Third Generation Partnership Project, "Technical Specification Group Services and System Aspects; Study on enhancement of 5GS for Vertical and LAN Services (Release 16)," 3GPP TR 23.734 V16.0.0 (Dec. 2018).

Third Generation Partnership Project, "Technical Specification Group Services and System Aspects; Study on enhancement of 5GS for Vertical and LAN Services (Release 16)," 3GPP TR 23.734 V16.2.0 (Jun. 2019).

Third Generation Partnership Project, "Technical Specification Group Services and System Aspects; Procedures for the 5G System (5GS); Stage 2 (Release 16)," 3GPP TS 23.502 V16.3.0 (Dec. 2019).

Third Generation Partnership Project, "Technical Specification Group Services and System Aspects; Procedures for the 5G System (5GS); Stage 2 (Release 15)," 3GPP TS 23.502 V15.8.0 (Dec. 2019).

Third Generation Partnership Project, "Technical Specification Group Services and System Aspects; System architecture for the 5G System (5GS); Stage 2 (Release 16)," 3GPP TS 23.501 V16.3.0 (Dec. 2019).

Third Generation Partnership Project, "Technical Specification Group Services and System Aspects; System architecture for the 5G System (5GS); Stage 2 (Release 15)," 3GPP TS 23.501 V15.8.0 (Dec. 2019).

Li et al., "Split Network Virtualization Edge (Split-NVE) Control Plane Requirements," draft-ietf-nvo3-hpvr2nve-cp-req-15, NVO3 Working Group, Internet Draft (Feb. 9, 2018).

* cited by examiner

METHODS AND WIRELESS TRANSMIT/RECEIVE UNITS FOR SUPPORTING VIRTUAL MACHINE MIGRATION

CROSS-REFERENCE TO RELATED APPLICATIONS

This application is the U.S. National Stage, under 35 U.S.C. § 371, of International Application No. PCT/US2020/013527, filed Jan. 14, 2020, which claims the benefit of U.S. Provisional Application No. 62/792,267, filed Jan. 14, 2019, and U.S. Provisional Application No. 62/822,433, filed Mar. 22, 2019, the contents of which are incorporated herein by reference.

BACKGROUND

A 5G tenant system is a physical or virtual system hosted on a UE (e.g., a virtual machine, a container application, a task) or routed/bridged through a UE (e.g., a device connected to the UE over a LAN or WLAN). A 5G tenant system connects to one or more virtual networks, e.g., a 5G-LAN. A 5G tenant system may be migrated from a UE to another UE, or between a UE and a datacenter server.

A 5G tenant system interface is a software element on a UE, implementing the interface between a virtual network, e.g., a 5G-LAN, and a 5G tenant system. It presents itself to the tenant system as a normal network interface, e.g. as if associated with a network interface card (if the tenant system is a VM on a UE), or e.g. as a normal bridge or router (if the tenant system is routed/bridged through a UE). A 5G tenant system interface can be associated with multiple inner addresses (e.g. a VM or locally attached device may configure multiple IP and/or MAC addresses used to communicate over a 5GLAN network).

It is desirable to enable a more dynamic IP/MAC address and related communication management as part of 5GLANs.

SUMMARY

A method of supporting virtual machine (VM) migration between a first wireless transmit/receive unit (WTRU) and a second WTRU via a 5GLAN is disclosed. The first WTRU is a host of a VM and the second WTRU connects to the 5GLAN. The method comprises that the second WTRU receives the VM migrated from the first WTRU, wherein a tenant system interface (TSI) ID is associated with the VM; sends a PDU session request message to a session management function (SMF) of the 5GLAN, the PDU session request message comprising the TSI ID; receives a PDU session response message from the SMF so as to establish a PDU session between the second WTRU and the 5GLAN.

A wireless transmit/receive unit (WTRU) configured to connect to a 5GLAN is disclosed. The WTRU comprises: a receiver configured to receive a VM migrated from a first WTRU, wherein a tenant system interface (TSI) ID is associated with the VM; and a transmitter configured to send a PDU session request message to a session management function (SMF) of the 5GLAN, the PDU session request message comprising the TSI ID, the receiver further configured to receive a PDU session response message from the SMF so as to establish a PDU session between the WTRU and the 5GLAN.

A method of supporting virtual machine (VM) migration between a first wireless transmit/receive unit (WTRU) and a second WTRU via both a 5GLAN and a datacenter virtual network (VN) connected to the 5GLAN is disclosed. The second WTRU connects to the datacenter VN and the first WTRU is a host of a VM. The method comprises that the second WTRU receives the VM migrated from the first WTRU, wherein a tenant system interface (TSI) ID is associated with the VM; connects a TSI of the VM associated with the TSI ID to the VN through a Network Virtualization Edge (NVE) in the VN; and receive traffic from the NVE.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
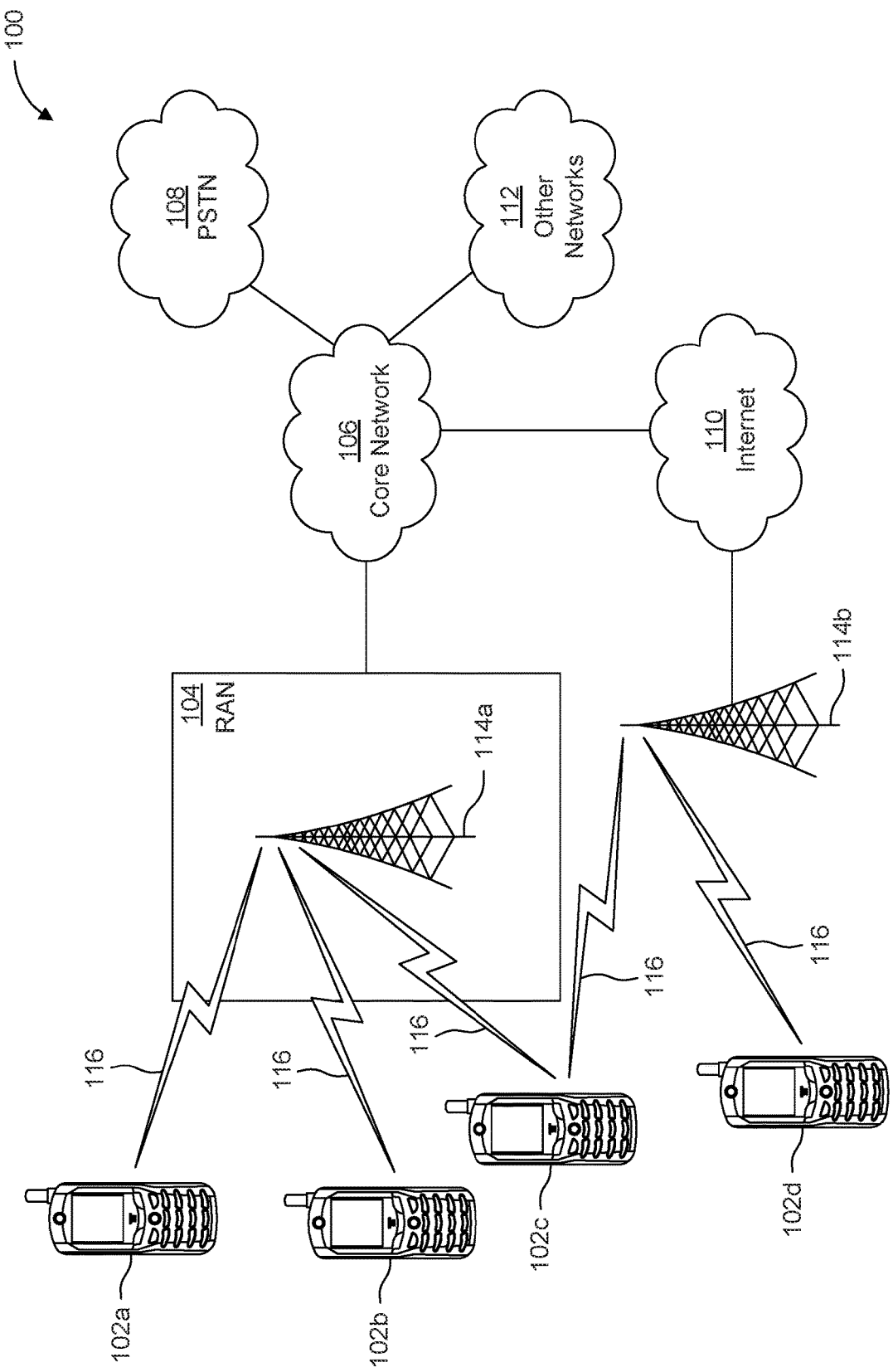
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
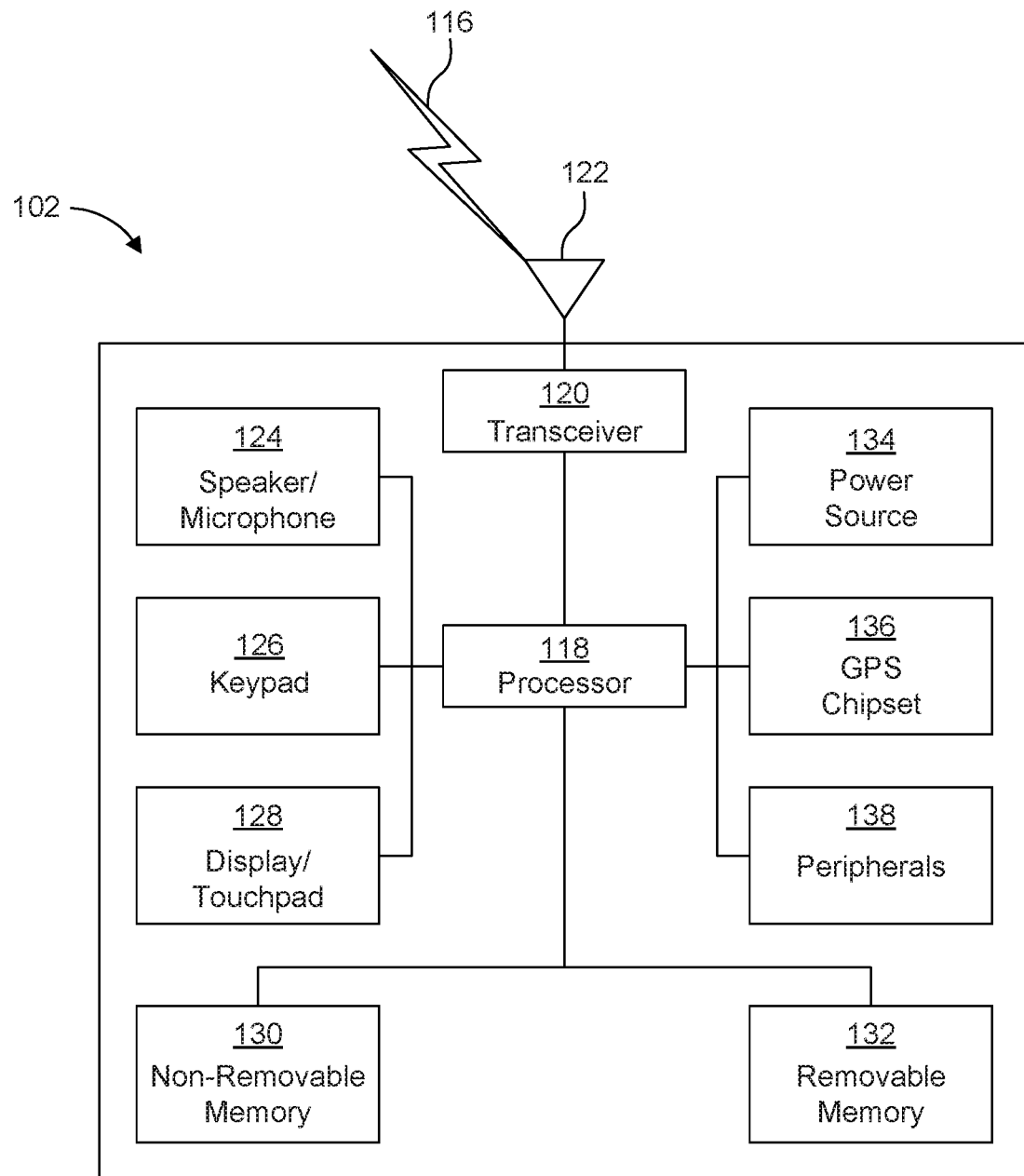
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
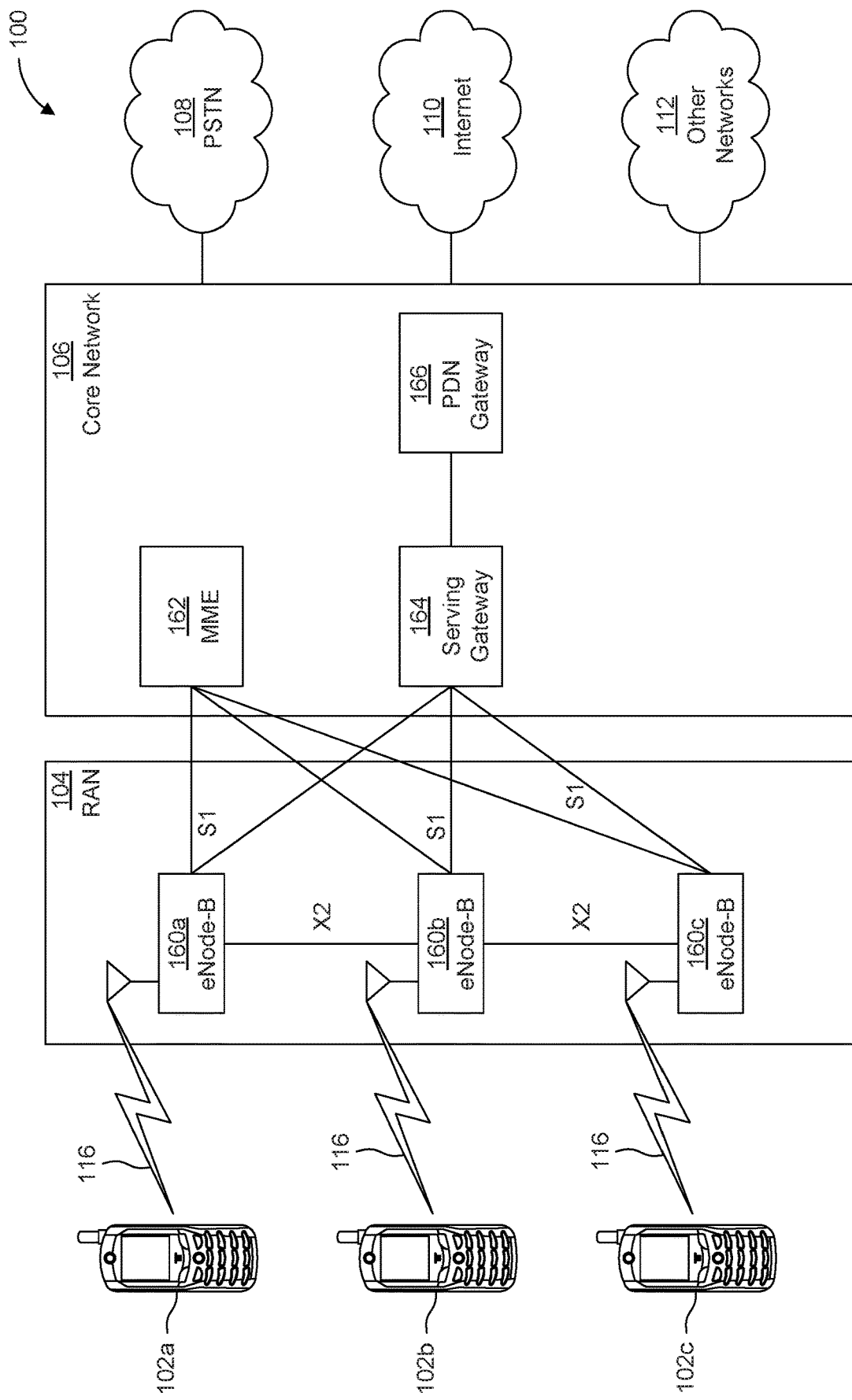
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
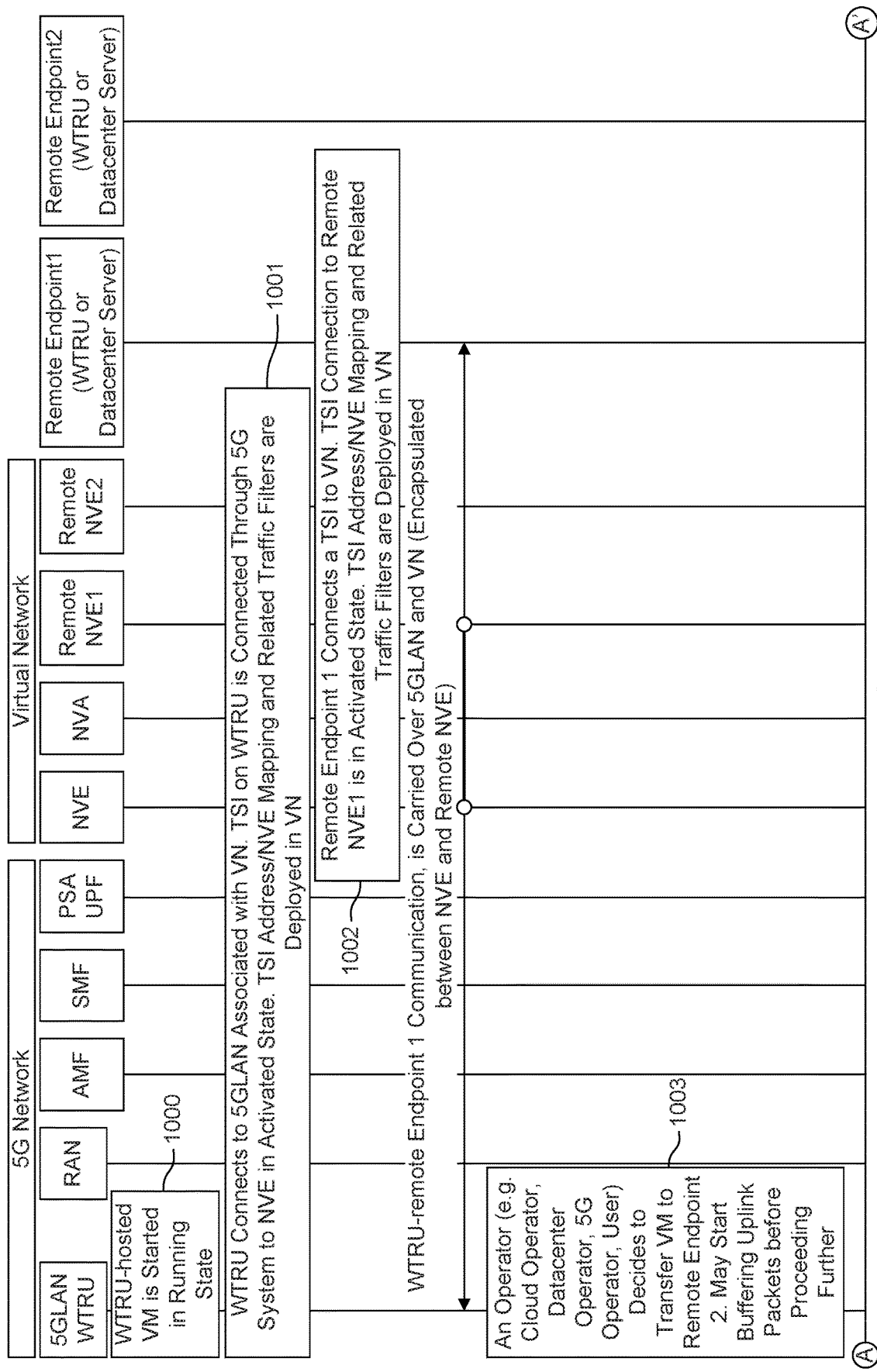
FIG. 10 shows an example flow diagram for VM mobility between a 5G WTRU and a remote server or WTRU.
Figure 10:
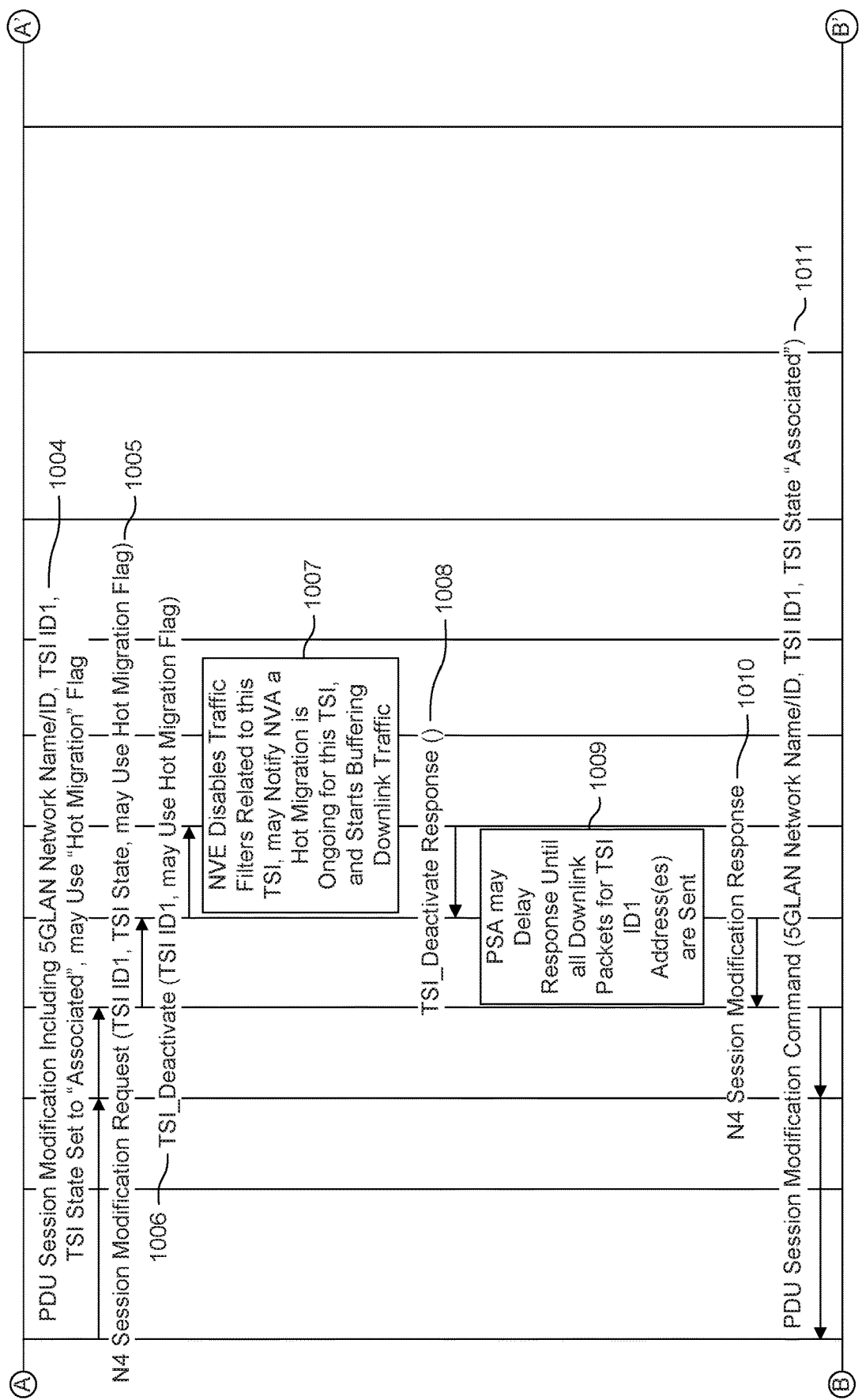
Figure 10:
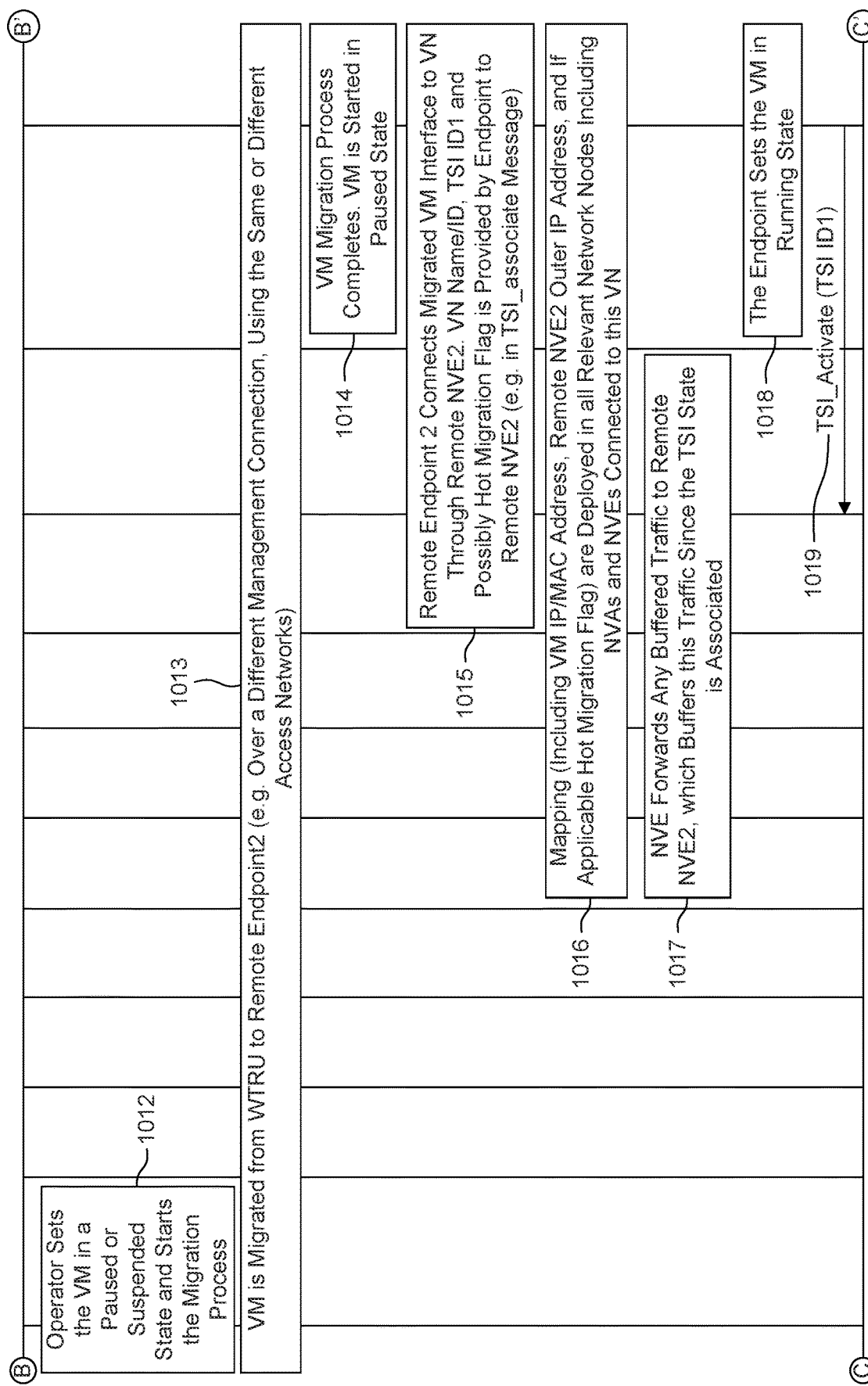
Figure 10:
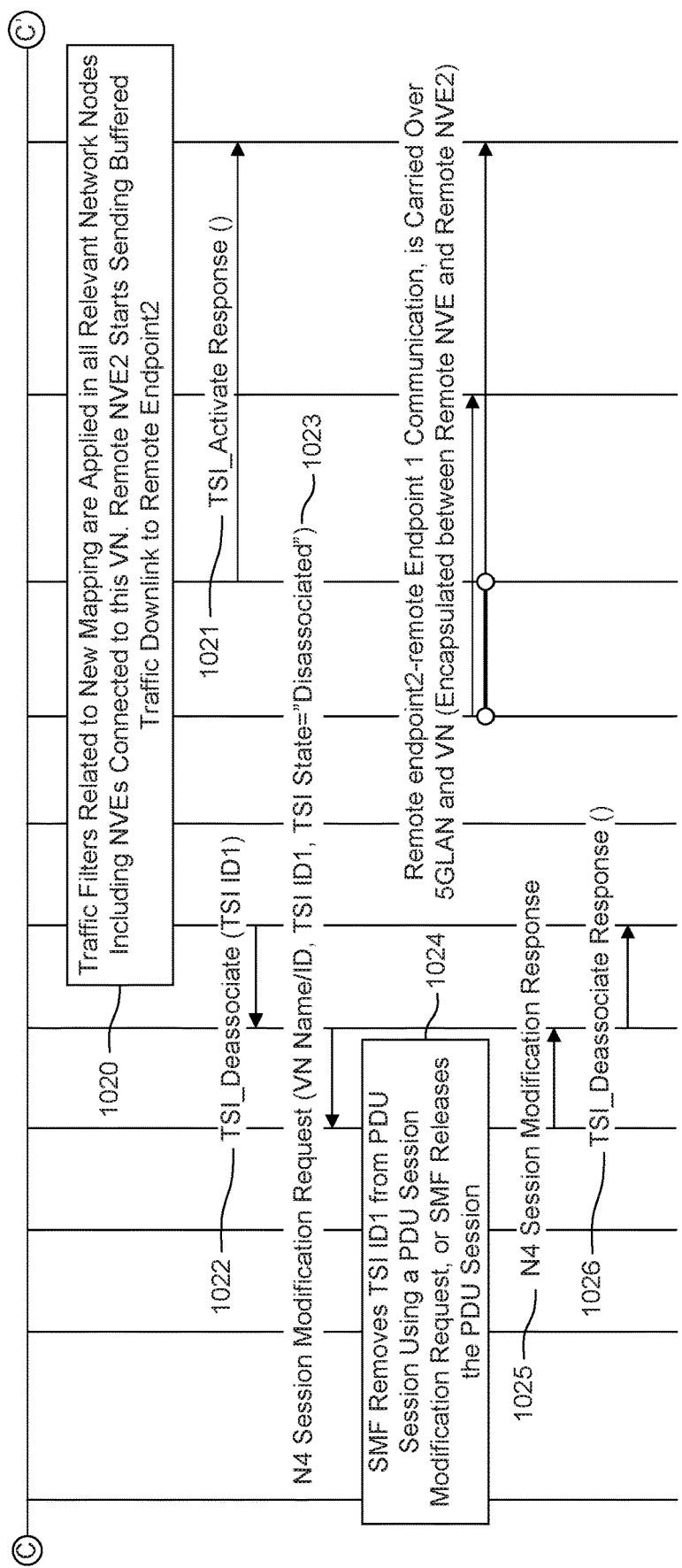

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
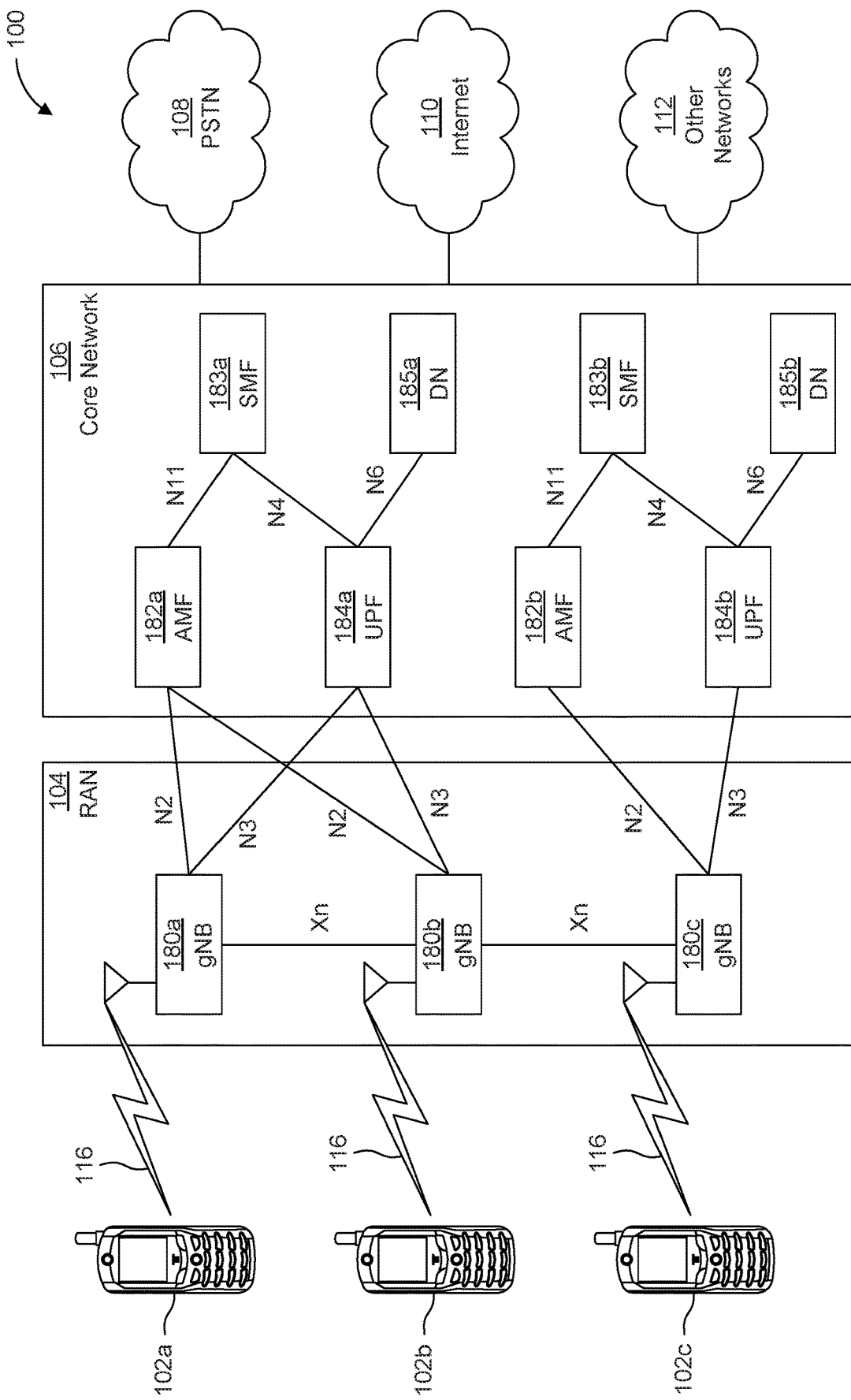
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
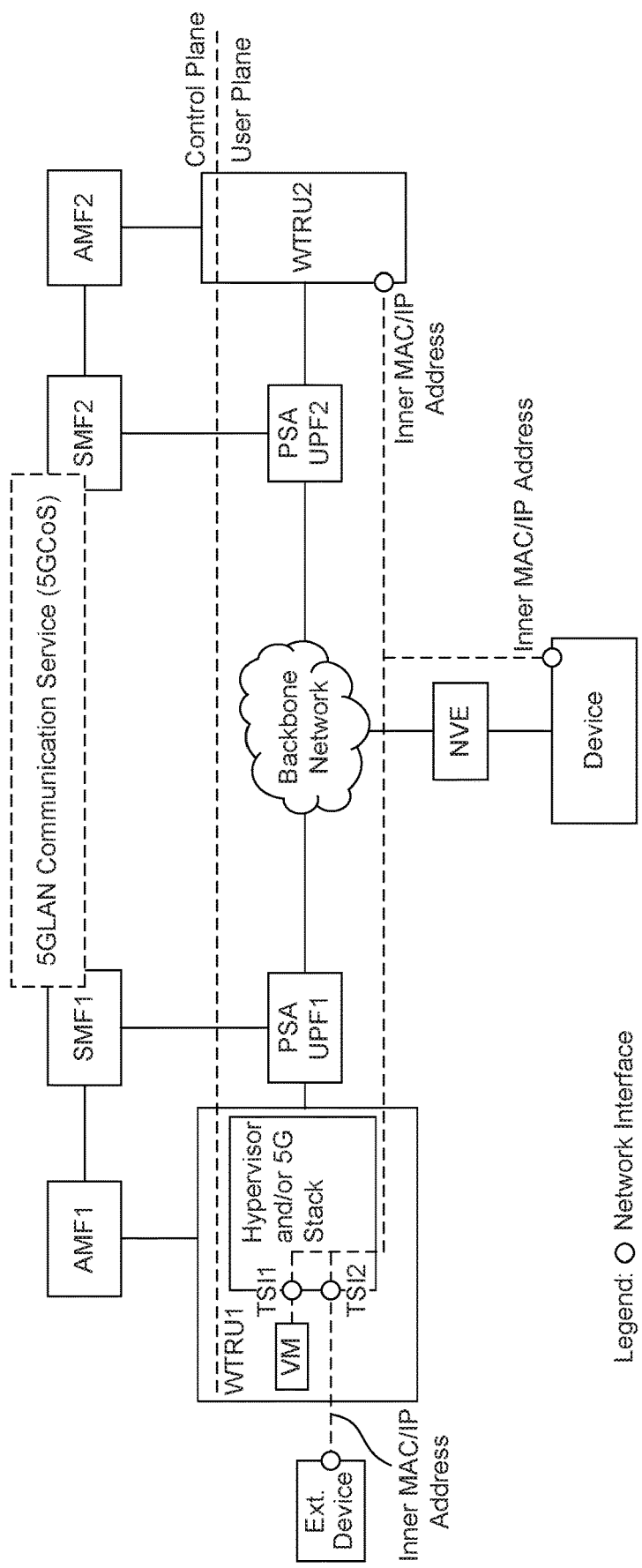
FIG. 2 shows a high level 5GLAN architecture.

FIG. 2 shows a representation of two types of 5G tenant systems (a VM and an external device), and related tenant system interfaces. Tenant system interfaces may be associated with state information, e.g. states "associated" and "activated". In the "associated" state, IP/MAC addresses may be known but no traffic is expected to be exchanged with the network. This may correspond to a VM/tenant system that is being created or migrated. In the "activated" state, traffic may be sent to/from the tenant system.

While detailed use cases will be provided below, in general, a goal of this application is to enable a more dynamic IP/MAC address and related communication management as part of 5GLANs. This may be an enabler for, among other use cases, the deployment on WTRUs of virtual functions such as virtual machines (VMs) and software containers (e.g. as micro-services components). This effectively extends the cloud infrastructure (e.g. NFV infrastructure in 5G core and/or virtualization infrastructure in macro/mini/micro data centers) to include WTRUs. Those VMs/containers may be user applications or may be part of the mobile network infrastructure (e.g. Cloud/Fog RAN components), therefore enabling a wide range of edge computing-related use cases. This may include: moving computation away from a WTRU to save energy, moving computation towards a WTRU to reduce latency, moving or duplicating computation between WTRUs to accommodate the needs of applications and users, duplicating computation across multiple user devices and in-network-devices to improve reliability, etc.

Devices that have a routed/bridged connection to the 5GLAN through a WTRU also provide a motivation for this work, since they impose similar requirements as VMs/containers to some extent (e.g. dynamic addressing and mobility).

A WTRU may need to support dynamically adding/removing 5GLAN inner IP/MAC addresses to an existing connection, e.g. to add/remove devices that have a routed/bridged connection to the 5GLAN through the WTRU. Methods are proposed to add/remove inner addresses which may be IP or MAC addresses, a combination of both, or other types of addresses applicable for other types of 5GLANs, e.g. FQDN suffixes for ICN-type 5GLANs, etc.

A WTRU may act as a hypervisor, hosting VMs which may be migrated between two WTRUs, or between a WTRU and a datacenter server. The WTRUs may join a 5GLAN. How to efficiently support such a VM migration is considered herein. The term VM, in its broad meaning, is "emulation of a computer system", which can include system virtual machines (typically running on hypervisors) and process virtual machines (e.g. software containers). Moreover, proposed methods may also be applicable to non-VM use cases such as "router/bridge WTRU re-allocation", where a device attached to 5GLAN through a WTRU moves and obtains 5GLAN access through another WTRU.

It is desirable to enhance techniques to interconnect WTRUs and DNs (e.g. as specified in 3GPP, TS29.561) and enable: a more dynamic setup of IP/MAC addresses based on decisions from the WTRU or from the network, and a more extensive mobility support (e.g. between PSA UPFs, and, VM migration between WTRUs). Furthermore, this application additionally provides support for communicating VM state information (e.g. "associated" state, "activated" state, etc.).

A WTRU may need to support an active-active or active-standby 5GLAN connection, i.e. where a WTRU has a connection to a 5GLAN network through multiple PSA UPFs, with one or more active connections, and zero or more standby connections. How to enable 5GLAN connection multiplexing and handover in these scenarios is considered herein. Such multiplexing and handover should be done in cooperation with the underlying data network, since using multiple PSA UPFs means that more than one path will be used on the data network side as well as on the 5G network side.

This may enable future enhancements of traffic steering, switch and splitting in 5G, where traffic steering/switch/splitting would not be limited to multi-access PDU sessions anchored at a single PSA UPF.

While data centers may rely on a wide range of network virtualization technologies including proprietary solutions, members of the industry joined an effort to standardize network virtualization over layer 3 (NVO3). A 5G system may be interconnected with a datacenter Virtual Network (VN) described using NVO3 architecture and concepts. This work may be extended to other datacenter network technologies using similar concepts. In NVO3 architecture, a Network Virtualization Authority (NVA) provides management and control plane support for the operation of virtual networks deployed by the datacenter operator. The virtual network itself is realized in the data plane through overlay encapsulation over IP, between Network Virtualization Edge (NVE) functions. A NVE may implement the interface between the hypervisor and the VN (or, in some cases, between a non-virtualized network function and the VN). NVE may perform functions such as forwarding and encapsulation or decapsulation of traffic between the overlay VN and the hypervisor.

Support for dynamic addition and removal of 5GLAN inner addresses is considered herein. It is proposed to dynamically add/remove 5GLAN inner IP/MAC addresses to an existing connection using PDU session modification request/command messages, and related procedures, enhanced for 5GLAN.

Support for efficient migration of VMs (from WTRU to WTRU, or WTRU to DC) is considered herein. It is proposed to use a new 5G tenant system interface (TSI) ID and TSI state information element in 5GLAN procedures to facilitate supporting VM migration between WTRUs. Note that the 5G TSI can be a physical or virtual (i.e., a network interface implemented in software) entity as long as it can connect a tenant system (e.g., an application running on a WTRU) to a virtual network (e.g., a 5GLAN-type network).

Support for active-active and active-standby 5GLAN connections is also considered herein. It is proposed to use a new 5GLAN connection priority information element in 5GLAN procedures to enable active-active and active-standby 5GLAN connections.

It should be noted that all proposed solutions may be further combined as needed. For example, a PDU session modification request/command messages enhanced for 5GLAN support may be further used to dynamically update tenant system interface state and 5GLAN connection priority. In another example, 5GLAN connection priority may be combined with TSI ID and/or state support.

End to end connectivity between WTRU and data center server may cause 5G signaling to be prolonged towards the VN, to enable VM mobility and path redundancy end-to-end between WTRU and datacenter server.

This prolongation may be shown in three types of message flow extension. First, SMF-UPF messages (e.g. enhanced N4 Session Establishment/Modification messages, to enable UPF-NVE communication). Second, UPF-NVE messages (e.g. control messages to enable data plane communication between UPF and NVE). Third, NVA-NVE interactions within the VN (e.g. control messages to enable data plane communication between all endpoints connected to the VN, including WTRUs). There may also be a documenting of new information elements, also known as IEs (e.g., VN name/IDs, NVE locators and possibly their association with UPFs) in the 5GLAN service profile, e.g. in SMF configuration.

Concerning end-to-end procedures involving 5G and the datacenter VN, the purpose of the IEs introduced may be understood based on the following four points.

First, a TSI ID may be used to identify a specific tenant system interface over the point-to-point connection between a PSA UPF and an NVE. This may be used to manage the VM connection to the VN, including managing VM state and adding or removing addresses on the interface. A local tag may be negotiated between PSA UPF and NVE, to associate data plane traffic between a particular TSI and VN to this local tag (e.g., a VLAN tag or another label). A TSI ID may further be used to facilitate VM mobility. For example, if the TSI ID is unique in the 5G network or VN, it may be used to match a connection from a migrated VM with an older connection from the same VM at a previous location. However, if such uniqueness cannot be provided, other matching method may be used, e.g. based on a combination of WTRU identity (which would need to be provided to NVE, e.g. as a GPSI), hot migration flag and/or IP/MAC addresses.

Second, a TSI state may be used to reflect the VM state into the VN. Initial usage of an "associated" state may enable preparing the VN network, thus enabling quickly turning on or off traffic filters throughout the VN when entering or leaving an "activated" state. Usage of TSI states may be used in tenant system hot migration scenarios, to enable migration without loss of traffic.

Third, the hot migration flag may be used to indicate the VN should react differently than usual to a deactivation (e.g. leaving traffic filters in all NVEs, and buffering traffic), and may also be used to check that a reuse of TSI ID or IP/MAC address in a new connection is intentional and not an error or attack.

Fourth, the 5GLAN priority may be used to let the VN set up redundant traffic paths according to WTRU's preferences (e.g. set up distinct paths between 2 NVEs used by the WTRU and any destination NVE).

Encoding of TSI ID between hypervisor and NVE has been proposed in the case that the hypervisor-NVE connection is over Ethernet (i.e. in datacenters, not involving 5G). In this case, VDP (VSI Discovery Protocol, as defined in IEEE 802.1Q) may be used to carry TSI ID as a Virtual Station Interface (VSI) ID, and other fields may be used to carry state information. In one embodiment, a similar encoding may be used between PSA UPF and NVE, e.g. over VDP when PSA UPF and NVE are collocated. Alternatively, other protocols and encoding may be used to carry TSI ID, state, hot migration flag and priority between PSA UPF and NVE, e.g. HTTP-based messages, which could be provided by a NVE service interface, where the interface is provided by NVE acting as a 5G application function (AF), or by NVE acting as an external service.

While the embodiment described is a use case where the datacenter is an edge datacenter, the mechanisms described herein can be applied to any datacenter, e.g. a distant cloud datacenter.

FIG. 2 provides a high-level description of a 5G system architecture for 5GLAN and it is used as a reference architecture to frame the solutions outlined in this proposal. This architecture includes typical components of a 5G system, including WTRUs (WTRU1 and WTRU2) and PDU Session Anchor UPFs (PSA UPF1 and PSA UPF2) in the user plane, and Core Access and Mobility Management Functions (AMF1 and AMF2) and Session Management Functions (SMF1 and SMF2) in the control plane. A 5GLAN Communication Service (5GCoS) is providing the necessary control plane support for 5GLAN. 5GCoS may be implemented using a set of independent service functions, and/or using service functions collocated with one or more SMFs. It should be noted that in the methods according to this application, in some embodiments, multiple SMFs involved in the management of a given 5GLAN group may be used for interacting with WTRUs, and in other embodiments, only one SMF involved in the management of a given 5GLAN group may be used. The following description will further illustrate these embodiments in detail.

5GCoS provides services such as authorizing WTRUs to join a 5GLAN, configuring and controlling the underlying backbone network. The underlying backbone network may be composed of layer-2 and/or layer-3 Virtual Private Networking technologies such as EVPN (Ethernet VPN), NVO3 (Network Virtualization over Layer 3) and/or other related technologies. The role of the underlying network includes forwarding inner 5GLAN traffic between PSA UPFs, or between PSA UPFs and network virtualization edge (NVE), to ensure that WTRUs can communicate over 5GLAN with other WTRUs or with other devices located outside of a 5G network, e.g. in a datacenter. The underlying backbone network may be a data network (e.g. outside of the 5G network domain), or it may be a part of the 5G network.

Figure 3:
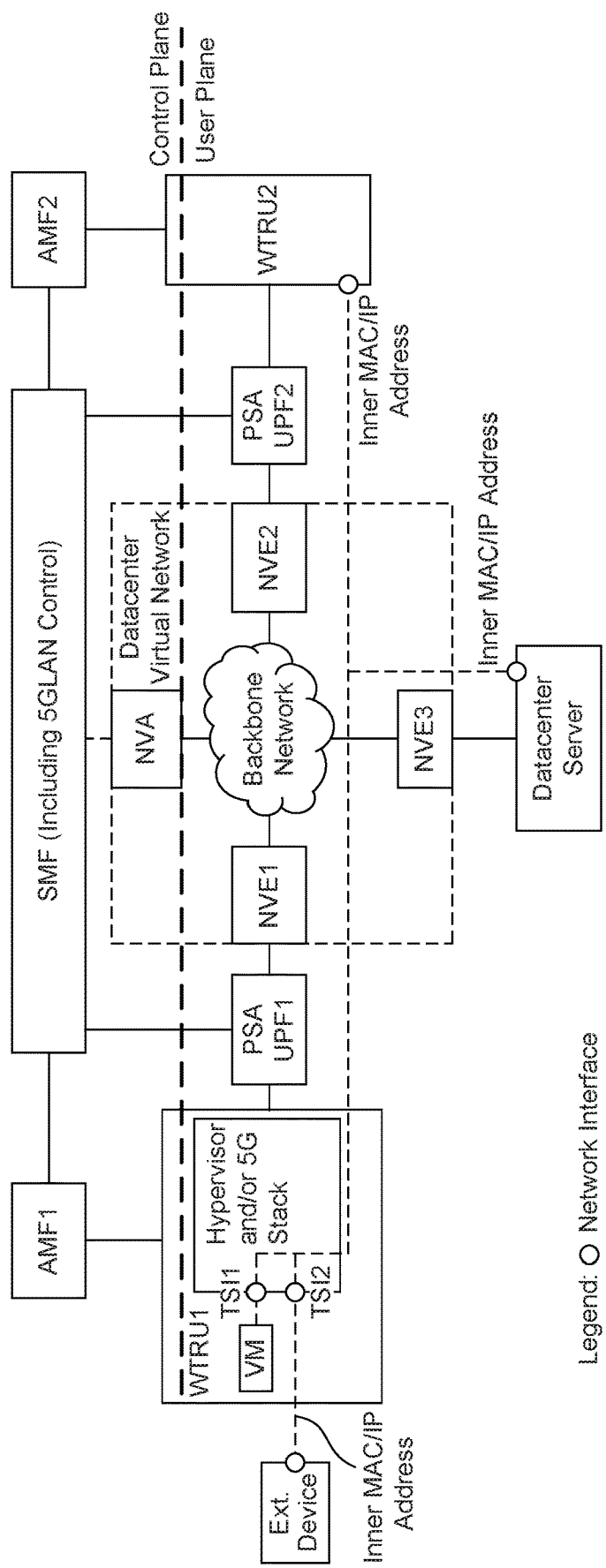
FIG. 3 shows another view of a high level 5GLAN architecture.

FIG. 3 shows a distinct datacenter virtual network. While in FIG. 2 the PSA UPFs directly interfaced with the virtual network (e.g. PSA UPF1 included an NVE component), the NVE component is explicitly represented, to cover multiple deployment options (as discussed later below). An NVA function may also be represented. NVA may be interconnected with all NVE functions. NVA may have a logical interconnection with SMF (e.g. through a service interface if NVA is in part or entirely deployed as a 5G NF or 5G Application Function). In an alternative, NVA may also be integrated within the SMF, which would for example be suitable in a case where the 5G network operator operates its own datacenter. Finally, as a simplification, a single SMF function may be represented, since the 5G system may use a single SMF to manage a given 5GLAN network (therefore, both SMFs and 5GLAN communication service are represented as a single SMF function).

Furthermore, NVE may be deployed in several fashions. For example, NVE may be deployed as an external gateway located at the border of a datacenter (e.g. an edge datacenter). There may be multiple NVE deployed as border gateways, e.g. to enable short/fast connectivity between multiple PSA UPFs and the datacenter, e.g. when those PSA UPFs are distributed over different locations. In this case the PSA-NVE messages described in this work may be exchanged over the 5G-datacenter interconnection (e.g. a transit network or a router/switch). In another example, NVE may be deployed as a component collocated with or internal to the PSA UPF. In this case, the PSA-NVE messages described in this work may be exchanged as software function calls or be carried over a local link between PSA UPF and NVE NF (e.g. over Software Function Chaining or NDP signaling). In this case, data traffic leaving the 5G system will be sent directly in the VN, which means in this case the Data Network connected to 5G may be the VN itself, possibly accessed through a point-to-point connection to a border gateway of the datacenter. In all NVE deployments modes, it should be possible to have multiple such NVEs, to enable short/fast connectivity between 5G WTRUs and datacenter servers. Therefore, the 5G-datacenter connectivity described herein enables such distributed interconnection, and supports WTRU anchor relocation (i.e. mobility) between PSA UPFs, which is supported with mechanisms similar to tenant system relocation. In particular tenant system procedures described herein, when applied between 5G WTRUs which are the same source and destination WTRU, enable anchor relocation support.

Dynamically adding and/or removing inner addresses to an ongoing 5GLAN connection may be desirable. Multiple use cases can involve a mobile WTRU or other mobile device, connected to a 5GLAN network through a bridge or router WTRU. For example, WTRUs may use a WTRU in a parked vehicle as a 5GLAN router or bridge; wearable devices (e.g. an Apple watch) may use a mobile phone as 5GLAN router/bridge when available (e.g. using Bluetooth to communicate with the mobile phone), while also communicating directly or concurrently over another wireless technology; mobile phones in a crowded area may use a limited number of mobile phones among themselves to access the 5GLAN network. When an external device B connects to WTRU A (e.g. using device-to-device communication such as ProSe), WTRU A learns about the external device B's inner IP/MAC address(es), configures itself to route/bridge traffic to/from these addresses, and to transport this traffic to/from an existing 5GLAN PDU session. The network (e.g. when WTRU A requests 5GLAN connectivity for the external device B's address(es)) reconfigures itself to forward traffic to/from those inner addresses over the 5GLAN network. When the external device B goes out of range of WTRU A, the link between WTRU A and the external device B is lost, and WTRU A may remove the external device B's inner addresses from the PDU session (but may continue using the PDU session for other 5GLAN traffic from A or other devices). The network reconfigures itself to stop forwarding traffic to/from those inner addresses over the 5GLAN network.

In another use case, VM1 running on WTRU A is connected to a 5GLAN network. A program on VM1 configures a second IP address on its network interface. WTRU A modifies the IP-type PDU session used to carry 5GLAN traffic with this new IP address. From this point on, VM1 may use both the old and the new IP address to communicate over 5GLAN. In a similar use case over an Ethernet-type PDU session, VM1 is configured with a new virtual network interface, and WTRU A modifies the Ethernet-type PDU session used to carry 5GLAN traffic with the MAC address of the new interface.

In addition to existing solutions to connect a WTRU to a 5GLAN, a PDU session modification request message can be used to add or remove inner addresses from a 5GLAN connection.

The following message sequence describes how a WTRU (e.g., WTRU1) initially joins a 5GLAN network, and then later updates the list of inner IP/MAC addresses it wishes to use for this 5GLAN connection. Additionally, it also describes how the network may request the removal of an inner address from the 5GLAN connection.

As a general note on all message flow diagrams herein, AMF, although it relays PDU session establishment requests and other messages between WTRU and SMF, may not be systematically represented in diagrams in the present application. Similarly, signaling and user plane traffic are transported over a RAN, which is also not systematically represented in diagrams in the present work. For example. RAN and AMF are not represented between WTRU2 and SMF2/UPF2 in FIG. 4, although they are typically present. Moreover, in some instances, SMF1 and SMF2 may be the same SMF, and the 5GLAN Communication Service may be collocated with SMF(s).

As another general note on all message flow diagrams, for simplicity we will use a single WTRU2 as a representative remote device communicating with WTRU1 over 5GLAN. Many such devices may exist concurrently in practice. Those devices may be other WTRUs, datacenter servers or any other devices connected to the same 5GLAN network.

Figure 4:
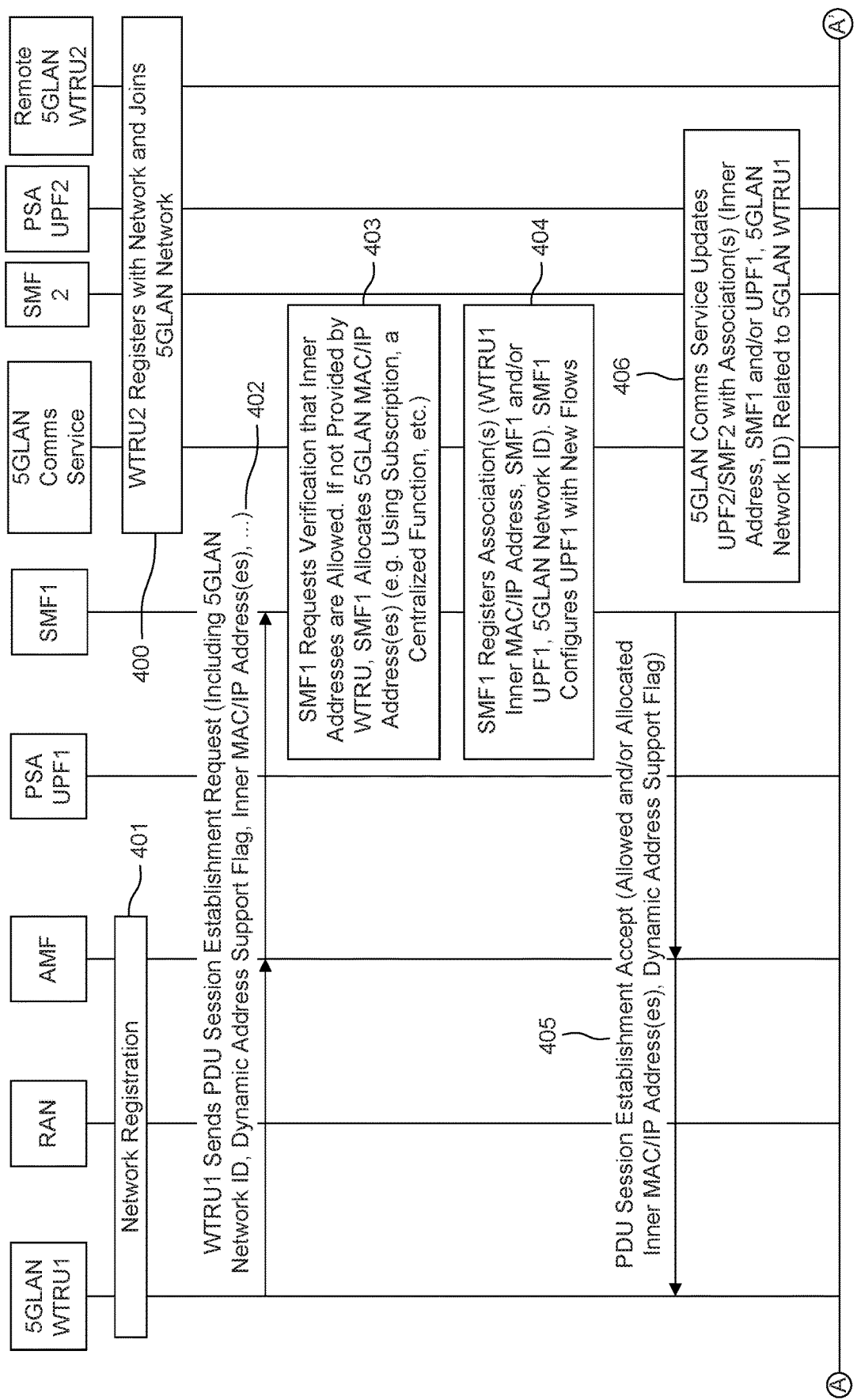
FIG. 4 shows an example of dynamically adding and/or removing inner addresses to an ongoing 5GLAN connection.
Figure 4:
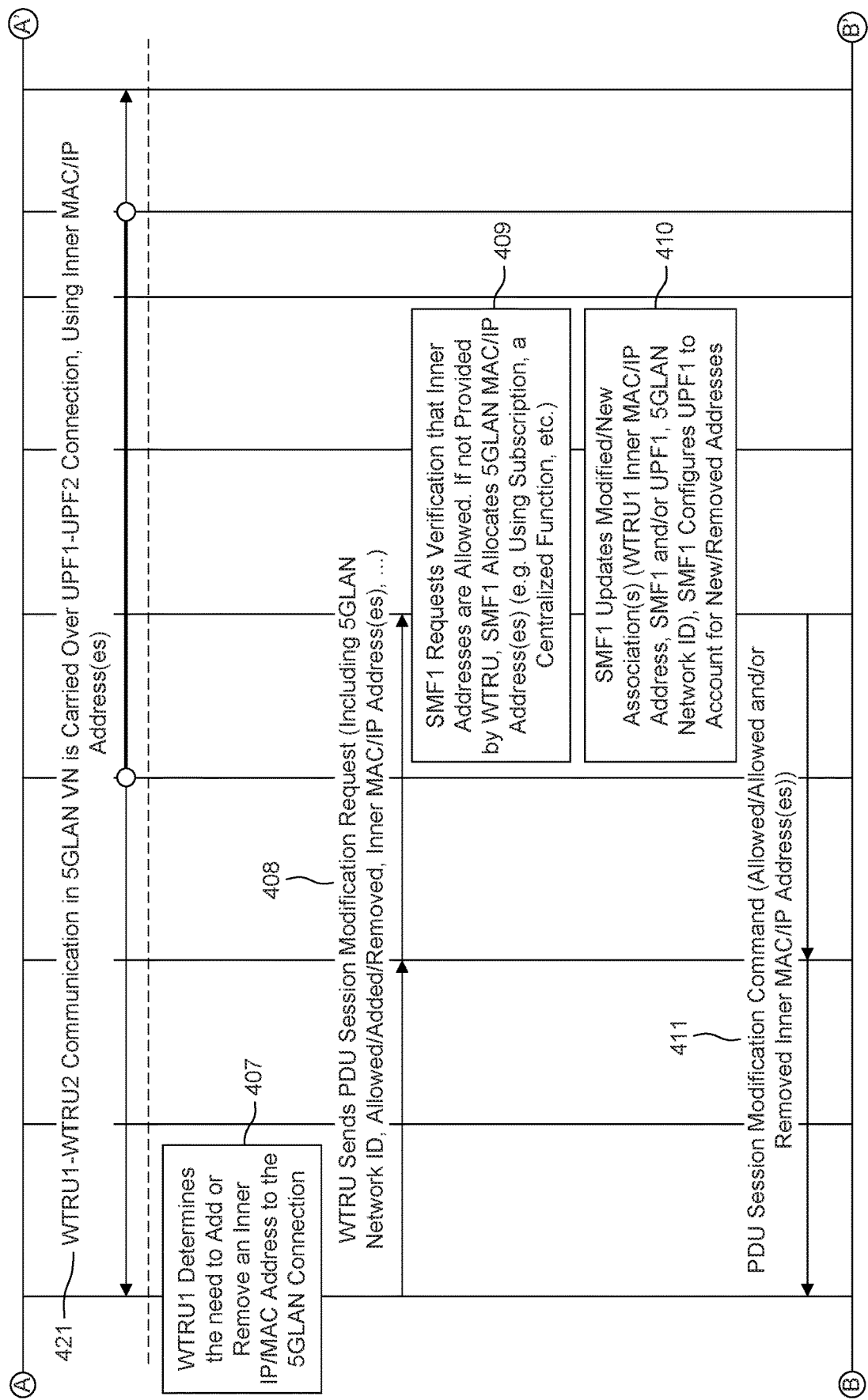
Figure 4:
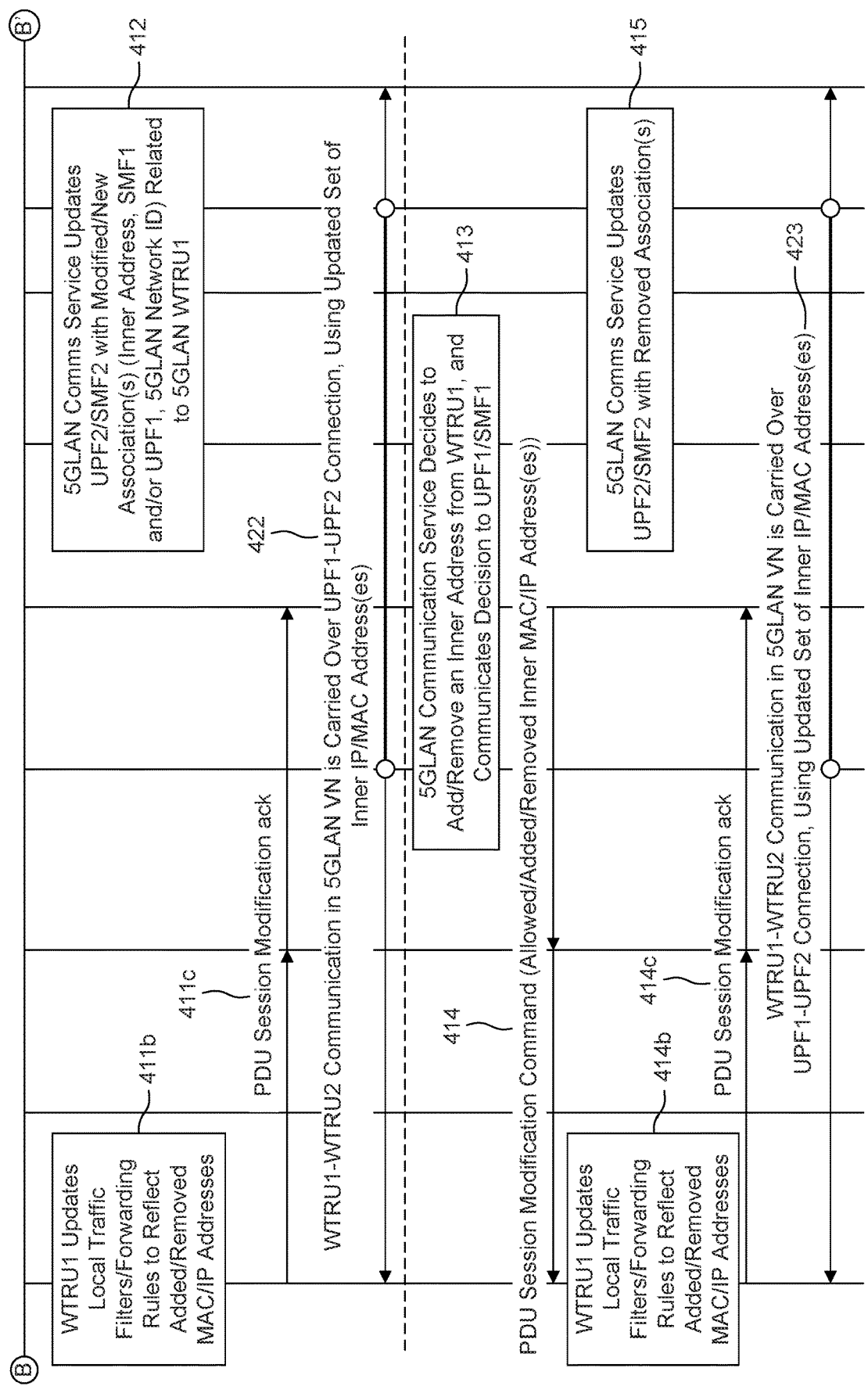

FIG. 4 shows an example flow diagram for dynamically adding/removing inner addresses to an ongoing 5GLAN connection. As shown in FIG. 4, at 400, WTRU2 may register with the network and joins a 5GLAN virtual network (e.g. using a mechanism such as described 2-5). Then, at 401, WTRU1 may register with the network.

Then, at 402, WTRU1 may send a PDU session establishment request including a 5GLAN network ID/name, and inner MAC/IP address(es). A new "dynamic address support" flag may be included as well, to let SMF know that the WTRU or network may further dynamically add/remove 5GLAN IP addresses using one of the method disclosed herein. In cases where an inner MAC/IP address is needed but not known by the WTRU, an empty inner address information element or equivalent may be used to indicate that the network should allocate one. In one example, WTRU1 may use the packet filter format (e.g. as part of QoS rules sent in the PDU session establishment request) to encode inner MAC/IP addresses that need to be allowed. Additionally, to support the case where the address needs to be allocated by the network (e.g. external devices using IPv4 and DHCP), a new packet filter operation "add and allocate" may be added to the existing ones (add, modify, delete). Upon receiving a message including this operation, the SMF will allocate a new address in the 5GLAN address space, will add the corresponding rule in the UPF along with information whether the WTRU is capable of dynamically updating inner IP/MAC addressing, and it will communicate the allocated address in the PDU session establishment response message. Alternatively, the existing "add" operation may be used, along with setting a special address value (e.g. all zeros) to request an allocation. It should be noted that, QoS rules (and included packet filters) are not currently sent in a PDU session establishment request.

Then, at 403, upon reception of the message, SMF1 may request verification that inner addresses are allowed. For example, SMF1 may send a verification request to a 5GLAN communication service which maintains a list of used inner addresses in the 5GLAN network. Verification may consist in checking for duplicate addresses. If an allocation of inner address is needed, SMF1 may request such allocation, e.g. from a 5GLAN communication service. If a "dynamic address support" flag is set or was set in the request, the SMF1 may verify in the subscription profile that this feature is allowed. If it is allowed, SMF1 may configure itself, UPF1 and/or WTRU1 to enable routing/bridging of additional 5GLAN flows from other source MAC/IP addresses that the 5GLAN address initially provided to the WTRU.

For example, in some cases, SMF1 may accept a WTRU's requests (in PDU session modification request messages) to add/remove inner addresses, only if this flag was set. For example, if a reactive method is used, SMF1 may configure a traffic filter with a wildcard IP/MAC in WTRU and UPF, to ensure that traffic from unknown source addresses are forwarded to the SMF for a decision to allow/disallow this traffic. The SMF may buffer this traffic and re-send to UPF if it is allowed.

Then, at 404, SMF1 may register association tuples (e.g., WTRU1's inner MAC/IP address, SMF1 ID and/or UPF1 ID, 5GLAN network ID, etc.) with a 5GLAN communication service, for all allowed/allocated inner addresses. Here and in other steps and procedures herein where those association tuples are used, inner MAC/IP addresses may be replaced or complemented with packet filter entries. A packet filter, as used in 5G signaling, can include address, subnet, ports, and other fields describing traffic flows. For example, this can enable multiple inner addresses to correspond to a single tuple including a packet filter matching flows to/from an IP subnet. SMF1 may configure UPF1 to forward the new flows.

Then, at 405, SMF1 may send a PDU session establishment accept message including a list of allowed inner MAC/IP addresses, some of which may have been allocated by the network. That is, at 405, WTRU1 may receive the PDU session establishment accept message.

Then, at 406, 5GLAN may update UPF2/SMF2 with the new association tuples (e.g., WTRU1's inner MAC/IP address, SMF1 ID and/or UPF1 ID, 5GLAN network ID, etc.). That is, the new association tuples are now available at the 5GLAN communication service and may be requested from now on by any UPFs/SMFs wishing to forward 5GLAN traffic towards a WTRU1 inner address. Depending on the 5GLAN network configuration, updated tuples may be sent to all or some UPFs/SMFs participating in the 5GLAN network. For example, the 5GLAN communication service may send the new association tuples to any UPF/ SMF that previously subscribed to and/or requested tuples related to an inner address within this tuple. For example, SMF2 can derive (or directly obtain if it is present in the tuple) packet filter information from a tuple, and use it to configure UPF2 and possibly communicate it to WTRU2 as well (e.g. WTRU2 may use this information to configure local forwarding tables, and/or advertise reachability information to local VMs or locally attached devices).

At this point, as shown at 421, 5GLAN communication is enabled. For example, WTRU1-WTRU2 communication in 5GLAN VN (i.e. IP packets using inner IP addresses of WTRU1 and WTRU2, or Ethernet frames using inner MAC addresses of WTRU1 and WTRU2) is carried over the UPF1-UPF2 connection, e.g. is carried in encapsulated packets between UPF1 and UPF2.

Then, at any point in time, e.g., at 407, WTRU1 may determine the need to add or remove an inner IP/MAC address to the 5GLAN connection. For example, in a case where WTRU1 provides access to the 5G network and acts as a bridge or router for locally attached devices, a locally attached device may be turned on or off (and in a case where WTRU1 hosts VMs, a VM may be started or stopped).

Then, at 408, WTRU1 may send a PDU session modification request message including a 5GLAN network ID/name, and inner MAC/IP address(es). This session modification request message may include the same PDU session ID as the PDU session created in steps described above. The purpose of this message is to request some MAC/IP address(es) to be either added or removed from the allowed 5GLAN addresses, which will require not only updating the traffic filters on the UPF, but also reconfiguring the 5GLAN network so that remote PSA UPFs and remote NVEs are aware of the change in reachability through UPF1 (i.e. new addresses become reachable through UPF1, and removed address are no longer reachable through UPF1).

In another example, the inner MAC/IP address(es) may include all inner addresses previously used in this PDU session, minus all inner address(es) that need to be removed and including all inner address(es) that need to be added. If an added inner address needs to be allocated, an empty inner address information element or equivalent may be used to indicate that the network should allocate one.

In another possible example, WTRU1 may use the packet filter format (e.g. as part of QoS rules sent in the PDU session modification request) to encode inner MAC/IP addresses that need to be added/removed, which is encoded using the associated packet filter operation field ("add" or "delete", respectively). As discussed above, WTRU1 may request address allocation using "add and allocate" operation, or "add" operation associated with a special address value.

Then, at 409, SMF1 may request that the 5GLAN communication service verifies new inner address(es) are allowed, and if needed allocates inner address(es). Then, at 410, SMF1 may communicate added and removed association tuples to the 5GLAN communication service. SMF1 may configure UPF1 to allow traffic to/from new addresses and disallow traffic to/from removed addresses. Then, at 411a, SMF1 may send a PDU session modification command message including an updated list of allowed inner MAC/IP addresses (e.g. encoded as packet filters in QoS rules associated with the operation "add" or "delete"), some of which may have been allocated by the network. That is, at 411a, WTRU may receive the PDU session modification command message. Optionally, or alternatively, at 411b, WTRU1 may update local traffic filters/forwarding rules to reflect added/removed MAC/IP addresses: packets/frames from added source addresses should be forwarded over the existing PDU session; or Packets/frames from removed source addresses may for example be dropped (although the WTRU may locally take a decision to, e.g. carry this traffic over another PDU session or network interface). If applicable, WTRU1 may also configure allocated addresses. Optionally or alternatively, at 411c, WTRU1 may send a PDU session command acknowledgment.

Then, at 412, 5GLAN may update UPF2/SMF2 with the modified/new association tuples. That is, the updated set of association tuples are now available at the 5GLAN communication service and may be requested from now on by any UPFs/SMFs wishing to forward 5GLAN traffic towards a WTRU1 inner address. Depending on the 5GLAN network configuration, new/removed tuples may be communicated to all or some UPFs/SMFs participating in the 5GLAN network. For example, the 5GLAN communication service may communicate added or removed tuples to any UPF/SMF that previously subscribed to and/or requested tuples related to an inner address within this tuple. From this point on, as shown at 422, 5GLAN communication continues for both unaffected and new inner addresses, that is, WTRU1-WTRU2 communication in 5GLAN VN may be carried over the UPF1-UPF2 connection, using the updated set of inner MAC/IP address(es).

At any point in time, at 413, the 5GLAN communication service may decide to add or remove one or more inner address(es) from WTRU1 and communicates its decision to UPF1 and/or SMF1 (e.g. using a direct message to SMF1 or using an indirect message to SMF1 through UPF1).

Then, at 414a, SMF1 may initiate a PDU session modification, which includes sending a PDU session modification command to WTRU1 (through the AMF and the RAN). This message includes all inner MAC/IP address(es) which are still allowed on the PDU session, which therefore excludes the MAC/IP address(es) that SMF1 may wish to remove. SMF1 should also update the configuration of UPF1 to remove the affected flows prior to or after this step (not shown). In an example, SMF1 may use the packet filter format (e.g. as part of QoS rules sent in the PDU session modification command) to encode inner MAC/IP addresses that need to be added/removed.

In a case where SMF1 would need to remove all inner addresses from a 5GLAN connection, SMF1 may alternatively send a PDU session release command to release the PDU session. Optionally or alternatively, at 414b, WTRU1 may update local traffic filters/forwarding rules to reflect added/removed MAC/IP addresses. Also, at 414c, WTRU1 may send a PDU session command acknowledgment.

Then, at 415, 5GLAN may update UPF2/SMF2 with the removed association tuples. That is, the updated set of association tuples is now available at the 5GLAN communication service and may be requested from now on by any UPFs/SMFs wishing to forward 5GLAN traffic towards a WTRU1 inner address. Depending on the 5GLAN network configuration, removed tuples may be communicated to all or some UPFs/SMFs participating in the 5GLAN network. For example, the 5GLAN communication service may communicate removed tuples to any UPF/SMF that previously subscribed to and/or requested tuples related to an inner address within this tuple. From this point on, as shown at 423, 5GLAN communication continues for all unaffected inner addresses, that is, WTRU1-WTRU2 communication in 5GLAN VN may be carried over the UPF1-UPF2 connection, using the updated set of inner MAC/IP address(es).

In the procedure above (corresponding to FIG. 4), inner MAC/IP addresses can be transmitted over PDU session modification request/command messages using existing packet filters specifications (as part of QoS rules), and/or using new information elements (e.g. MAC/IP address associated with an "add" or "remove" operation). When using the first solution, those packet filters can have the desired granularity (e.g. individual IP/MAC addresses, or whole IP subnets). The packet filters can be transmitted to other anchor UPFs involved in the 5GLAN network, therefore enabling 5GLAN routing in distributed 5GLAN architecture. As a limitation, it may difficult to remove a given IP address from a PDU session, if the corresponding packet filter is a whole subnet (in this case, this single packet filter would need to be replaced with one filter per allowed source address). In cases with a lot of WTRUs use indirect communication, this can translate into many packet filters. On the other side, using the second solution (i.e., a new information element), enables reducing the number of packet filters using subnets and wildcards while enabling a strict control of 5GLAN inner addresses reachability, since 5GLAN members reachability is handled separately from packet filters.

In an alternative, the WTRU may directly send traffic using a new IP or MAC address as source address over the existing PDU session (in addition to any other traffic) as opposed to using a PDU session modification to add a new IP address to an existing PDU session.

The UPF, perhaps using traffic filters, policies provided by the SMF and the new "dynamic address support" flag, obtained during the PDU session establishment request procedure, may decide to accept this traffic and let it through. If this traffic is not allowed (e.g. SMF/UPF may allow for a total number of IP addresses to be carried, based on subscription profile or operator policies), the UPF (possibly in communication with SMF) may drop the packets and SMF/UPF may send back a control message informing the WTRU that this traffic is blocked. For example, a SMF/UPF may send a PDU session modification command message with a QoS rule including a packet filter identifying the packet source address, with the packet filter operation "delete". The WTRU may then take appropriate action, e.g. send an ICMPv6 "destination unreachable" message to the sender when applicable (e.g. if the sender is an external device); e.g. notify the sender application; e.g. request the establishment of a new PDU session to carry this traffic.

Similarly, if at some point the network determines to remove an IP address from the set of IP addresses carried over the 5GLAN PDU session, the network may start dropping packets to/from this address and send a control message to the WTRU. A possible use case for this occurrence could be that the network administrator identified unusual traffic on those IP addresses and it wishes to decommission them due to security concerns.

A new control message is proposed that may be sent by SMF/UPF, either over the user plane, using the existing PDU session itself, or over the 5G control plane, e.g. as a new NAS message from the SMF to the WTRU. This message indicates that a source IP or MAC address sent by the WTRU over a PDU session is not allowed by the 5G system (and in option 1 and 2 could also be used for acknowledging that a new source IP/MAC address was allowed). Proposed implementations are the following.

In option 1, the proposed control message is a PDU session modification command including a QoS rule with a packet filter including the source MAC or IP address of the invoking/offending packet/frame, associated with a new packet filter operation "drop". Alternatively, the existing operation "delete" may be used, and interpreted as follows since it does not correspond to an existing packet filter. Upon reception the WTRU can configure its forwarding rules to ensure that the invoking MAC or IP address is not forwarded over the PDU session (e.g. the forwarding rule could ensure that the sender receives an ICMP unreachable message, or equivalent notification).

In option 2, the proposed control message is to be carried over the control plane as a new NAS message from SMF to the WTRU through AMF and the RAN. The message should include the source MAC or IP address of the invoking/offending packet/frame, as well as a message type field indicating the nature of the message as "source address failed 5G egress policy".

In option 3, the proposed control message is to be carried over the PDU session it applies to: in IP-type 5GLAN case, the existing ICMPv6 message type 1 code 5 (destination unreachable, source address failed ingress/egress policy) can be used, as specified in RFC 4443; or in Ethernet-type 5GLAN case, we propose to adapt the ICMPv6 message type 1 code 5. The message header (type, code, checksum and unused sections, with a total of 64 bits) is left unchanged. The rest of the message body carries as much of the invoking Ethernet frame without the ICMPv6 packet exceeding the IPv6 MTU. As opposed to the original format, therefore it is proposed to carry the beginning of the invoking Ethernet frame instead of the IPv6 offending/invoking packet.

Figure 5:
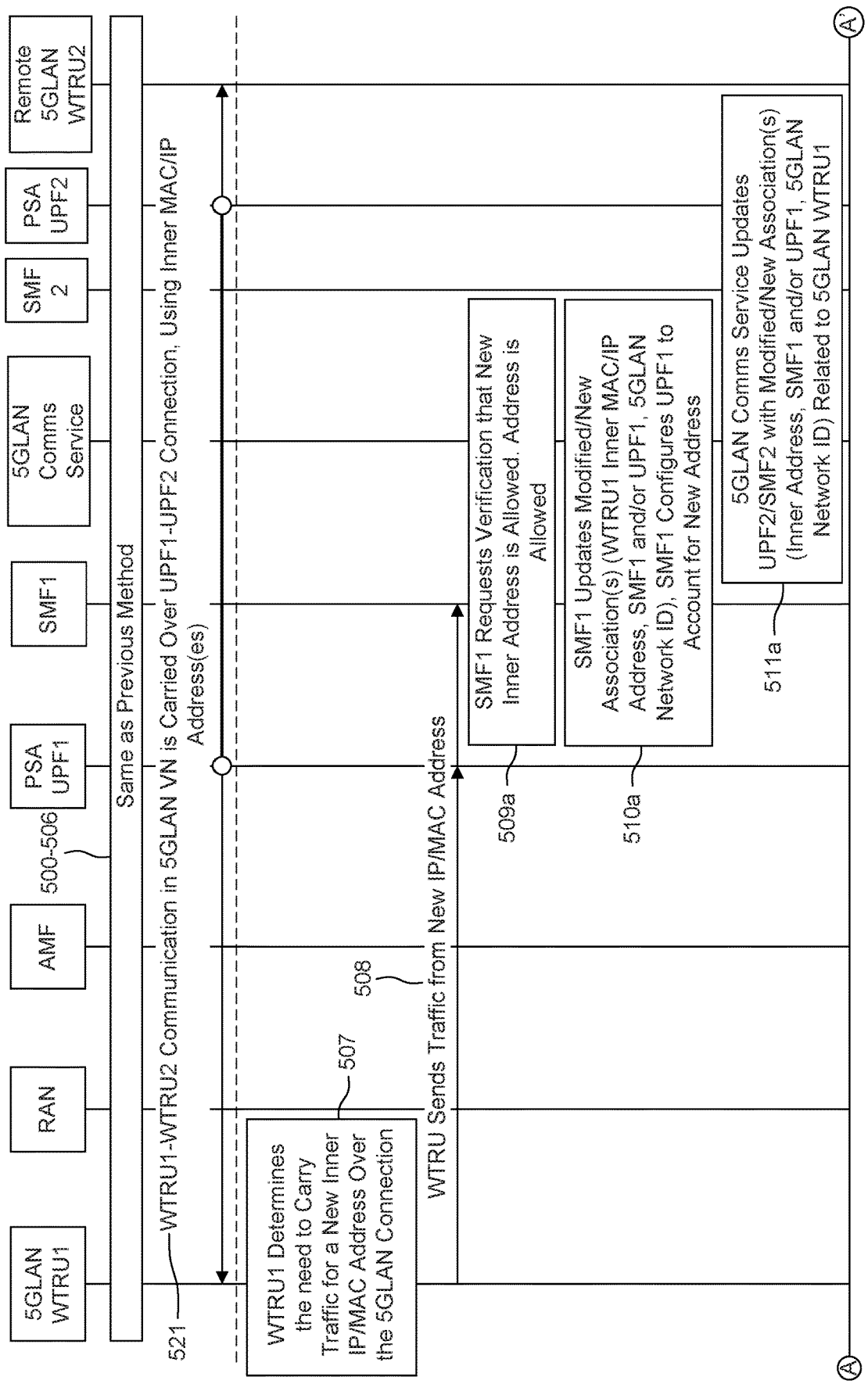
FIG. 5 shows another example of dynamically adding and/or removing inner addresses to an ongoing 5GLAN connection.
Figure 5:
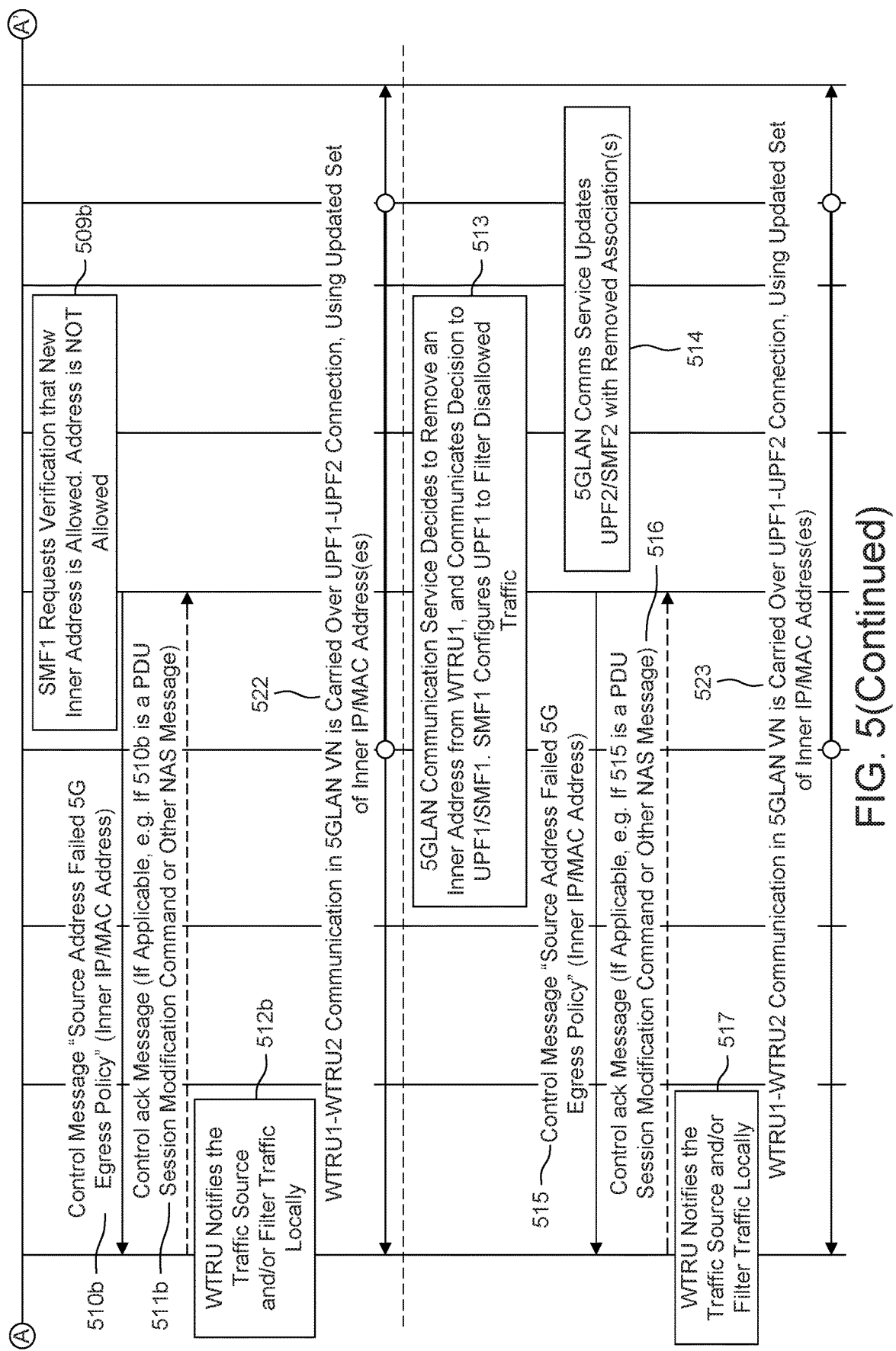

FIG. 5 shows an example procedure using the proposed control message. The processes at 501-506 represent those initial 5GLAN connection setup processes, and those processes may be the same as described with respect to the processes at 401-406 in FIG. 4. Then, as shown as 521, WTRU1-WTRU2 communication in 5GLAN VN may be carried over the UPF1-UPF2 connection, using the inner MAC/IP address(es).

Starting at 507, at any point in time, WTRU1 may determine the need to carry traffic for a new inner IP/MAC address over the 5GLAN connection. For example, in a case where WTRU1 provides access to the 5G network and acts as a bridge or router for locally attached devices, a locally attached device may be turned on or off (and in a case where WTRU1 hosts VMs, a VM may be started or stopped).

At 508, WTRU may send traffic using the new IP/MAC address as source address, over the 5GLAN PDU session. The UPF may forward the packet/frame to SMF based on its forwarding rules, or otherwise inform the SMF of the usage of a new source address.

Then, at 509*a*/509*b*, the SMF may verify if the new source address should be allowed (e.g. from policy, subscription profile, using the 5GLAN communication service, etc.)

If the new address is allowed (e.g., at 510*a* and 511*a*): at 510*a*, SMF1 may communicate added and removed association tuples to the 5GLAN communication service. SMF1 may configure UPF1 to allow traffic to/from new address. At 510*b*, the updated set of association tuples is now available at the 5GLAN communication service and may be requested from now on by any UPFs/SMFs wishing to forward 5GLAN traffic towards a WTRU1 inner address. Depending on the 5GLAN network configuration, new/removed tuples may be communicated to all or some UPFs/SMFs participating in the 5GLAN network. For example, the 5GLAN communication service may communicate added or removed tuples to any UPF/SMF that previously subscribed to and/or requested tuples related to an inner address within this tuple.

If the new address is not allowed (e.g., at 510*b*, 511*b* and 512*b*): at 510*b*, SMF may send control message "source address failed 5G egress policy" including the target inner IP/MAC address. As discussed above, this message may be sent over the PDU session or over the control plane, e.g. as a NAS message. Then if applicable, e.g. if at 510*b* was using a NAS message, at 511*b*, the WTRU may send an acknowledgement message back. Then, at 512*b*, WTRU sends/forwards ICMPv6 unreachable message to the original sender of the packet when applicable (e.g. if the sender is an IP host), or notify the sender using other means. WTRU may set up a local traffic filter to block uplink traffic using the removed address as source.

From this point on, as shown at 522, 5GLAN communication continues for unaffected addresses (case a and b) and any new allowed address (case a), that is, WTRU1-WTRU2 communication in 5GLAN VN may be carried over the UPF1-UPF2 connection, using the updated set of inner MAC/IP address(es).

At any point in time, for example at 513, the 5GLAN communication service may decide to disallow an inner address from WTRU1 and communicates its decision to UPF1 and/or SMF1 (e.g. using a direct message to SMF1 or using an indirect message to SMF1 through UPF1). SMF1 configures UPF1 to start filtering disallowed traffic.

Then, at 514, 5GLAN Communications Service may update UPF2/SMF2 (and any other UPF/SMF or NVE involved in the 5GLAN network) with removed association(s). Then, at 515, SMF may send one of the control message defined above, including the offending/invoking inner IP/MAC address. As discussed above, this message may be sent over the PDU session or over the control plane, e.g. as a NAS message.

In a case where SMF1 would need to remove all inner addresses from a 5GLAN connection, SMF1 may alternatively send a PDU session release command to release the PDU session (not shown in the message flow diagram). If applicable, e.g. if a NAS message was used at 515, then at 516, the WTRU may send an acknowledgement message back. Then, at 517 (similar to the process at 512*b*), the WTRU may notify the traffic source and/or filter traffic locally. From this point on, as shown at 523, 5GLAN communication continues for all unaffected inner addresses, that is, WTRU1-WTRU2 communication in 5GLAN VN may be carried over the UPF1-UPF2 connection, using the updated set of inner MAC/IP address(es).

Both methods described in with respect to FIGS. 4 and 5 may enable a dynamic handling of 5GLAN addresses, albeit with different tradeoffs. The first method is proactive, and therefore may add a short latency prior to carry traffic from a new source address. On the other side, it enables a more complete set of capabilities: both the WTRU and the network may trigger adding or removing an inner address. The second method is reactive, and therefore has the potential to introduce a shorter initial latency. On the other side, some operations such as removing a source address from the WTRU, may not be easily implemented using this scheme (e.g. perhaps using inactivity timers). Both methods may be used concurrently, depending on the needs for a connection, e.g. based on WTRU configuration or operator policy.

The methods and the WTRUs which may support efficient VM migration according to this application will be described as follows with reference to FIGS. 5-11. The following description will first describe VM migration from a WTRU to another WTRU via a 5GLAN with reference to FIGS. 5-7. Then, VM migration between a WTRU and a datacenter server via both a 5GLAN and a virtual network will be illustrated with reference to FIGS. 8-11.

Those use cases to which the methods and the WTRUs supporting efficient VM migration according to this application may be applied will be described as follows. A WTRU (e.g. a phone or a customer premise equipment such as a home router, game console, etc.) in the 5GLAN is virtualized to be able to communicate with the 5G network in relation to multiple identities/subscriptions. This is implemented using virtualization on the WTRU hardware. A single "system" VM may run essential services, e.g. low-level radio access network control softwares. The system VM may own a radio access network interface and exposes it as a communication channel to other VMs. Other "non-system" (also known as "host") VMs are each tied to a given subscription, and host some components of the 5G stack, including subscription-specific services, e.g. related to authentication. These host VMs also hold applications that will be used in association with the subscription attached to the VM. Multiple host VMs may be associated with a same subscription, e.g. to enable a strong isolation between some applications. Host VMs may be migrated from one WTRU to another, e.g. to save battery and/or follow a user. In a variant a host VM may be used to hold fog/cloud RAN components that the operator wishes to run on the WTRU (and that may be migrated in the network in some scenarios).

A WTRU is connected to a game or other graphical-intensive application service running in a datacenter (e.g. deployed in the cloud or in the mobile network). Multiple game clients, including WTRUs, are connected to each other and to multiple servers, over a 5GLAN VN. Tasks such as graphic rendering are performed on the WTRU or on a datacenter server, depending on latency, battery, location and other conditions. VM migration can be used to move graphic rendering between the WTRU and locally available WTRUs or servers. VM migration may also be used between different locally available WTRUs or servers, e.g. to follow the WTRU along the path of the user between metro stations.

In a similar use case, WTRUs may be connected to a cloud game application service or other interactive application services which may be connected to a mini-datacenter deployed at home. The cloud game application is designed as a set of VMs, some of which can run on a hypervisor located on server or on a WTRU. The control of VMs deployment across WTRUs and mini-datacenter servers, and their migration when needed, may be performed by the application, a network operator, or a third-party service.

In another use case, WTRU A and WTRU B (e.g. smartphones, vehicles, fixed WTRUs, etc.) both provide 5GLAN connectivity to other WTRUs, respectively through different anchors PSA1 and PSA2, accessed through same or different base stations. WTRU C crosses paths with WTRU A first, obtains 5GLAN connectivity through it, and then moves closer to WTRU B. WTRU C's 5GLAN connectivity may be transferred from WTRU A to WTRU B. This use case is therefore very similar to a VM migration use case, despite not using virtualization and VMs. The methods described in the present application using virtualization and VM-related language, can therefore apply in the "router/bridge WTRU re-allocation" (previously defined in this application) case as well.

The general principle of the methods and the WTRUs according to this application will be generally described as follows. A tenant system interface identifier (TSI ID), which may facilitate VM migration via 5GLAN or a combination of 5GLAN and VN, is proposed. For example, as shown in FIG. 2, in order to migrate a VM between WTRU 1 and WTRU 2, PDU sessions (not shown) may be needed between WTRUs and the backbone network. The TSI ID is an element of 5GLAN information elements (IEs). It may be included in PDU session request messages, PDU session response messages, PDU session modification request messages and PDU session modification command messages. These above-mentioned messages will be described with reference to detailed embodiments below. The TSI ID may be included in a TSI ID field in the above-mentioned messages. In some embodiments, there is a value in the TSI ID field if the TSI ID has already been generated. In other embodiments, the TSI ID field is an empty field, that is, the TSI ID is empty, and the TSI ID may be generated later. It should be noted that although the TSI ID may be empty, the TSI ID field regarding the TSI ID should be included in the above-mentioned messages so that the TSI ID may be generated and included into that field later. In this application, unless indicated otherwise, the terms TSI ID and TSI ID field may be used interchangeably. Since the TSI ID in this application may be used for VM migration in a 5GLAN scenario, the terms "TSI ID" and "5G TSI ID" may be used interchangeably.

In an embodiment, the TSI ID may be unique within a 5GLAN network to facilitate VM migration. It may be allocated by the 5GLAN network or a WTRU in the 5GLAN. For example, the TSI ID may be a random number or string generated by a 5GLAN Communication Service component (e.g., SMF, AMF, etc.) and guaranteed by this component to be unique within the 5GLAN network. The TSI ID may also be generated by a hypervisor located on a WTRU. For example, the TSI ID may be generated by a hypervisor located on WTRU 1 shown in FIGS. 2-3. Detailed embodiments of VM migration within a 5GLAN network will be described below with reference to FIGS. 2-3 and FIGS. 6A-6B. In this application, unless indicated otherwise, the terms "5GLAN communication service" and "5GLAN" may be used interchangeably.

In an embodiment, the TSI ID may be unique within both a 5GLAN network and a VN to facilitate VM migration within the 5GLAN network and the VN. It may be allocated by the 5GLAN network, the VN or a WTRU. For example, the TSI ID may be a random number or string generated by a 5GLAN Communication Service component (e.g., SMF, AMF, etc.) and guaranteed by this component to be unique within the 5GLAN network. The TSI ID may also be generated by a hypervisor located on a WTRU. The TSI ID may also be generated by a VN component (e.g., NVA, NVE, etc.). The TSI ID may be used to identify a specific tenant system interface (TSI) over the point-to-point connection between a PSA UPF and an NVE. It may also be used to manage the VM connection to the VN, including managing VM state and adding or removing addresses on the interface. A local tag may be negotiated between PSA UPF and NVE, to associate data plane traffic between a particular TSI and VN to this local tag (e.g., a VLAN tag or another label). Detailed embodiments of VM migration within both a 5GLAN network and a VN will be described with reference to FIG. 3 and FIGS. 8-11.

If the TSI ID is unique in the 5G network or in a combination of the 5G network and the VN, it may be used to match a connection from a migrated VM (e.g., VM running on WTRU2 shown in FIGS. 2-3) with an older connection from the same VM at a previous location (e.g., VM running on WTRU1 shown in FIGS. 2-3). Therefore, the purpose of supporting or facilitating VM migration will be achieved. It should be noted that the above-mentioned examples of generating the TSI ID are not intended to be exclusive or be limiting to the present application. The TSI ID may be generated by other methods as long as they may help to realize the principle of this application.

In another embodiment, the TSI ID may not be unique within a 5GLAN network or within a combination of a 5GLAN and a VN. In that case, other matching elements may be used, e.g. a combination of WTRU identity (which would need to be provided to NVE, e.g. as a GPSI), hot migration flag and/or IP/MAC addresses. The following description will further describe those scenarios where the TSI ID is not unique.

A WTRU, which does not wish to support VM migration, may refrain from using the TSI ID in PDU session establishment/modification related messages. A WTRU (e.g., WTRU 1) wishing to support VM migration may include a TSI ID in the above-mentioned PDU session messages. Inner addresses are associated with a TSI ID in this case, e.g. inner addresses listed after a given TSI ID in a message are associated with this TSI ID. A second WTRU (e.g., WTRU 2) may later send a new PDU session establishment or modification request message including the same TSI ID, to indicate to the 5GLAN network that a VM migration took place, and that from now on 5GLAN traffic associated this TSI ID (i.e. associated to inner addresses attached to this TSI ID) should be forwarded to/from the second WTRU. VM migration may be allowed on a per-5GLAN network and/or per-WTRU basis, e.g. through the subscription profile. As discussed above, both VM migration use cases and "router/bridge WTRU re-allocation" use cases may benefit from using this 5G TSI ID.

It should be noted that one or more tenant systems may be associated with a PDU session. Moreover, multiple inner addresses may be associated with a TSI ID, and multiple TSI IDs may be associated with a VM (e.g. a VM that uses 2 network interfaces to communicate could be associated with 2 TSI IDs). In this application, in order to make a clear description, one particular tenant system (i.e., the VM) will be described as an example of the tenant systems associated with a PDU session created by WTRU 1, and will be associated with TSI ID1, for example. After the VM migration from WTRU 1 to WTRU 2, the VM will be described as an example of tenant systems associated with the second PDU session created by WTRU 2, and will still be associated with TSI ID1. It will be appreciated that the above VM example is not intended to be limiting to the number of tenant systems associated with a PDU session.

It should be noted that the type of VM migration which the methods and the WTRUs according to this application will facilitate is hot VM migration. A common distinction between cold migration and hot VM migration may be referred to herein. In a cold migration, a VM is powered off, before transferring the VM to another host. In a hot migration, operating system (OS) and applications on a VM are not suspended during the migration operation, e.g. the migration event is typically not noticed by/exposed to OS and applications. This difference is important for the network: in a cold migration, there is a time gap between the moment where the VM disconnects and reconnects from the network, while in a hot migration, the VM may reconnect from its new location before its earlier connection is dropped. Buffering and forwarding of in-flight packets may be necessary in this case, to minimize the impact of the migration on ongoing applications.

The above-mentioned PDU session messages may also be used to set or change the 5G TSI states in the network, e.g. between associated and activated states. The following description will further describe the 5G TSI states and their functions in this application.

Figure 6A:
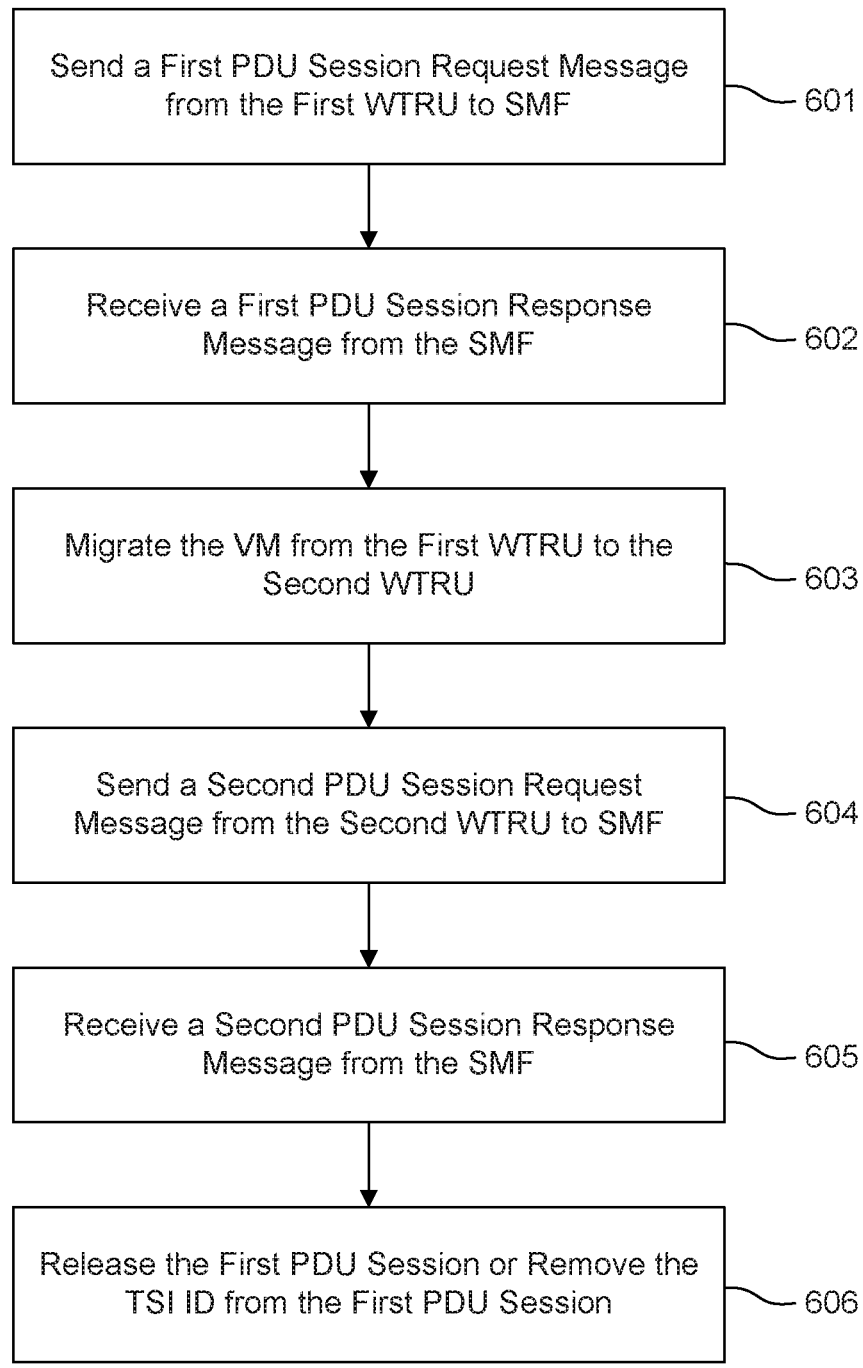
FIG. 6A is a flow chart of the method for supporting VM migration according to an embodiment of this application.
Figure 6B:
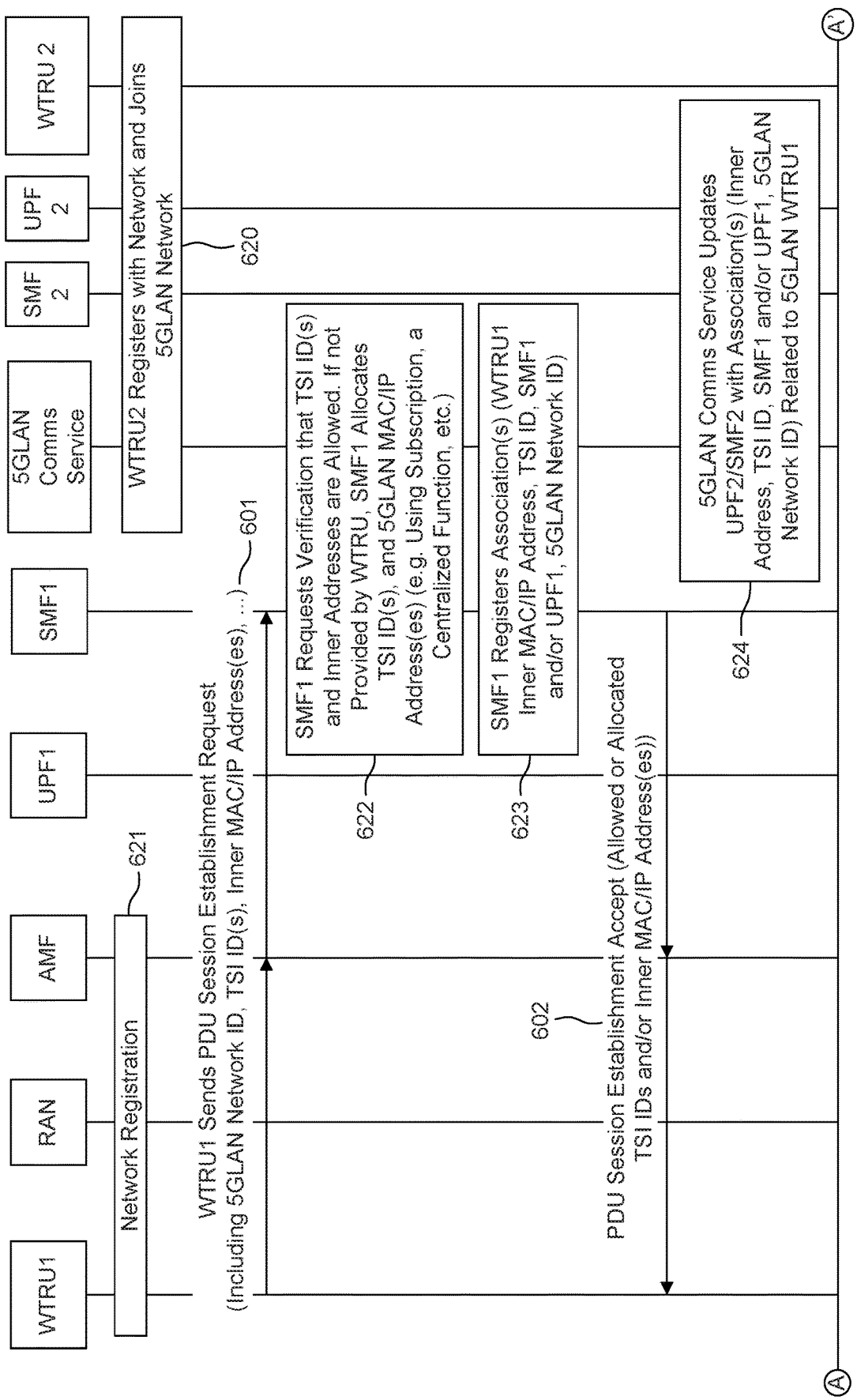
FIG. 6B shows an example flow diagram for hosting VMs and enabling VM migration.
Figure 6B:
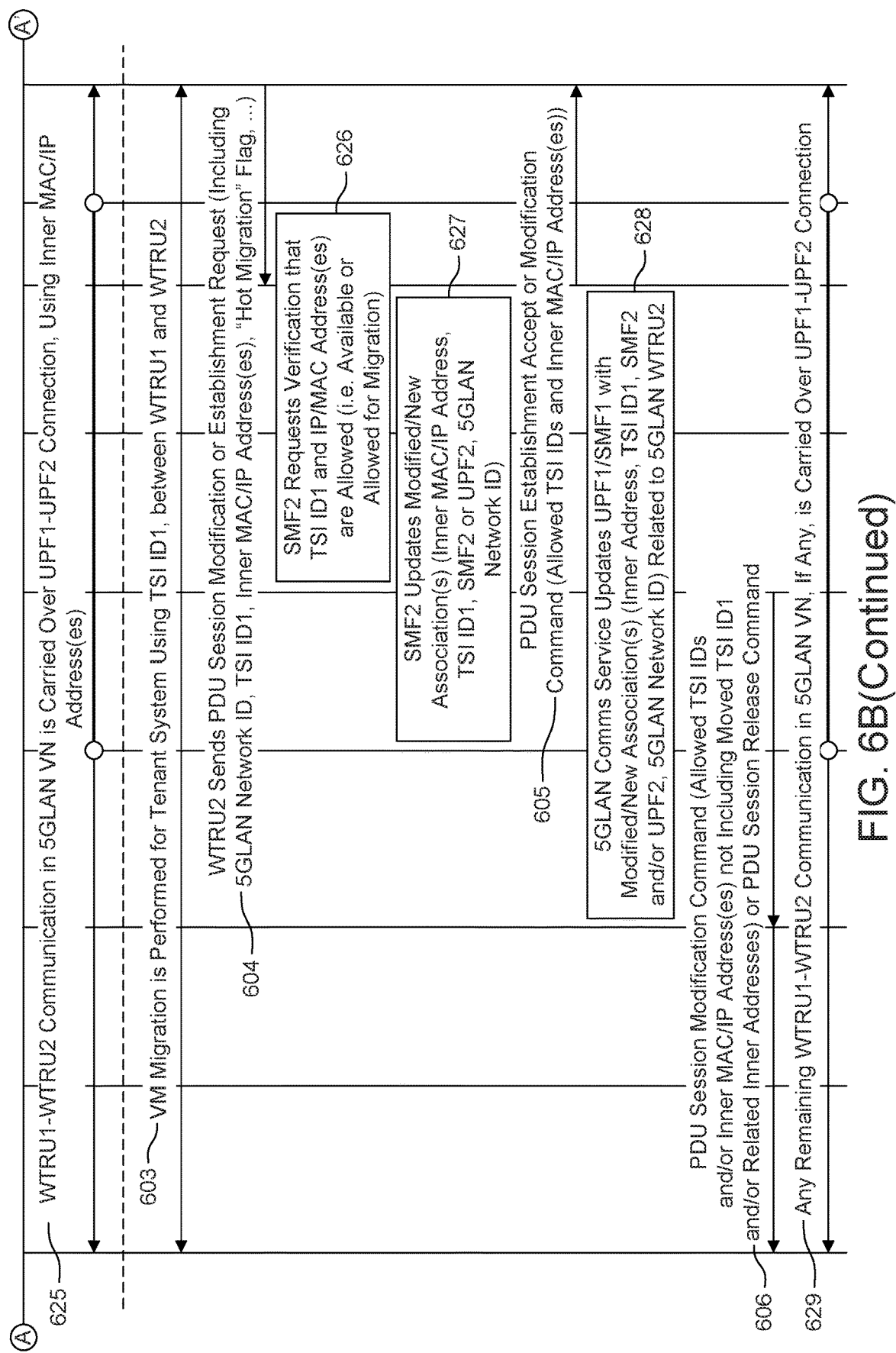

The method 600 according to this application will be described below with reference to FIG. 6A and FIG. 6B. FIG. 6A is a flow chart illustrating those processes in the method 600. The method 600 may support VM migration between WTRUs (e.g., WTRU 1 and WTRU 2) via a 5GLAN. To be more specific, WTRU 1 is a host of a VM and it initially joins a 5GLAN network and then later migrates this VM to WTRU 2. FIG. 6B illustrates a message sequence of the method 600 shown in FIG. 6A. In order to make a clear description, WTRU 1 may also be referred to as the first WTRU, and WTRU 2 may also be referred to as the second WTRU. Each of the WTRUs may comprise a transmitter, a receiver, and a processor to process and/or generate commands, messages (e.g., a PDU session request message), or 5G traffic. The following description will further describe those components in the WTRUs with reference to detailed embodiments.

As shown in FIG. 6A, the method 600 may comprises: at 601, sending a first PDU session request message from the first WTRU to a session management function (SMF) of the 5GLAN, the first PDU session request message comprising a TSI ID identifying the VM; at 602, receiving a first PDU session response message from the SMF so as to establish a first PDU session between the first WTRU and the 5GLAN; at 603, migrating the VM from the first WTRU to the second WTRU; at 604, sending a second PDU session request message from the second WTRU to the SMF, the second PDU session request message comprising the TSI ID; at 605, receiving a second PDU session response message from the SMF so as to establish a second PDU session between the second WTRU and the 5GLAN; and at 606, releasing the first PDU session or removing the TSI ID from the first PDU session.

Accordingly, a WTRU (e.g., WTRU2 shown in FIGS. 2 and 6B) according to this application may comprise a transmitter and a receiver, wherein the WTRU is configured to connect to a 5GLAN and receive a VM migrated from a first WTRU, wherein a tenant system interface (TSI) ID is associated with the VM. The transmitter is configured to send a PDU session request message to a session management function (SMF) of the 5GLAN, the PDU session request message comprising the TSI ID. The receiver is further configured to receive a PDU session response message from the SMF so as to establish a PDU session between the WTRU and the 5GLAN. Those processes in the method 600 and the WTRU mentioned above may be described in detail as follows.

As shown in FIG. 6A, at 601, the method 600 may comprise sending a first PDU session request message from WTRU1 to a SMF of the 5GLAN, the first PDU session request message comprising a TSI ID identifying the VM. Accordingly, the first WTRU (e.g., a transmitter of the first WTRU) is configured to send a first PDU session request message to a SMF of the 5GLAN system, the first PDU session request message comprising a TSI ID identifying the VM.

The SMF may be any one of SMFs (e.g., SMF 183a and SMF 283b) shown in FIG. 1D. The SMF is a fundamental component of the 5GLAN Architecture. The SMF is primarily responsible for interacting with the other elements of the 5GLAN Architecture (e.g., AMF, UPF, etc.), and creating, updating and removing PDU sessions. The SMF will be further described here and other components of the 5GLAN Architecture will be described below with reference to FIG. 6B.

The number of SMFs involved in the management of a given 5GLAN group might vary in different 5GLAN Architectures desired for the method 600 and the 5GLAN system according to this application. In an embodiment, there may be only one SMF involved in the management of a given 5GLAN group in a 5GLAN Architecture (shown in FIG. 3), and that SMF is responsible for interacting with multiple WTRUs. As shown in FIG. 3, the SMF is responsible for interacting with both WTRU 1 and WTRU 2. In another embodiment, there may be multiple SMFs involved in the management of a given 5GLAN group in a 5GLAN Architecture (shown in FIG. 2), and each of the multiple SMFs is responsible for interacting with one WTRU. As shown in FIG. 2, SMF 1 is responsible for interacting with WTRU 1, and SMF 2 is responsible for interacting with WTRU 2. It should be noted that the above mentioned embodiments of SMFs as well as the 5GLAN Architectures are not intended to be exclusive or be limiting to the present application. The number of SMFs and the design of 5GLAN Architecture may be modified as long as those modifications may help to realize the principle of this application.

In an embodiment, the first PDU session request message may be a PDU session establishment request message (i.e., a first PDU session establishment request message). That is, the first PDU session request message may be used to establish a PDU session between WTRU1 and a backbone network (e.g., the backbone networks shown in FIG. 2 and FIG. 3) in order to set up a connection between WTRU 1 and the backbone network to carry 5GLAN traffic, thereby enabling 5GLAN communication between WTRU 1 and other WTRUs connected to the same 5GLAN group (which may or may not include WTRU2).

Preferably, the first PDU session establishment request message may also be used to set or change a 5G TSI state of a VM running on WTRU1 (e.g., from an associated state to an activated state). That is, the first PDU session establishment request message may further comprise a 5G TSI state of the VM running on WTRU1. The following description will further describe the function and the content of the first PDU session request message with reference to detail embodiments.

In an embodiment, the first PDU session request message may be a PDU session modification request message (i.e., a first PDU session modification request message). That is, the first PDU session request message may be used to modify an existing PDU session between WTRU1 and the backbone network. The first PDU session modification request message can be used to add or remove inner addresses (e.g., IP addresses and MAC addresses) from a 5GLAN connection. The PDU session establishment or modification request messages may also be used to set or change a 5G TSI state of a VM running on WTRU 1 (e.g., from an associated state to an activated state).

It should be noted that the first PDU session request message is corresponding to a first PDU session between WTRU1 and the backbone network. Similarly, in the following description, the second PDU session request message is corresponding to a second PDU session between WTRU 2 and the backbone network. The terms "first" and "second" are only given to differentiate between PDU sessions used by the methods and the 5GLAN systems according to this application, and thus they are not intended to be limiting to the content of each PDU session request message. In this application, unless indicated otherwise, the first PDU session request message may be referred to as the first PDU session request. The following description will further describe the function and the content of the first PDU session request with reference to detail embodiments.

The TSI ID may identify the VM, that is, the TSI ID may represent a connection to the VM running on WTRU1. In an embodiment, the TSI ID or the TSI ID field in the first PDU session request message may have a value generated by any one of the methods mentioned above with reference to the general principle of this application. In another embodiment, the TSI ID or the TSI ID field may not have any value, that is, the TSI ID field is empty. The following description will further describe both empty and non-empty TSI ID in details with reference to FIG. 6B.

In an embodiment, the TSI ID may be a "group-scoped PDU session ID" (hereinafter GSPSI) that has the same format as a PDU session ID and may be used as a regular PDU session ID in any existing message and procedure. A GSPSI has the property to be unique within the scope of a group (e.g. a 5GLAN group; all UEs connected to given DNN; or other types of groups). For example, WTRU1 configuration and/or subscription information may include a GSPSI prefix, which is uniquely allocated, e.g. by a network operator, to the subscriber and/or WTRU for a given group. In the WTRU1 configuration and/or subscription information the GSPSI prefix may be associated with IEs (e.g. ID and type) of the group it relates to. The WTRU1 may then generate a PDU session ID by appending a suffix to the GSPSI prefix, thus ensuring that the generated PDU session ID is both unique for this WTRU1 (as usual) and across all UEs connected to this group. A WTRU may use a GSPSI obtained from a given GSPSI prefix for all PDU sessions that are related to this group (e.g. all PDU sessions related to a given 5GLAN group, or DNN). A WTRU may not reuse (e.g., for a given time) a GSPSI in cases where a migration may have occurred for a PDU session associated with this GSPSI.

Preferably, the first PDU session request message may further comprise one or more inner MAC/IP address(es) configured on the network interface used by the VM running on WTRU1. The inner MAC/IP address(es) may be used for carrying 5GLAN traffic to VM(s) running on WTRU1.

Preferably, the first PDU session request message may further comprise a hot migration flag. The hot migration flag may be used to confirm that the use of the TSI ID is voluntary and for the purpose of a hot VM migration. This hot migration flag is not present for cold VM migration, e.g. migration of a powered-off VM, which may not require the same level of support from the 5GLAN communication service.

In an embodiment, the TSI ID is a PDU session ID, and the first PDU session request message may further comprise an information element set. The information element set may comprise at least one of a WTRU ID, a 5GLAN network ID, one or more inner address(es) (e.g., inner MAC/IP address(es)), a hot migration flag, and a TSI state. The information element set will be further described with reference to FIG. 6B.

It should be appreciated that although the above-mentioned preferable embodiments have described the elements comprised in the first PDU session request message, they are not intended to be exclusive or be limiting to the present application. The first PDU session request message may also comprise other elements (described with reference to FIG. 6B) as long as they may help to realize the principle of this application.

Then, the method 600 may proceed to the process at 602. At 602, the method 600 may comprise receiving a first PDU session response message from the SMF so as to establish a first PDU session between WTRU 1 and the 5GLAN. Accordingly, the first WTRU (e.g., a receiver of the first WTRU) is further configured to receive a first PDU session response message from the SMF so as to establish a first PDU session.

The first PDU session response message is corresponding to the first PDU session request message. If the first PDU session request message is the PDU session establishment request message, then the first PDU session response message is a PDU session establishment response message. If the first PDU session request message is the PDU session modification request message, then the first PDU session response message is a PDU session modification command message.

Preferably, the first PDU session response message may comprise the same TSI ID as that in the first PDU session request message. If the TSI ID in the first PDU session request message is empty, then the first PDU session response message may comprise a TSI ID value generated or allocated by other components of the 5GLAN (e.g., SMF, UPF, etc.).

It should be noted that before WTRU1 receives the first PDU session response message, the 5GLAN network my perform multiple processes (shown in FIG. 6B) in order to generate the first PDU session response message. Those processes performed by the 5GLAN network are omitted here in this part of description because the method 600 is mainly focusing on the processes from a WTRU's perspective. The following description with reference to FIG. 6B will describe those processes from 5GLAN's perspective in detail.

At this point, the first PDU session between WTRU1 and the 5GLAN is established and thus a 5GLAN communication is enabled. That is, a 5GLAN connection between the VM running on WTRU1 and the 5GLAN VN to carry 5GLAN traffic is enabled. WTRU2 has already registered with the 5G network at this point and may join the 5GLAN network. In this case WTRU1 and WTRU2 may communicate via the 5GLAN. For example, WTRU1-WTRU2 communication in 5GLAN (i.e. IP packets using inner IP addresses of WTRU1 and WTRU2, or Ethernet frames using inner MAC addresses of WTRU1 and WTRU2) is carried over the UPF1-UPF2 connection, e.g. is carried in encapsulated packets between UPF1 and UPF2 (shown in FIGS. 2-3). Nevertheless, WTRU2 may in other cases not join the 5GLAN at this point, and instead only join it later, after the VM migration.

Then, the method 600 may proceed to the process at 603. At 603, the method 600 may comprise migrating the VM from WTRU1 to WTRU2. Accordingly, the first WTRU may be configured to migrate the VM from the first WTRU to the second WTRU, and the second WTRU may be configured to receive the VM migrated from the first WTRU.

The VM migration at 603 may be performed using one of many different existing techniques, e.g. involving some form of compression based on VM layering (e.g. the lower layers of the VM image may be present on the destination UE/server, and therefore only an ID may be transferred for those layers). For example, the Hypervisor on WTRU 1 may first copy all the memory pages from the VM running on the original host (e.g., WTRU1) to a destination (e.g., WTRU2) while the VM is still running on original host. If some memory pages change (become 'dirty') during this process, they will be re-copied until the rate of re-copied pages is greater than the page dirtying rate. Then, the VM will be stopped on the original host, the remaining dirty pages will be copied to the destination, and the VM will be resumed on the destination. There may be a time gap (as known as "down-time") between stopping the VM on the original host (e.g. WTRU1) and resuming it on destination (e.g., WTRU2), and ranges from a few milliseconds to seconds according to the size of memory and applications running on the VM. Although several examples of the VM migration have been given above, they are not intended to be exclusive or be limiting to the present application. Other available ways of VM migration may be used at 603 as long as they may help to realize the principle of this application.

Then, the method 600 may proceed to the process at 604. At 604, the method 600 may comprise sending a second PDU session request message from WTRU2 to the SMF, the second PDU session request message comprising the TSI ID. Accordingly, the second WTRU (e.g., a transmitter of the second WTRU) is configured to send a second PDU session request message to the SMF, the second PDU session request message comprising the TSI ID.

In an embodiment, the second PDU session request message may be a PDU session establishment request message (i.e., a second PDU session establishment request message). That is, the second PDU session request message may be used to establish a PDU session between WTRU2 and the backbone network (e.g., the backbone networks shown in FIG. 2 and FIG. 3) in order to set up a connection between WTRU2 and the backbone network to carry 5GLAN traffic, thereby enabling 5GLAN communication between WTRU2 and WTRU1. The PDU session establishment request message may also be used to set or change a 5G TSI state of a VM running on WTRU2 (e.g., from an associated state to an activated state). In this application, unless indicated otherwise, PDU session request messages (e.g., the first PDU session request message and the second PDU session request message) may be referred to as PDU session request (e.g., the first PDU session request and the second PDU session request). The following description will further describe the function and the content of the second PDU session request with reference to detailed embodiments.

In an embodiment, the second PDU session request message may be a PDU session modification request message (i.e., a second PDU session modification request message). That is, the second PDU session request message may be used to modify an existing PDU session between WTRU2 and the backbone network. The second PDU session modification request message can be used to add or remove inner addresses (e.g., IP addresses and MAC addresses) from a 5GLAN connection. The second PDU session modification request message (or further PDU session modification request messages) may also be used to set or change a 5G TSI state of a VM running on WTRU 2 (e.g., from an associated state to an activated state).

The second PDU session request message may also comprise the same TSI ID as that in the first PDU session request message. The TSI ID may identify the VM, that is, the TSI ID may represent a connection to the VM running on WTRU 2. The way of generation and the content of the TSI ID is the same as or similar to those counterparts mentioned with reference to the first PDU session request message. Therefore, the detailed description of the TSI ID will not be repeated here.

Preferably, the second PDU session request message may further comprise one or more inner MAC/IP address(es) configured on the network interface used by the VM running on WTRU2. The inner MAC/IP address(es) may be used for carrying 5GLAN traffic to VM(s) running on WTRU2.

Preferably, the second PDU session establishment request message may also be used to set or change a 5G TSI state of the VM running on WTRU2 (e.g., from an associated state to an activated state). That is, the second PDU session establishment request message may further comprise a 5G TSI state of the VM running on WTRU2.

Preferably, the second PDU session request message may further comprise a hot migration flag. The hot migration flag may be used to confirm that the re-use of the TSI ID is voluntary and for the purpose of a hot VM migration. This hot migration flag is not present for cold VM migration, e.g. migration of a powered-off VM, which may not require the same level of support from the 5GLAN communication service, as discussed above (e.g. in a cold VM migration the 5GLAN communication from WTRU1 for this VM may be released before performing the migration, and therefore the TSI ID may not be in active use when used by WTRU2).

In an embodiment, the TSI ID is a PDU session ID, and the second PDU session request message may further comprise an information element set. The information element set may comprise at least one of a WTRU ID, a 5GLAN network ID, one or more inner address(es) (e.g., inner MAC/IP address(es)), a hot migration flag (e.g., the same hot migration flag as that in the first PDU session request message), and a TSI state. The information element set will be further described with reference to FIG. 6B.

It should be appreciated that although the above-mentioned preferable embodiments have described the elements comprised in the second PDU session request message, they are not intended to be exclusive or be limiting to the present application. The second PDU session request message may also comprise other elements as long as they may help to realize the principle of this application. The following description will further describe the function and the content of the second PDU session request with reference to detail embodiments.

Then, the method 600 may proceed to the process at 605. At 605, the method 600 may comprise receiving a second PDU session response message from the SMF so as to establish a second PDU session between WTRU2 and the 5GLAN. Accordingly, the second WTRU (e.g., a receiver of the second WTRU) is further configured to receive a second PDU session response message from the SMF so as to establish a second PDU session.

The second PDU session response message is corresponding to the second PDU session request message. If the second PDU session request message is the above-mentioned second PDU session establishment request message, then the second PDU session response message is a PDU session establishment response message. If the second PDU session request message is the above-mentioned second PDU session modification request message, then the second PDU session response message is a PDU session modification command message.

Preferably, the second PDU session response message may comprise the same TSI ID as that in the second PDU session request message. The second PDU session response message may also comprise the same inner MAC/IP address(es) as the inner MAC/IP address(es) in the second PDU session request message. The second PDU session response message may also comprise the same TSI state as that in the second PDU session request message. The second PDU session response message may also comprise the same information element set as that in the second PDU session request message.

It should be appreciated that although the above-mentioned preferable embodiments have described the elements comprised in the second PDU session response message, they are not intended to be exclusive or be limiting to the present application. The second PDU session response message may also comprise other elements as long as they may help to realize the principle of this application.

It should be noted that before WTRU 2 receives the second PDU session response message, the 5GLAN network might perform multiple processes (shown in FIG. 6B) in order to generate the second PDU session response message. Those processes performed by the 5GLAN network are omitted here in this part of description because the method 600 is mainly focusing on the processes from a WTRU's perspective. The following description with reference to FIG. 6B will describe those processes from 5GLAN's perspective in detailed.

At this point, the second PDU session between WTRU2 and the 5GLAN is established and thus a 5GLAN communication is enable. That is, a 5GLAN connection between WTRU2 and the backbone network to carry 5GLAN traffic. Therefore, 5GLAN traffic may be carried via the second PDU session to/from the migrated VM running on the WTRU2.

Then, the method 600 may proceed to the process at 606. At 606, the method 600 may comprise releasing the first PDU session or removing the TSI ID from the first PDU session. Accordingly, the first WTRU is further configured to release the first PDU session or remove the TSI ID from the first PDU session.

Preferably, releasing the first PDU session may comprise: receiving a PDU session release command message. After receiving the PDU session release command message, WTRU1 may initiate a PDU session release process to release the first PDU session.

Preferably, removing the TSI ID from the first PDU session may comprise: receiving a PDU session modification command message. The PDU session modification command may comprise remaining TSI ID(s) and/or IP/MAC address(es), but not comprise the TSI ID. After receiving the PDU session modification command message, WTRU1 may initiate a PDU session modification process to remove the TSI ID from the first PDU session.

Those above processes in the method 600 will be further described with reference to FIG. 6B. It should be noted that a WTRU according to this application may be able to interact with different elements of the 5GLAN Architecture (e.g., AMF, UPF, SMF, etc.) in order to perform the method 600. In other words, the method 600 may be considered as an interaction between the WTRUs and the 5GLAN components from the WTRUs' perspective. Therefore, in order to make a comprehensive illustration of this interaction, FIG. 6B not only shows the processes performed by the WTRUs (i.e., those processes illustrated in FIG. 6A), but also the ones performed by the 5GLAN components (not illustrated in FIG. 6A). The following description will describe the processes in FIG. 6B from an interaction perspective and skip a detail description of those processes already described with reference to FIG. 6A above.

It should be noted that although, as shown in FIG. 6B, WTRU2 may join the 5GLAN VN before WTRU1 joins it, it's not intended to be exclusive or be limiting to the present application. In an embodiment, WTRU2 may join the 5GLAN VN after WTRU1 joined it. In other words, it's not necessary for WTRU2 to join the 5GLAN VN initially, and WTRU2 may join the 5GLAN VN at anytime as long as the principle of the methods according to this application may be realized by using WTRU1 and WTRU2.

It should be noted that FIG. 6A and FIG. 6B share the same processes 601-606. Those processes with initials 62 (e.g., 620-629) shown in FIG. 6B are the ones performed by the components of the 5GLAN communication service (e.g., RAN, AMF, UPF1, UPF2, SMF1, and SMF2). It will be appreciated that those components of the 5GLAN communication service is the same as or similar to the corresponding ones shown in FIGS. 1A-1D. For example, SMF1 and SMF2 may be same as or similar to SMF 183*a* shown in FIG. 1D. In this application, unless indicated otherwise, the terms "UPF" and "PSA UPF" may be used interchangeably.

As shown in FIG. 6B, at 620, WTRU2 may register with the 5G network and joins a 5GLAN VN, for example, using the same or similar mechanism (including the processes at 601, 622, 623, and 602) through which WTRU1 joins the 5GLAN VN. The processes at 622 and 623 for WTRU2 to join the 5GLAN VN will be further described below.

Then, at 621, WTRU1 may register with the 5G network. Then, at 601, WTRU1 may send a PDU session establishment request message (i.e., the first PDU session request message) including a 5GLAN network ID/name, TSI ID1 (or multiple TSI IDs including the TSI ID1), and one or more inner MAC and/or IP address(es) (hereinafter inner MAC/IP address(es)). In a typical example, a PDU session can be associated with the TSI ID1, representing the connection to the VM running on WTRU1, and the inner MAC/IP addresses configured on the network interface used by the VM. In embodiments where the TSI ID1 are not known by WTRU1, an empty TSI ID information element or equivalent may be used to indicate that the network should allocate one. Similarly, in embodiments where an inner MAC/IP address is needed but not known by WTRU1, an empty inner address information element or equivalent may be used to indicate that the network should allocate one. The empty TSI ID information element may act as a flag that the WTRU1 wishes to use TSI IDs with this PDU session. Alternatively, an explicit flag may be used. A WTRU (e.g., WTRU1) may decide to use a TSI ID or not, based on the actual usage of the 5GLAN connection (e.g., use TSI IDs for VMs and no TSI IDs for other 5GLAN usage; e.g., use TSI IDs for VMs that may be migrated and no TSI IDs for other VMs, etc.).

Then, at 622, upon reception of the message, SMF1 may request verification that the TSI ID1 (or the multiple TSI IDs including the TSI ID1) and inner MAC/IP addresses are allowed. For example, SMF1 may send a verification request to a 5GLAN communication service which maintains a list of used 5G TSI ID(s) and inner MAC/IP addresses in the 5GLAN network. Verification may consist in checking for duplicate IDs and addresses. If an allocation of TSI ID and/or inner address is needed, SMF1 may request such allocation, e.g. from a 5GLAN communication service.

Then, at 623, SMF1 may register association tuples (e.g., the inner MAC/IP address(es) of the WTRU1, TSI ID1 (or the multiple TSI IDs including the TSI ID1), SMF1 ID and/or UPF1 ID, the 5GLAN network ID, etc.) with the 5GLAN communication service, for all allowed/allocated inner addresses. Then, at 602, SMF1 may send to WTRU1 a PDU session establishment accept message (i.e., a first PDU session response message) including a list of allowed TSI IDs including TSI ID1 and/or the inner MAC/IP address(es), some of which may have been allocated by the network. That is, at 602, WTRU1 may receive the PDU session establishment accept message from the SMF1.

Then, at 624, the 5GLAN communication service may update UPF2/SMF2 with the new association tuples. That is, after the process at 624, the new association tuples are now available at the 5GLAN communication service and may be requested from now on by any UPFs/SMFs (e.g., UPF2/SMF2) wishing to forward 5GLAN traffic towards a WTRU1 inner MAC/IP address(es). Depending on the 5GLAN network configuration, the updated association tuples may be sent to all or some UPFs/SMFs participating in the 5GLAN network. For example, the 5GLAN communication service may send the updated association tuples to any UPF/SMF that previously subscribed to and/or requested the tuples related to the TSI ID1 and/or the inner MAC/IP address(es) within the tuples.

At this point, at 625, the 5GLAN communication is enabled. For example, UE1-UE2 communication in 5GLAN VN (i.e. IP packets using inner IP addresses of WTRU1 and WTRU2, or Ethernet frames using inner MAC addresses of WTRU1 and WTRU2) is carried over the UPF1-UPF2 connection, e.g. is carried in encapsulated packets between UPF1 and UPF2.

Then, at 603, a VM migration is performed between WTRU1 and WTRU2. This operation may involve any channel of communication between WTRU1 and WTRU2 and may be an automatic or manual operation. For example, in a mobile or hybrid datacenter scenario, a controller management application may monitor WTRU/hypervisors resource usages and determine to transfer a VM from WTRU1 to WTRU2. Using management application support on WTRU1 and WTRU2, the controller may send a VM migration request message to WTRU1 and/or WTRU2, resulting in the transfer of state information between WTRU1 and WTRU2, and in WTRU2 bringing up the migrated VM. Other techniques may also be used for the VM migration.

To enable communication to/from the migrated VM, at 604, WTRU2 may send a PDU session establishment request message (e.g. if WTRU2 wishes to dedicate a PDU session for traffic to/from this VM), or a PDU modification request message (e.g. if WTRU2 wishes to re-use or share a PDU session). This message may be referred to as the second PDU session request message. This message (i.e., the second PDU session request message) may include the 5GLAN network ID, TSI ID1 (or multiple TSI IDs including TSI ID1) and any inner MAC/IP address(es) associated with the migrated VM and TSI ID1. This message may include an explicit "hot migration" flag information element, e.g. to confirm that the re-use of TSI ID1 is voluntary and for the purpose of a hot VM migration. This flag is not present for cold VM migration, e.g. migration of a powered-off VM, which may not require the same level of support from the 5GLAN communication service, as discussed above (e.g. in a cold VM migration the 5GLAN communication from WTRU1 for this VM may be released before performing the migration, and therefore TSI ID1 may not be in active use when used by WTRU2).

Upon reception of the second PDU session establishment request message, at 626, SMF2 may request verification to the 5GLAN communication service that TSI ID1 (or the multiple TSI IDs including TSI ID1) and the inner IP/MAC address(es) are allowed. The 5GLAN communication service may notice (or confirm, e.g. if an explicit "hot migration" flag was present in the request) that TSI ID1 and the inner IP/MAC address(es) are already in use by WTRU1, and that this is therefore a migration case. The 5GLAN communication service may verify that this migration is allowed (e.g. migration may be allowed on a per-5GLAN and/or per-UE and/or per-subscription basis, and this information may be stored in a 5GLAN service profile in the 5G network) and reply to SMF2.

Then, at 627, SMF2 may update a modified association if WTRU2 sent the second PDU session modification request message at 604, or may update a new association if WTRU2 sent the second PDU session establishment request message at 604. That is, SMF2 may register modified/new association tuples (e.g., WTRU2 inner MAC/IP address(es), TSI ID1, SMF2 ID and/or UPF2 ID, 5GLAN network ID, etc.) with a 5GLAN communication service, for all allowed inner addresses. These tuples replace the tuples registered at 623 and include the same TSI ID and/or the inner MAC/IP address(es). The 5GLAN communication service may obtain SMF1 ID and/or UPF1 ID from the replaced tuples, in order to use them for a communicating once the migration is complete.

Then, at 605, SMF2 may send a PDU session establishment accept message or a PDU session modification command message (i.e., the second PDU session response message) depending on the type of message used at 604. That is, at 605, WTRU 2 may receive the second PDU session response message from the SMF2. This message includes TSI ID1 (or a list of allowed TSI IDs including TSI ID1) and/or inner MAC/IP addresses including the inner MAC/IP addresses related to the migrated VM.

Then, at 628, since a VM migration successfully occurred, the 5GLAN communication service may update UPF1 and/or SMF1 with the modified/new association tuples learned at 627. UPF1 and/or SMF1 may determine that, since TSI ID1 is now attached to WTRU2, a migration occurred. The 5GLAN communication service may additionally provide the modified/new association tuples to other UPFs/SMFs associated with the 5GLAN communication service.

Upon determining that a migration occurred, SMF1 may determine if the PDU session created above is still needed to carry traffic, e.g. for non-5GLAN traffic and/or 5GLAN traffic related to other 5G TSI ID(s) and/or other inner MAC/IP address(es). At 606, SMF1 may decide to modify the PDU session using a PDU session modification command message including only remaining 5G TSI ID(s) and/or IP/MAC address(es). That is, at 606, WTRU1 may receive the PDU session modification command message. Alternatively, at 606, SMF1 may decide to release the PDU session and send a PDU session release command message. In an alternative not represented in the message flow diagram, at 606, WTRU1 may also initiate this PDU session modification or release, based on its local knowledge that a migration occurred.

Upon reception of the message, WTRU1 may, if needed, complete the VM migration process (e.g. by un-boarding the migrated VM). Then, at 629, if WTRU1 still carries VMs connected to the same 5GLAN network, UE1-UE2 communication may continue to be carried over the UPF1-UPF2 connection. If WTRU1 does not carry other VMs connected to the 5GLAN network, then at this point WTRU1 may not have any PDU session carrying traffic over this 5GLAN network.

Figure 7:
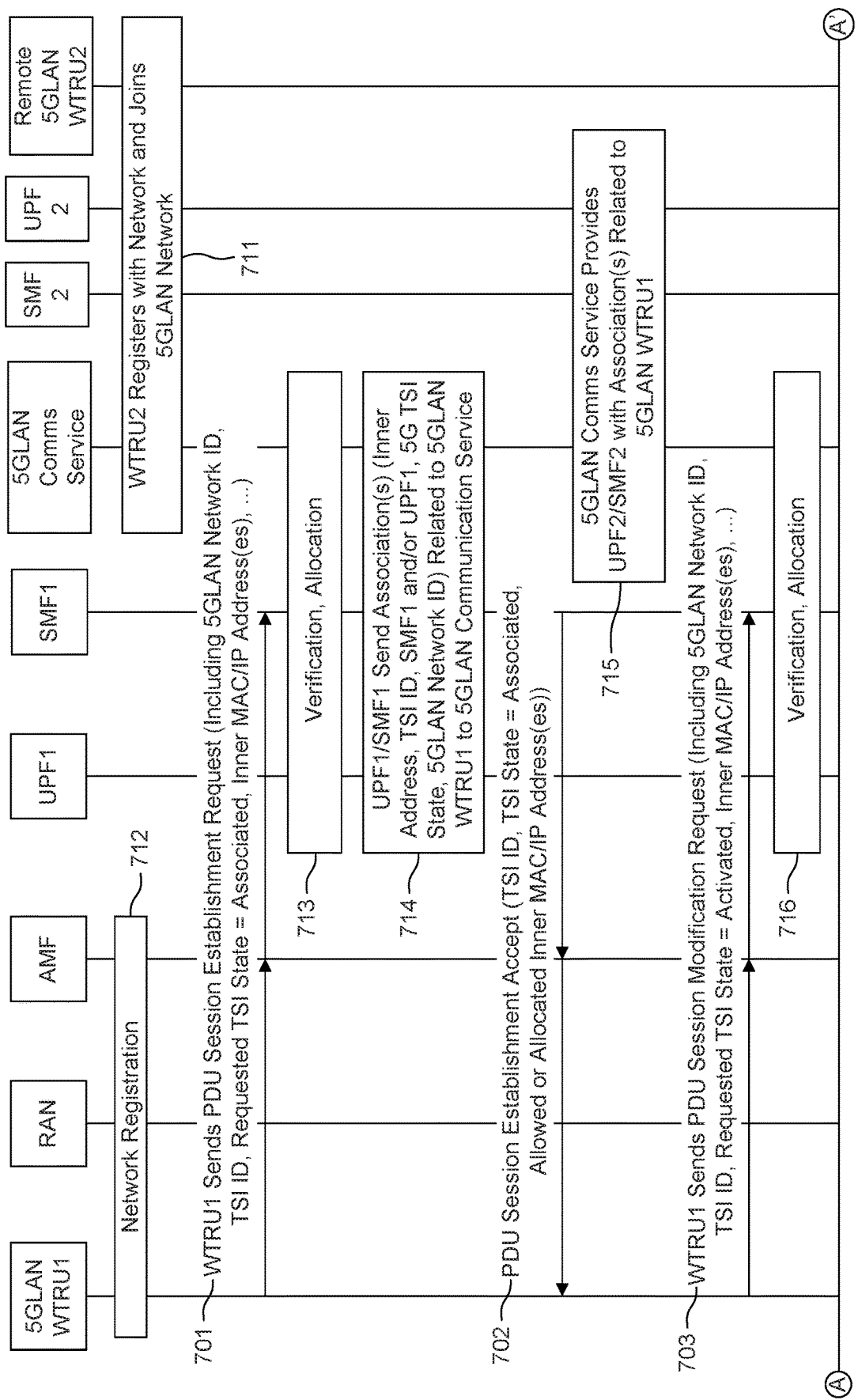
FIG. 7 shows an example flow diagram for setting and changing 5GLAN TSI states.
Figure 7:
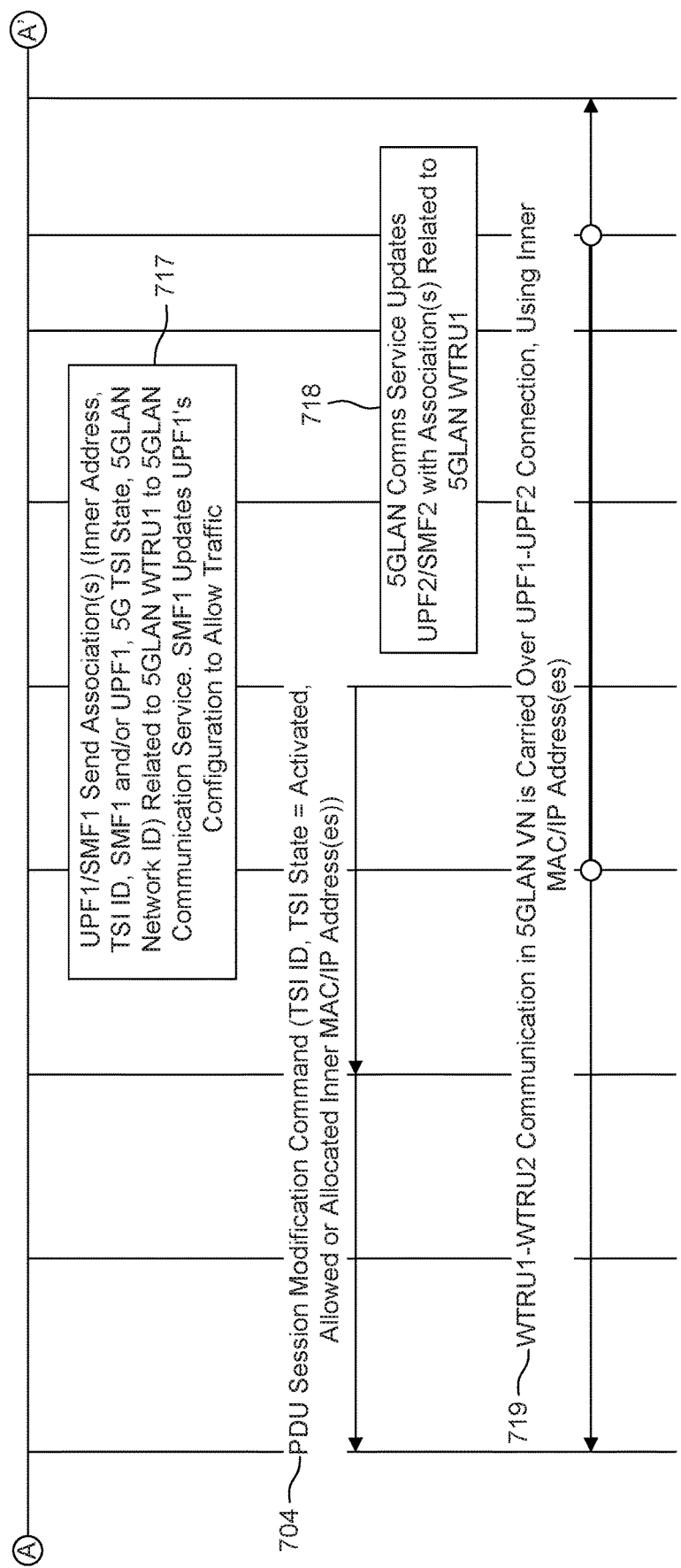

FIG. 7 shows a flow diagram that describes how a WTRU sets and modifies states associated with a tenant system interface. It should be noted that setting and modifying states may be incorporated into the method 600 shown in FIGS. 6A-6B as a part of the method of support efficient VM migration according to this application. In order to make a clear description, some processes from FIG. 6B will be copied into FIG. 7, and additional processes for setting and modifying states will be shown in FIG. 7 as well. Therefore, detail description of those processes shared by FIG. 7 and FIG. 6B will be omitted here. As shown in FIG. 7, the processes at 701-704 may be performed by WTRU1, and the processes at 711-719 may be performed by either the 5GLAN or WTRU2.

As shown in FIG. 7, at 711, WTRU2 may register with the 5G network and joins a 5GLAN virtual network. Then, at 712, WTRU1 may register with the 5G network. Then, at 701, WTRU1 may send a PDU session establishment request message (i.e., a first PDU session establishment request message) including a 5GLAN network ID/name (hereinafter 5GLAN network ID), a TSI ID1, a TSI state (e.g., a TSI state with value "associated", also known as TSI associated state, hereinafter TSI associated state), and one or more inner MAC/IP address(es) (hereinafter inner MAC/IP address(es)). The first PDU session establishment request message may further comprise additional TSI IDs, TSI states and 5GLAN/inner addresses to support any other tenant system interfaces on the WTRU. For example, WTRU1 may decide to use the TSI associated state because the VM is currently in a paused or suspended state, and therefore cannot communicate but could be easily reactivated to a running (e.g., activated) state. Therefore, it can be seen that the difference between the process at 702 and the process at 602 is that the first PDU session establishment request message may further comprise the TSI associated state.

Upon reception of the first PDU session establishment request message, at 713, SMF1 may request the 5G communication services to verify and/or allocate the TSI ID1 and/or inner MAC/IP address(es). Then, at 714, SMF1 may register association tuples (e.g., the inner MAC/IP address(es), TSI ID1, SMF1 ID and/or UPF1 ID, TSI associated state, 5GLAN network ID) with a 5GLAN communication service, for all allowed/allocated inner addresses. It can be seen that the processes at 713 and 714 are similar to the ones at 622 and 623. Therefore, the processes at 713 and 714 can be appreciated with reference to the description regarding FIG. 6B.

Then, at 702, SMF1 may send a PDU session establishment accept message (i.e., the first PDU session establishment response message) including an allowed TSI associated state, TSI ID1, and/or the inner MAC/IP address(es), some of which may have been allocated by the network. That is, at 702, WTRU 1 may receive the first PDU session establishment response message. The process at 702 is similar to the process at 602. After this, the new association tuples are now available for and/or sent to SMFs/UPFs participating in the 5GLAN network. Then, at 715, the 5GLAN communication service may updates UPF2/SMF2 with the new association tuples. The process at 715 is similar to the process at 624.

At any point in time, WTRU1 may decide to change the TSI state, e.g. it may wish to reactivate the VM to the running state. Then, at 703, WTRU1 may send a PDU session modification request message including a 5GLAN network ID/name, a TSI ID, a TSI state (e.g. with value "activated" in this example, hereinafter TSI activated state), and one or more inner MAC/IP address(es) (hereinafter inner MAC/IP address(es)). It should be noted that the process at 703 and the process at 701 can be combined together. That is, when WTRU1 starts to establish the first PDU session, it may send the first PDU session request message including the above-mentioned TSI activated state rather than the TSI associated state so as to let the 5GLAN know that the VM running on WTRU is able to transmit/receive traffic.

Upon reception of the message, at 716, SMF1 may request the 5G communication services to verify the TSI IDs and/or the inner MAC/IP address(es). Then, at 717, UPF1/SMF1 may update the association tuples with the new 5G TSI state value. SMF1 may update UPF1's configuration to enable traffic related to this TSI to flow (and send any buffered traffic, if any).

Then, at 704, SMF1 may send a PDU session modification command message confirming the new TSI state value. That is, at 704, WTRU 1 may receive the PDU session modification command message. The PDU session modification command may comprise the TIS activated state, TSI ID1, and/or the inner MAC/IP address(es). If the process at 703 and the process at 701 were combined together, then the process at 704 and the process at 702 may be combined together. That is, the PDU session establishment accept message received by WTRU1 at 702 may comprise the TIS activated state.

Then, at 718, 5GLAN communication service may make updated association tuples available to other UPFs/SMFs as usual. Then, at 719, if WTRU1 still carries VMs connected to the same 5GLAN network, UE1-UE2 communication may continue to be carried over the UPF1-UPF2 connection. If WTRU1 does not carry other VMs connected to the 5GLAN network, then at this point WTRU1 may not have any PDU session carrying traffic over this 5GLAN network.

At this point, WTRU1 may communicate over the 5GLAN network, e.g. with WTRU2, using the PDU session. In addition to the procedure described above, WTRU1 may also change a 5G TSI state from an activated state to an associated state, e.g. before pausing the VM. In this case, once the 5G TSI state changes to the associated state, UPF1 may start buffering any traffic towards the VM, until the 5G TSI state is set to the activated state again.

Similarly, WTRU2 may also use the above state change scheme to change its VM state between an associate state and an activated state. For example, the PDU session modification request message or the PDU session establishment request message sent at 604 shown in FIG. 6B may comprise a TSI associated state or a TSI activated state. Then, the 5GLAN may perform some processes similar to the ones from 713-714 or the ones from 716-718. Then, at 605, the 5GLAN may perform a process similar to the one at 702 or the one at 704.

Also, in addition to the processes described above, the 5GLAN network may also initiate a change of state. For example, the 5GLAN communication service may send a request for 5G TSI state change to UPF/SMF, which then sends a PDU session modification command message including a 5G TSI ID and desired 5G TSI state. In this case UPF/SMF should also update and communicate the association tuples accordingly.

As mentioned above, 5GLAN TSI states communication and change procedures described in FIG. 7 may be in some cases integrated with the VM migration mechanism described in FIGS. 6A and 6B. For example, as shown in FIG. 6B, at 601-602, WTRU1 may first change 5GLAN TSI state to "associated" (at which point UPF1 buffers incoming traffic for this TSI), and then perform the VM migration at 603. When a new PDU session is established based on WTRU2's request for the migrated VM (setting 5G TSI state to associated) at 604-605, all traffic buffered in UPF1 is forwarded to UPF2 (where it is buffered). When WTRU2 sets the TSI state to activated as described above, UPF2 may forward buffered traffic to WTRU2.

Procedures over both the 5G network and the datacenter network, which are enabled by 5G network enhancements, are described as follows. Further, the following will also describe how to implement use cases previously described.

A reference system solution may be based on the architecture diagram in FIG. 3. This solution may include using a single SMF for handling a given 5GLAN network. This also may include using an NVE function distinct from the PSA UPF, therefore enabling describing messages that will be used when NVE is physically or logically separated from the PSA UPF.

Figure 8:
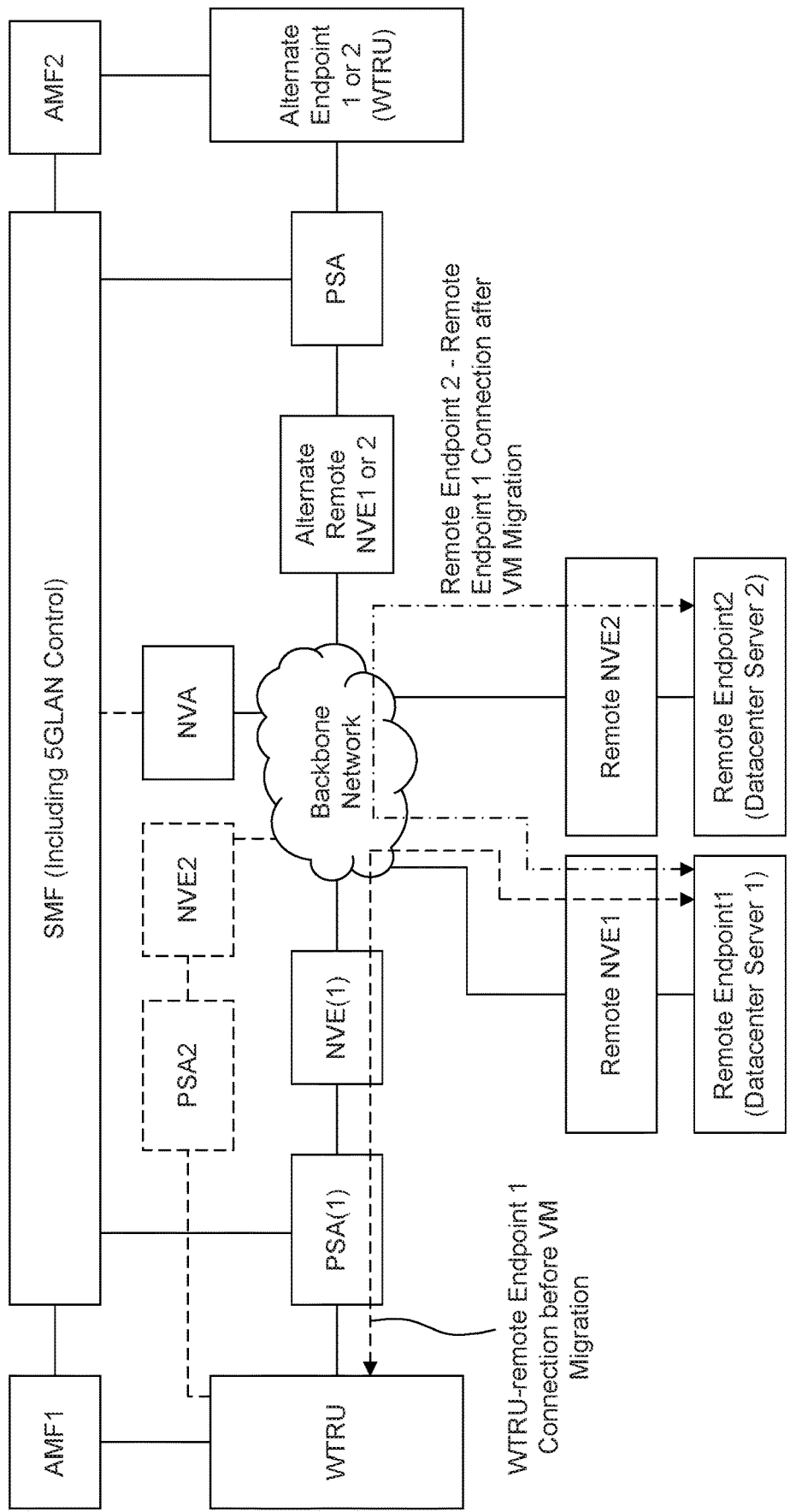
FIG. 8 shows an example 5GLAN Architecture which may be used by the method according to this application.
Figure 9:
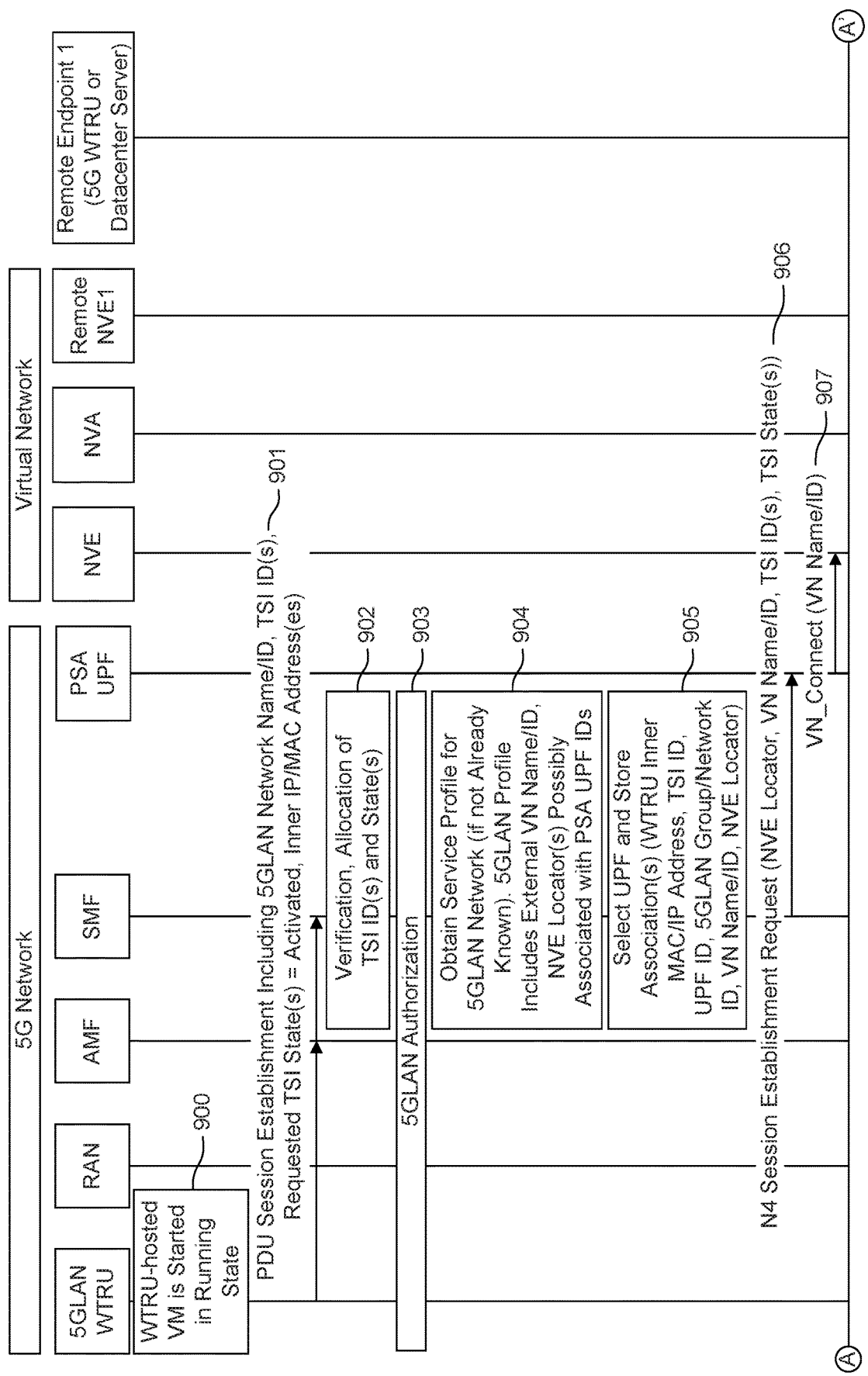
FIG. 9 shows an example flow diagram for a UE-hosted VM connection to a datacenter server.
Figure 9:
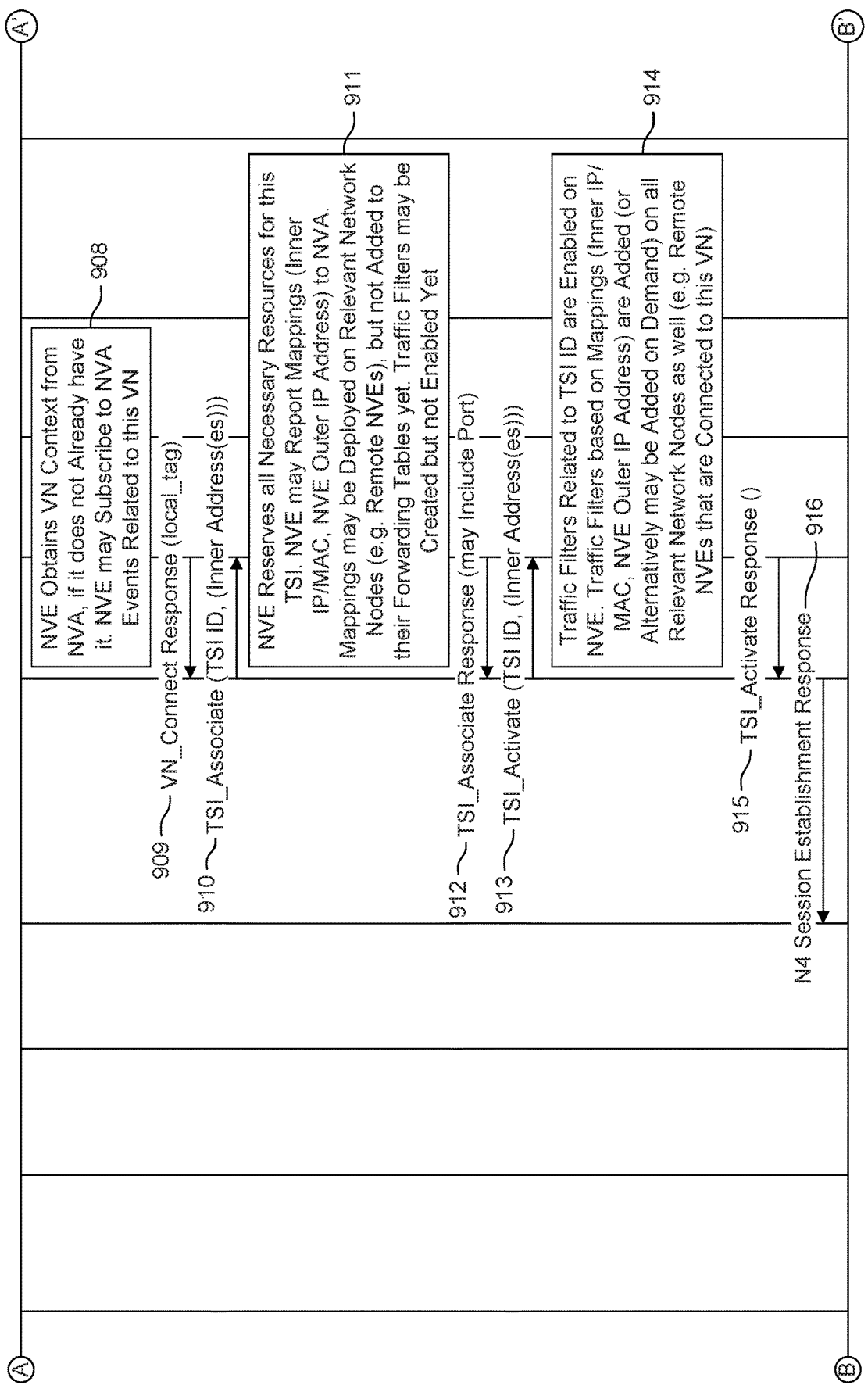
Figure 9:
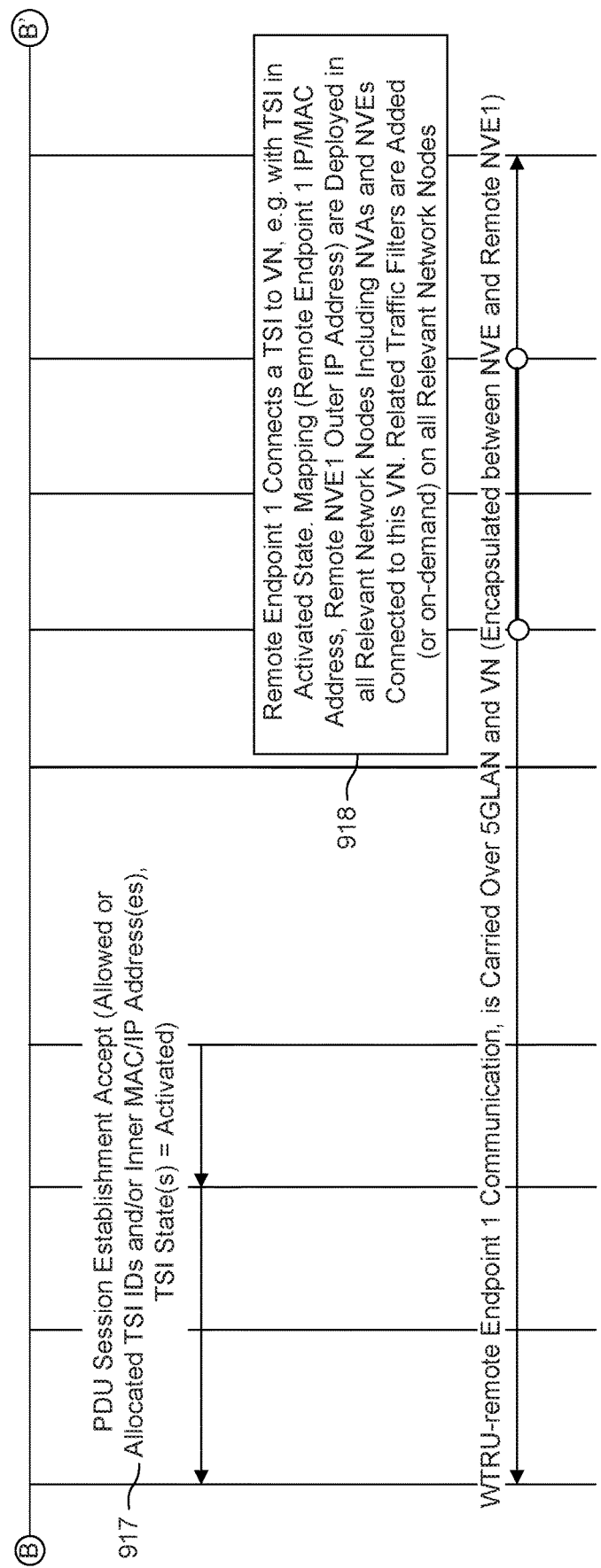
Figure 11:
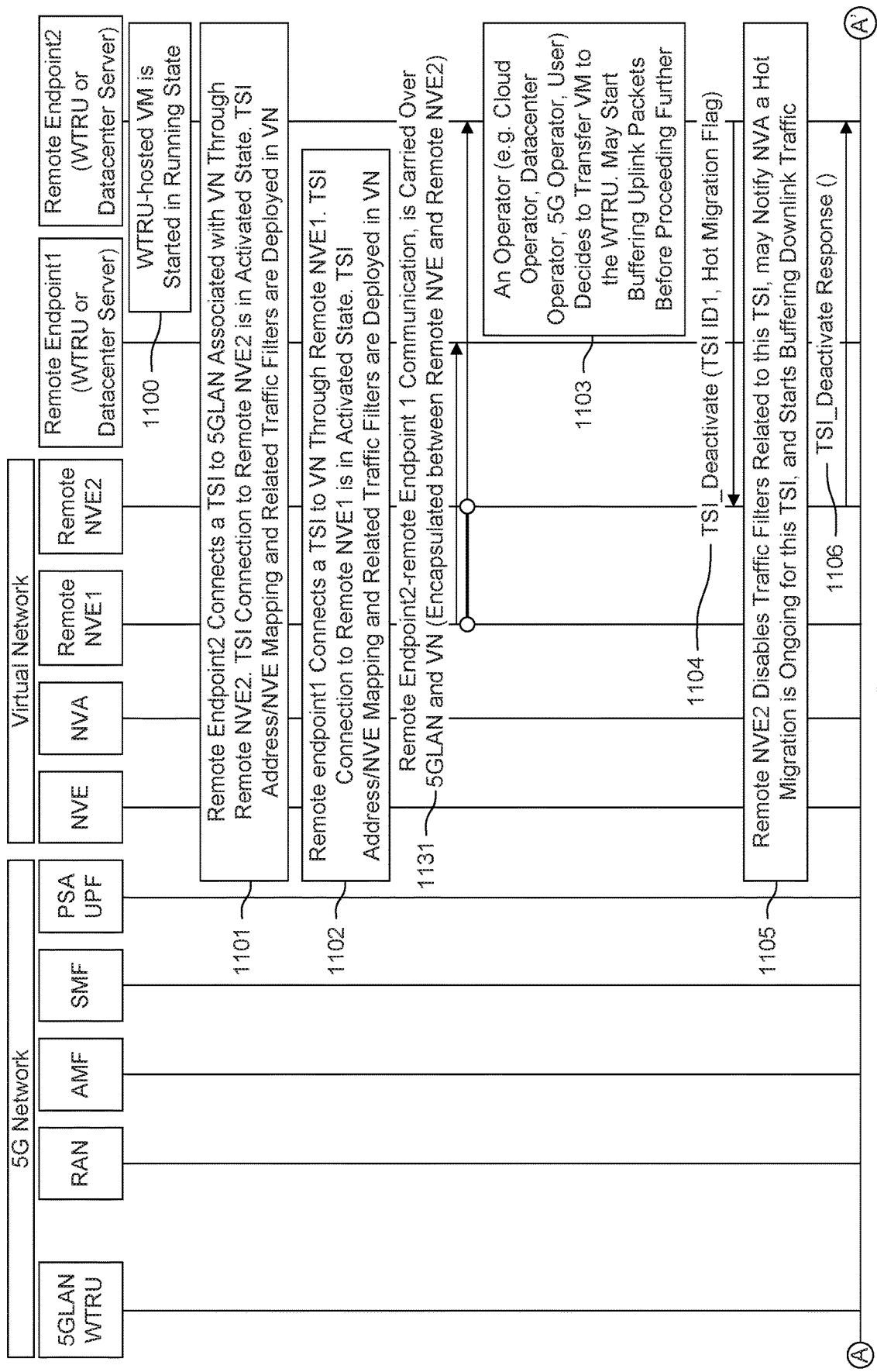
FIG. 11 shows an example flow diagram for VM Mobility between a remote server or WTRU and a 5G WTRU, over a datacenter virtual network.
Figure 11:
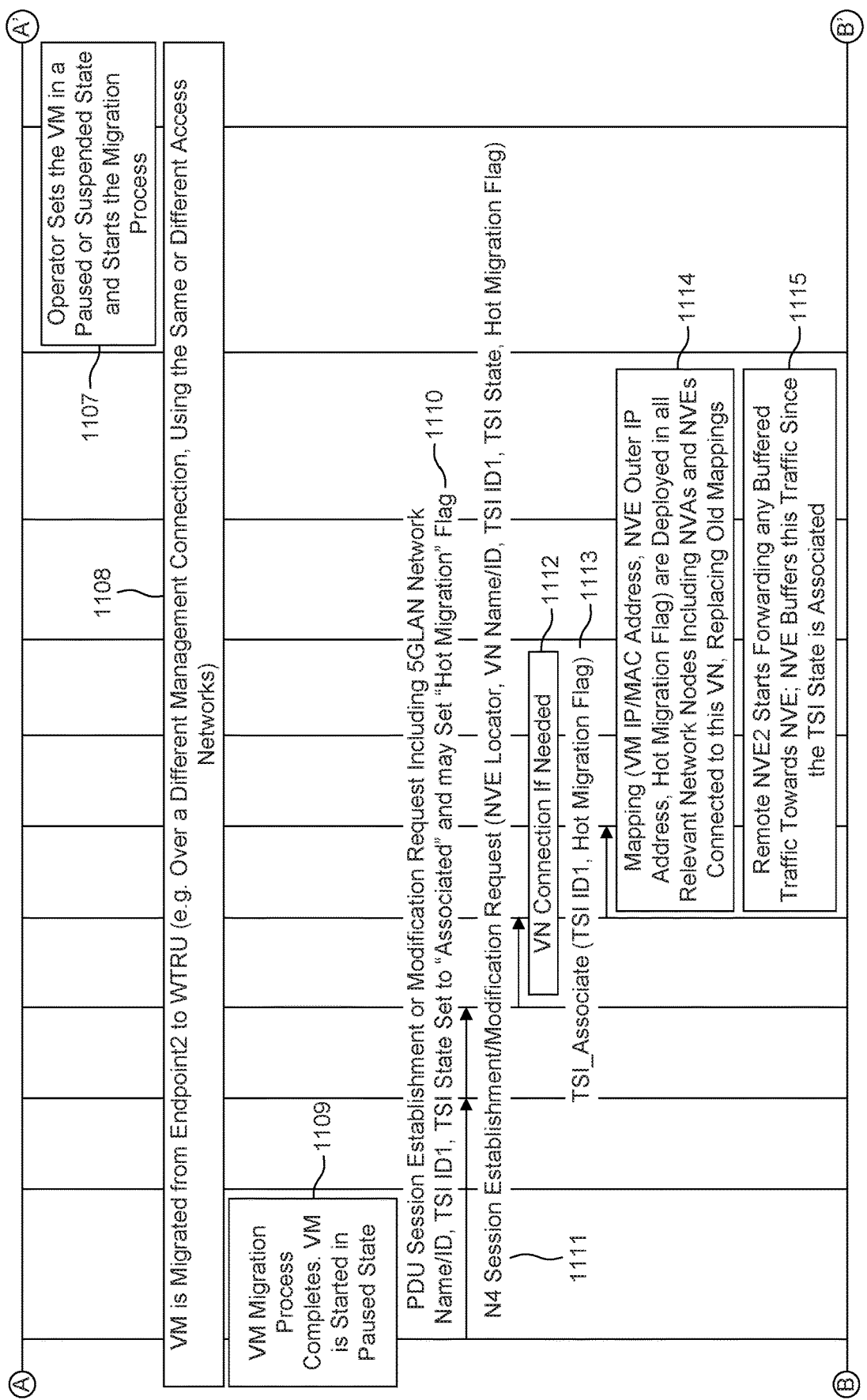
Figure 11:
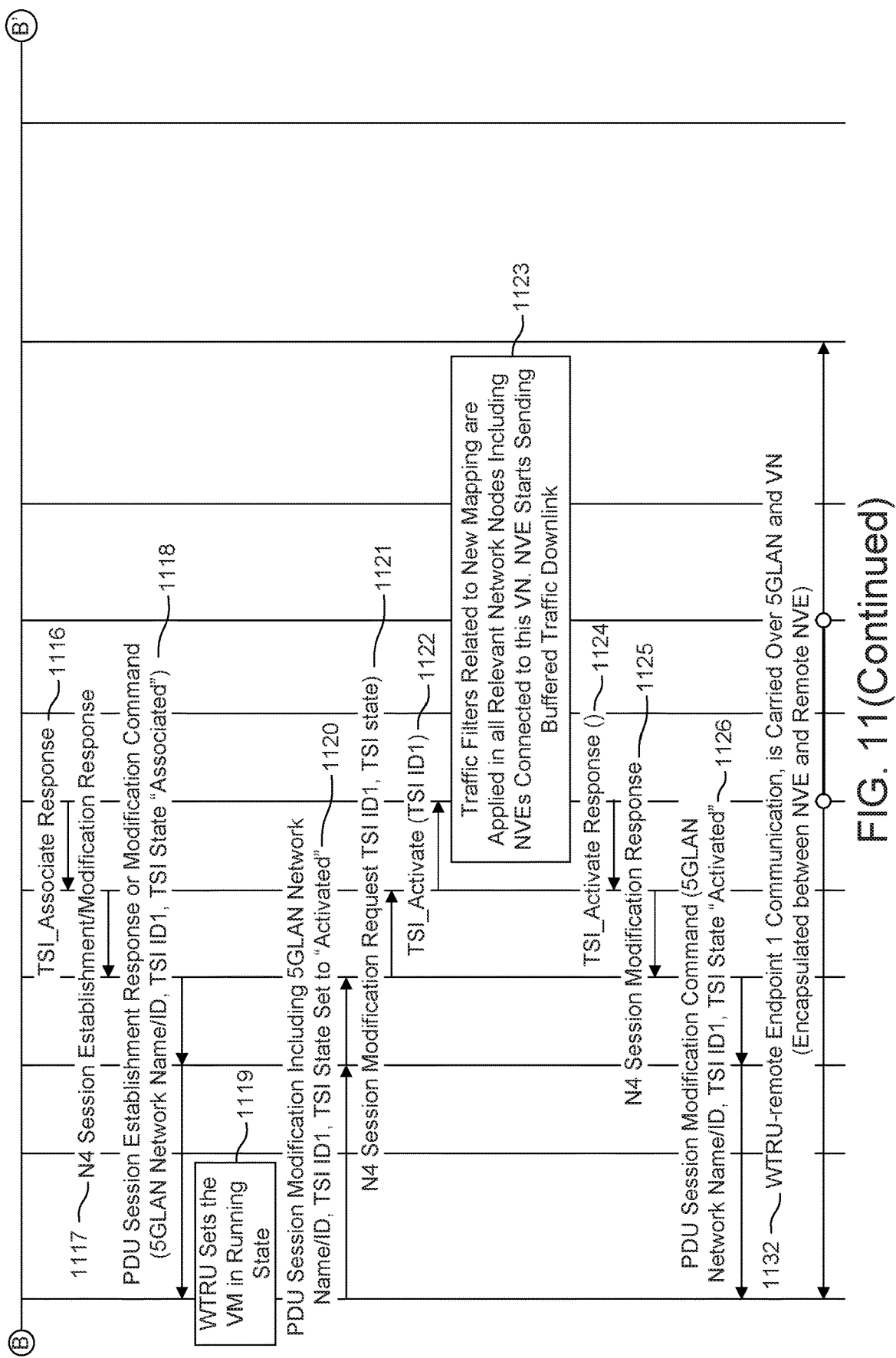
Figure 13:
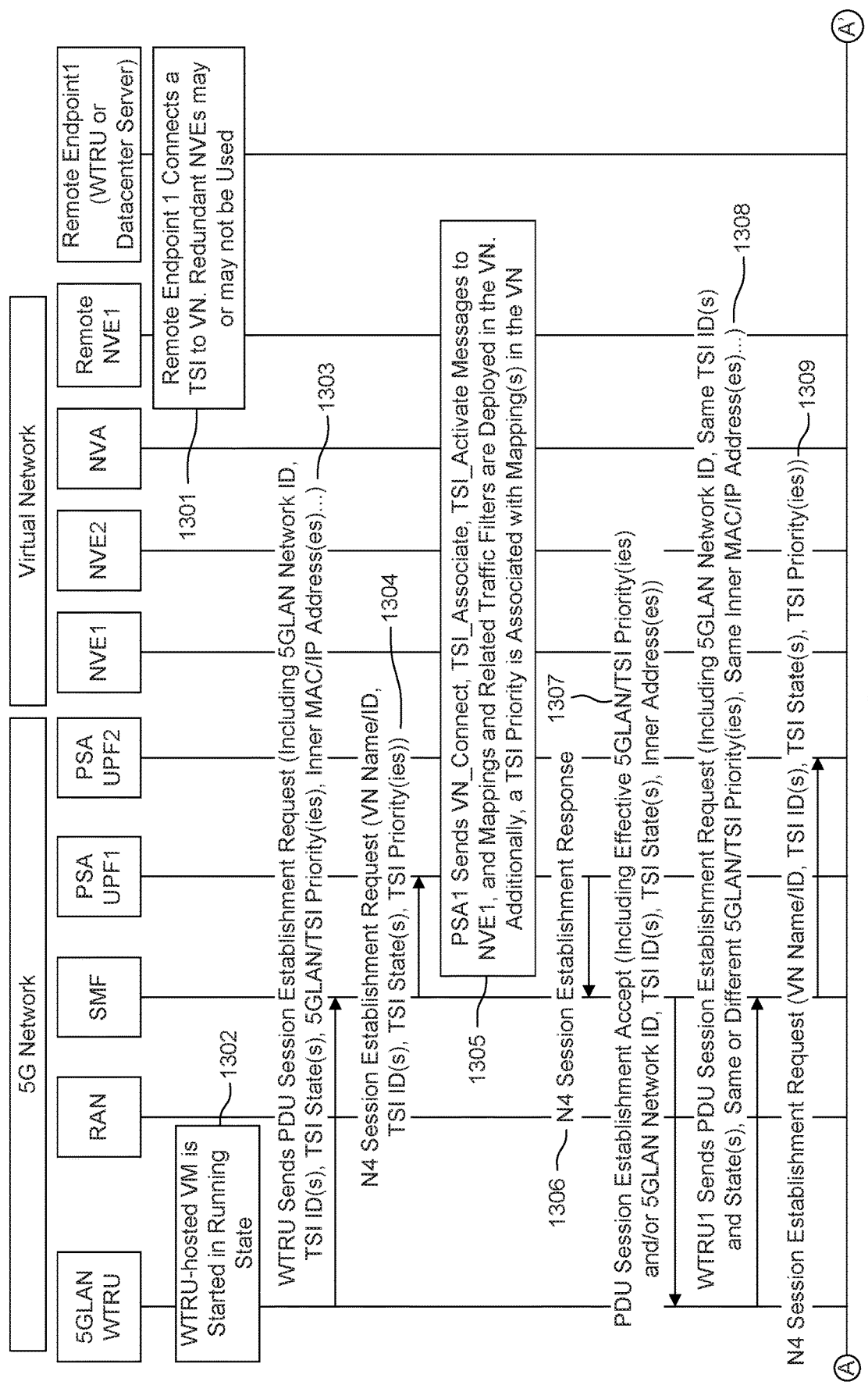
FIG. 13 shows an example flow diagram for end to end redundancy support between a WTRU and datacenter server.
Figure 13:
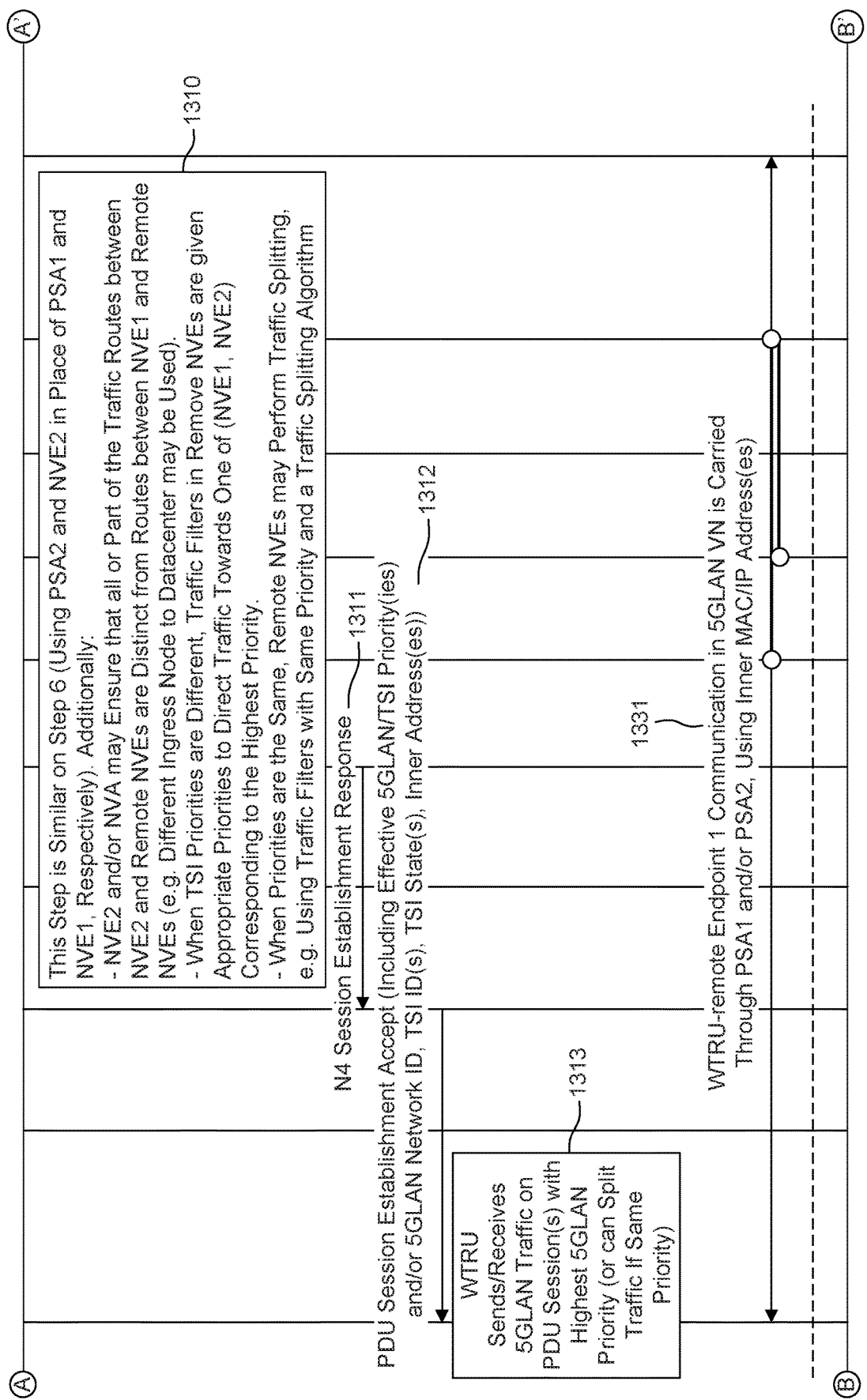
Figure 13:
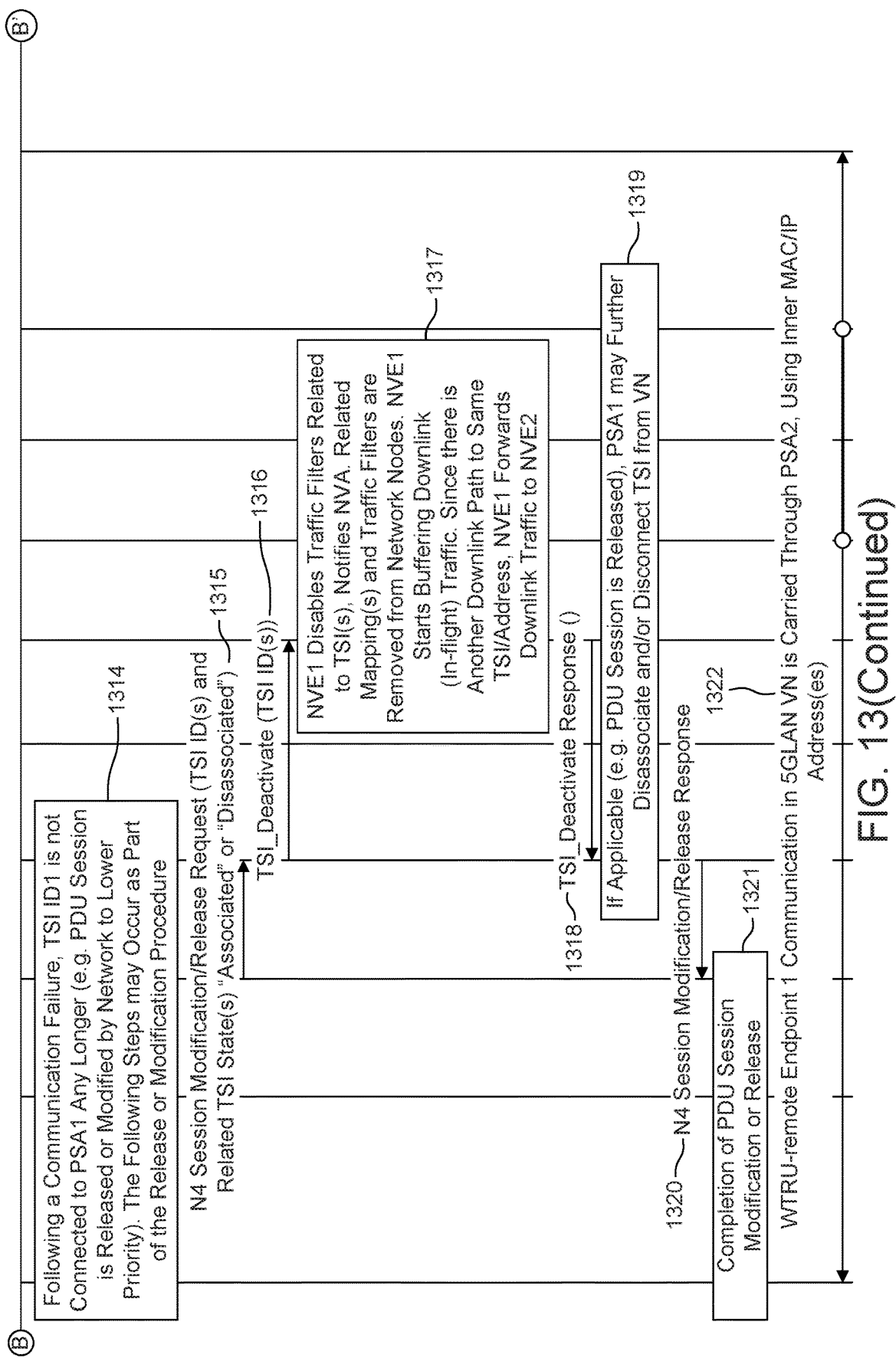

FIG. 8 further illustrates the system used for message flows in FIG. 9, FIG. 10, FIG. 11 and FIG. 13. FIG. 9 and FIG. 13 describe connectivity establishment between a VM on a WTRU and a remote endpoint 1 (where the remote endpoint 1 is a representative of potentially multiple endpoints connected on the same VN). Additionally, in FIG. 13, a WTRU may be connected to VN through 2 PSAs (PSA1 and PSA2) and 2 NVEs (NVE1 and NVE2). FIG. 10 and FIG. 11 describe VM mobility between a WTRU and a remote endpoint 2, while maintaining connectivity with a remote endpoint 1 (again, the remote endpoint 1 is a representative of potentially multiple endpoints connected on the same VN). In all cases, the remote endpoint 1 may alternatively be a WTRU instead of a datacenter server. Moreover, the remote endpoint 2 may also alternatively be a WTRU. While NVE1, NVE2, remote NVE1 and remote NVE2 are shown as distinct network functions, some of them may represent a same NVE in some use cases.

Datacenter server-NVE communication is typically either internal (also known as "internal NVE" case) or a layer-2 protocol (also known as "external NVE case", commonly used in datacenters). On the other side, if the endpoint is a WTRU, the WTRI-NVE communication is through the 5G system, and therefore will involve transporting important information elements such as TSI ID, TSI state, hot migration flag, priority, VN name, etc. explicitly over the PDU session or implicitly (e.g. through 5GLAN service profile information in SMF) from WTRU to NVE. In the procedures in FIG. 9, FIG. 10, FIG. 11 and FIG. 13, the remote endpoint 1 and the remote endpoint 2 are represented as datacenter endpoints interconnected with an external NVE. The internal NVE case can be derived by considering that the endpoint-NVE interface is internal to the endpoint. The 5G WTRU case can be derived by using enhanced 5G signaling as described for the left-hand WTRU in FIG. 8, for the interface between NVE and remote endpoint 1 or 2.

As shown in FIG. 8, a VM is running on the WTRU. Before the VM migration, the WTRU and the remote endpoint 2 (e.g., datacenter server 2) may connect with each other through the 5GLAN and the datacenter VN, and the WTRU and the alienate endpoint 1 or 2 (e.g., another WTRU) may connect with each other through the 5GLAN. Then, the VM may migrate from the WTRU to the remote endpoint 1 (e.g., datacenter server 1). Therefore, after the VM migration, the remote endpoint 1 and the remote endpoint 2 may communicate with each other via the datacenter VN or via a combination of the datacenter VN and the 5GLAN. Meanwhile, the remote endpoint 2 may connect with the alternate endpoint 1 or 2 through the datacenter VN and the 5GLAN.

An inner address is a MAC or IP address (hereinafter inner MAC/IP address or inner MCA/IP address(es)) that is used to communicate with other members of a 5GLAN group and/or with other members of a VN (this definition is valid for all usage in the present document). It may also be designated as 5GLAN, 5GLAN/inner or tenant system address. For example, in the case where a VM (or more generally a tenant system) is connected to a 5GLAN and an interconnected VN, the inner address is therefore an address configured on the tenant system interface (TSI) e.g. a network interface on the VM. The inner address does not change over time, or only rarely, e.g. it may be reconfigured on the VM, which is a rare event typically performed by a user of the VM. An inner address is maintained over a VM migration, i.e. the VM communicates using a same inner address(es) before and after a migration procedure.

FIG. 9 describes a procedure which may enable an WTRU to connect to a datacenter server or another WTRU, over a datacenter VN based on the reference system previously described with reference to FIG. 8.

Messages VN_(Dis)Connect, TSI_(De)Associate, TSI_(De)Activate are defined in RFC 8394 in a different context (e.g. sent by a hypervisor to NVE on the same LAN segment). A usage of messages between the PSA UPF and an NVE, or between SMF and an NVE in an alternative described herein, is described as follows. These messages may be encoded, e.g. using VDP when PSA UPF and NVE are on the same LAN segment or using other protocols such as HTTP in other cases. The usage is also relevant in the sense that here the hypervisor is on the UE, and therefore UPF PSA uses these messages on behalf of the hypervisor, which enables integrating PDU session procedures with VN procedures to improve efficiency and to avoid timing issues (e.g. releasing a PDU session prior to updating VN state may result in lost packets).

While procedures described herein use terms specific to Virtual Machines (besides the more general "tenant system" term), these procedures can more generally apply to other forms of virtualization (e.g. process containers, unikernels, etc.), or even external devices connected through the WTRU (as a form of indirect communication through the WTRU).

The nineteen procedure processes associated with the above are described directly below. The interconnection between NVEs, and between NVEs and NVA are only described at a high level, since VN operation may be understood by a person of skill in the art.

At 900, a WTRU-hosted VM is started in a running state. The VM has at least one network interface that needs connection to a given 5GLAN group/network.

At 901, the WTRU may send a PDU session establishment to provide connectivity to the given 5GLAN group/network. It may therefore include the identifier/name of the 5GLAN group/network. The message may also include: a TSI ID identifying the VM network interface, a requested TSI state, e.g. with a "activated" value to reflect that the VM is able to send/receive traffic immediately and may include 5GLAN/inner IP/MAC address(es) currently configured on the VM network interface. The message may include additional TSI IDs, states and 5GLAN/inner addresses to support any other tenant system interfaces on the WTRU.

Further, at 901, the TSI ID may be set by the WTRU or may be allocated by the network (e.g. SMF), e.g. if the WTRU places a null-value TSI ID in the initial message.

Also at 901, the scope for uniqueness of TSI ID has influence on the solution in three alternatives. In a first embodiment, the TSI ID should be unique across the interconnected 5GLAN and VN network. For example, as described further herein the WTRU may use a group-scoped PDU session ID as the TSI ID. In another example, the WTRU may use a GPSI pre-configured on the WTRU and appending to it a locally unique ID to build a globally unique TSI ID. In another example a network element, e.g. SMF, generates a TSI ID unique within the VN, e.g. generating a unique TSI ID from a prefix agreed upon with the VN operator, or requesting such a unique TSI ID from the NVA (which may present itself as an AF), or using a GPSI associated with the UE to build a globally unique TSI ID.

In a second embodiment, the TSI ID does not need to be unique within the VN, and for example the PDU session ID or a value derived from it (e.g. a hash value) may be used as the TSI ID. In this case, a separate TSI ID may not need to be carried explicitly over the PDU session request message. Based on the fact that the 5GLAN group/network is interconnected with a VN, SMF may in this case interpret the PDU session ID as the TSI ID (or may build the TSI ID from a PDU session ID, e.g. using a hash function).

In the third embodiment, NVA will be able to use the TSI ID as a matching value for VM migration. It should be noted that in the second embodiment, NVA will require additional information to be provided by the destination NVE, e.g. inner/5GLAN IP/MAC address, source TSI ID or source WTRU ID, etc. In this case, messages in VM mobility procedures (PDU session establishment, N4 session modification and messages from PSA to NVE) may therefore carry additional IEs such as source TSI ID or PDU session ID; source WTRU ID (e.g. a GPSI).

At 902, upon reception of the message, SMF may request to verify and/or allocate 5G TSI IDs and/or inner address(es).

At 903, a secondary authorization procedure may be performed, to ensure that the WTRU is authorized to join the 5GLAN group/network.

At 904, SMF may obtains the service profile for 5GLAN group/network (e.g. from its local configuration or from a network management service function). The 5GLAN service profile may include one or more external VN Name/IDs, which indicates that the 5GLAN group/network is interconnected with the designated VNs. The 5GLAN service profile may also include NVE locator(s) (e.g. IP address(es), MAC address(es) or FQDN, that may be used by PSA UPF to communicate with the NVE). In some cases, 5GLAN service profile may also include some association information between NVE locators and PSA UPF IDs. For example, nve1.datacenter.org may be associated with PSA UPFs 1, 2 and 3; nve2.datacenter.org may be associated with PSA UPF 4. In some cases, e.g. when a 5GLAN may be interconnected with multiple VNs, the UDM may hold a VN name/ID that should be interconnected with a given WTRU at a given time, e.g. based on UE location.

At 905, SMF may select a suitable PSA UPF (e.g. based on 5GLAN network/ID, VN name/ID and/or availability of NVEs); SMF stores association tuple(s) (UE inner MAC/IP address, TSI ID, UPF ID, 5GLAN group/network ID, VN Name/ID, NVE locator).

At 906, SMF may send a N4 session establishment request to PSA UPF, including the information elements: NVE locator, VN name/ID, TSI ID(s) and associated TSI state(s).

At 907, PSA may send a VN_Connect message, including a VN name/ID, to request a connection to this VN.

At 908, NVE may obtain VN context from NVA, if it does not already have it. NVE may subscribe to NVA events related to this VN. NVE also allocates a local tag and associated resources to communicate with PSA UPF.

At 909, NVE may send a VN_Connect response message, including a local tag (e.g. a tag for use in VLAN or VxLAN protocol). This local tag will be used for all user plane communication between PSA and NVE, related to the VN.

At 910, PSA may send a TSI_Associate message, which includes the TSI ID and may include associated 5GLAN/inner addresses. Alternatively, the 5GLAN/inner addresses may be added using separate messages. Any additional TSI ID and their addresses should be associated using additional TSI_Associate messages.

At 911, NVE may reserve all necessary resources for this TSI. NVE may report mappings (inner IP/MAC, NVE outer IP address) to NVA. Mappings may be deployed on relevant network nodes (e.g. remote NVEs), but not added to their forwarding tables yet. Traffic filters may be created but not enabled yet.

At 912, NVE may send a TSI_Associate response message, which may optionally include logical port information for use by user plane traffic between NVE and PSA, which may be used to distinguish between traffic related to a different TSI ID.

At 913, PSA may send a TSI_Activate message, which includes the TSI ID and may include associated 5GLAN/inner addresses.

At 914, traffic filters related to the TSI ID may be enabled on NVE. Typically, with support from NVA, traffic filters based on mappings (inner IP/MAC, NVE outer IP address) are added (or alternatively may be added on demand) on all relevant network nodes as well (e.g. remote NVEs that are connected to this VN).

At 915, NVE may send a TSI_Activate response message to NVE.

At 916, PSA may send a N4 Session Establishment Response to SMF.

At 917, SMF may send a PDU session establishment accept message to the UE. That is, WTRU may receive the PDU session establishment accept message. This message may include the allowed or allocated TSI ID(s) and related state(s), and/or 5GLAN/inner MAC/IP addresses.

At 918, the remote endpoint 1 may connect a TSI to VN, e.g. with TSI in activated state. Mapping (remote endpoint 1's IP/MAC address, Remote NVE1 outer IP address) may be deployed in all relevant network nodes including NVAs and NVEs connected to this VN. Related traffic filters are added (or on-demand) on all relevant network nodes. If the remote endpoint 1 is a WTRU, this operation is like the processes at 1-18. If the remote endpoint 1 is a datacenter server, its connection to remote NVE 1 is described in RFC 8394 if the remote NVE is an external NVE. A datacenter server may also operate an internal NVE, which is directly interoperating with NVA and other NVEs.

In an embodiment, the requested TSI state (in PDU session establishment/modification request) and/or reported TSI state (in PDU session establishment/modification response) may have a default value, e.g. "associated", and therefore may not be needed/present in those messages when the TSI state correspond to the default value.

In an embodiment, the TSI state may directly be set to "activated", i.e. TSI_associate message can be omitted, and upon receiving TSI_activate an NVE and other VN nodes will perform actions of processes at 911 and 914 in succession. This alternative may apply to other procedures defined in this work, e.g. VM migration and redundant path.

In an embodiment, the messages VN_Connect, TSI_Associate, TSI_Activate may be sent from the SMF (instead of from the PSA UPF) to the NVE, and additionally include a locator for the UPF they refer to (e.g. its external MAC or IP address). The NVE sends corresponding responses back to the SMF. The SMF communicates related information to the UPF, e.g. using N4 Session Establishment/Modification Request to the UPF, enhanced with new information elements including NVE locator (e.g. MAC or IP address for communication with the UPF), Local tag, VN Name/ID, and/or TSI ID. This information enables the establishment of a data plane connection between PSA UPF and NVE. This SMF-NVE alternative may be applicable to all other procedures herein including PSA UPF-NVE signaling.

In an embodiment where the NVE and PSA are collocated, NVE-NVA messages may be replaced or complemented with SMF-NVA messages. In this case, for example SMF may send mapping tuples to NVA, which in turn may propagate those mapping tuples to all NVEs, or only to NVEs located in datacenters; in this last case SMF may also send mapping tuples to NVEs collocated with UPF PSAs (e.g. through N4 interface or through an interface exposed by NVE NF or AF).

In an embodiment, where the remote endpoint 1 is a WTRU, the remote endpoint 1 may use the same SMF as the 5G WTRU on the left, e.g. if both are member of the same 5GLAN. If they belong to a different 5GLAN, they may use a different SMF.

A certain embodiment may have a procedure enabling a VM to be transparently migrated (e.g. without changing its MAC address(es) and/or its IP address(es)) between a WTRU and a datacenter server or another WTRU, over a datacenter virtual network.

FIG. 10 describes a VM migration through a datacenter VN, where the source is a 5G WTRU, and the destination may be a datacenter server or another WTRU. It is based on the reference system described previously with reference to FIG. 8.

The twenty-seven processes associated with FIG. 10 are described directly below.

At 1000 and 1001, the WTRU may host a tenant system (e.g. a VM) and connects one of its interfaces to a 5GLAN network interconnected to a VN, e.g. as described in FIG. 9.

As a result, mapping tuples (including e.g. TSI ID and state, inner address, NVE IP address) and related traffic filters may be deployed in VN.

At 1002, remote endpoint 1 may also connect to the VN (e.g. directly if the remote endpoint 1 is a datacenter server, or through a 5GLAN if remote endpoint 1 is a WTRU). As a result, mapping tuples and related traffic filters are deployed in VN. At this point, the VM may communicate over 5GLAN, with any member of the 5GLAN group and with any member of the interconnected VN, including remote endpoint 1. VM-remote endpoint 1 user plane traffic is encapsulated between NVE and remote NVE1.

At 1003, an operator (e.g. cloud operator, datacenter operator, 5G operator, user) decides to transfer the VM to remote endpoint 2. The WTRU (e.g. the hypervisor on the WTRU) may start buffering uplink packets before proceeding further.

At 1004, UE may send a PDU session modification message to SMF, including 5GLAN network name/ID (e.g. as DNN), TSI ID1 (identifier of the TSI used by the to-be-transferred VM to communicate over 5GLAN and VN), a corresponding TSI state set to "associated" to request stopping traffic to/from VM from flowing on the PDU session, and may also include a "hot migration" flag. The hot migration flag may be set, e.g. with the purpose to let the VN know that the network should not deactivate traffic filters in the network, so that traffic will continue to flow to the currently used NVE until a new NVE becomes known. The hot migration flag may also provide a hint that reduces risks for errors or attacks during a VM migration: it can therefore be provided to NVA by source and/or destination NVE to enable filtering out erroneous or malicious signaling of a VM migration.

At 1005, SMF may send a N4 session modification request to PSA UPF, including TSI ID1 and its related TSI state, and if applicable the hot migration flag. The message may also include VN name/ID and/or NVE locator, although the PSA UPF may alternatively retrieve these values, or a handle to its communication channel with NVE, from a local context associated with the N4 session.

At 1006, PSA UPF may send a TSI_Deactivate message to NVE, including TSI ID1, and if applicable the hot migration flag.

At 1007, NVE may disable traffic filters related to this TSI, may notify NVA a hot migration is ongoing for this TSI, and may start buffering downlink traffic.

At 1008, NVE may send a TSI_Deactivate response message to PSA UPF.

At 1009, PSA UPF may delay its response until all downlink packets associated to TSI ID1 5GLAN/inner address(es) are sent. This can be especially useful in cases where the NVE and PSA UPF are not collocated, to ensure that traffic is only buffered inside the NVE during the migration process.

At 1010, PSA UPF may send a N4 session modification response to SMF.

At 1011, SMF may send a PDU session modification command to WTRU, including 5GLAN network name/ID, TSI ID1 and/or TSI state "associated", which may confirm that the required state change was performed.

At 1012, the operator may set the VM in a paused or suspended state and starts the migration process.

At 1013, the VM may be migrated from the WTRU to remote endpoint2 (e.g. over a different management connection, using the same or different access networks). This process may be performed using one or many different existing techniques, e.g. involving some forms of compression based on VM layering (e.g. the lower layers of the VM image may be present on the destination UE/server, and therefore only an ID may be transferred for those layers).

At 1014, the VM migration process may complete. The VM may be started in paused state on the destination remote endpoint 2.

At 1015, remote endpoint 2 may connect a tenant system interface of the newly migrated VM to the VN through remote NVE2. VN name/ID, TSI ID1 and possibly hot migration flag is provided by endpoint to remote NVE2 (e.g. in TSI_Associate message). If remote endpoint 2 is a WTRU, this process is described in FIG. 10. In the case where TSI ID is not unique in the VN (e.g. a PDU session ID is used as the TSI ID), the message may additionally include an identity of the source UE (e.g. a GPSI), and/or the source TSI ID (e.g. source PDU session ID).

At 1016, mapping tuples (including the VM IP/MAC address, the remote NVE2 outer IP address, and if applicable the hot migration flag) are deployed in all relevant network nodes including NVAs and NVEs connected to this VN, although related traffic filters are not enabled yet.

In the case where TSI IDs are not unique in the VN (e.g. the PDU session ID is used as the TSI ID), an identity of the source UE, and/or a source TSI ID may be communicated e.g. in mapping tuples or using a separate message from NVE or SMF to NVA. NVA may use this additional information and/or hot migration flags and/or endpoint IP/MAC address(es) to match the new and old TSI IDs. NVA may then communicate with the old PSA UPF to request forwarding at 1017.

At 1017, upon reception of the new mapping tuples, NVE may forward any buffered traffic (towards an address of TSI ID1) to remote NVE2, which buffers this traffic since the TSI state is still associated. NVE may base its decision to start forwarding traffic based on TSI ID1 and possibly on "hot migration" flag present within the mapping tuples (or, alternatively if TSI IDs are not unique, may use input from NVA and/or additional mapping tuples IEs such as source UE ID and source TSI ID, as described above).

At 1018, remote endpoint 2 may set the VM in running state.

At 1019, remote endpoint 2 may send a TSI_Activate message to remote NVE2, including TSI ID1.

At 1020, remote endpoint 2 may communicate this state update to the VN (e.g. through NVA). As a result, mapping tuples are updated, and related traffic filters are applied in all relevant network nodes including NVEs connected to this VN. Remote NVE2 starts sending buffered traffic downlink to remote endpoint2.

At 1021, remote NVE2 may send a TSI_Activate response message to remote endpoint 2.

At 1022, based on the knowledge of the activation of the migrated VM (e.g. at 1020, either from mapping tuple update or from a message sent by NVA), NVE may decide to send a TSI_Deassociate message to PSA UPF.

At 1023, PSA UPF may send a N4 Session Modification Request (VN Name/ID, TSI ID1, TSI state with value "disassociated").

At 1024, SMF may remove TSI ID1 from PDU session using a PDU session modification request (e.g. if the PDU session still carries other traffic), or SMF may alternatively initiate the release of the PDU session (e.g. if it was only carrying traffic related to TSI ID1).

At 1025, SMF may send a N4 session modification response message to PSA UPF.

At 1026, PSA UPF may send a TSI_Deassociate response message to NVE.

At 1027, additional steps may be needed in some cases. For example, if no other TSI ID is connected to the VN, the UPF may then send a VN_Disconnect message to NVE as well.

At this point, the VM is connected to the VN through remote endpoint 2. VM-remote endpoint 1 user plane traffic is encapsulated between remote NVE2 and remote NVE1 as shown in FIG. 8.

FIG. 11 describes a VM migration through a datacenter VN, where the destination is a 5G WTRU, and the source may be a datacenter server or another WTRU. It is based on the reference system described above with reference to FIG. 8.

The twenty-six processes associated with FIG. 11 are described directly below.

At 1100 and 1101, remote endpoint 2 may host a tenant system (e.g. a VM) and connect one of its tenant system interfaces to a VN through remote NVE2. As a result, mapping tuples (including e.g. TSI ID and TSI state, inner address, NVE IP address) and related traffic filters may be deployed and applied in VN.

At 1102, remote endpoint 1 may also connect to the VN (e.g. directly if remote endpoint 1 is a datacenter server, or through a 5GLAN if remote endpoint 1 is a WTRU). As a result, mapping tuples and related traffic filters may be deployed and applied in VN. At this point as shown at 1131, the VM is connected to remote endpoint 1 through the VN. VM-remote endpoint 1 user plane traffic is encapsulated between remote NVE2 and remote NVE1.

At 1103, an operator (e.g. cloud operator, datacenter operator, 5G operator, user) may decides to transfer the VM from remote endpoint 2 to the UE. Remote endpoint 2 (e.g. hypervisor on remote endpoint 2) may start buffering uplink packets before proceeding further.

At 1104, remote endpoint 2 may send a TSI_Deactivate message to remote NVE2, including TSI ID1, and possibly a hot migration flag.

At 1105, remote NVE2 may disable traffic filters related to this TSI ID1, may notify NVA a hot migration is ongoing for this TSI, and may start buffering downlink traffic.

At 1106, remote NVE2 may send a TSI_Deactivate response message to remote endpoint 2.

At 1107-1109, VM migration may proceed, following the same as the above processes at 1012-1014, only reversing the roles of WTRU and remote endpoint 2. That is, at 1107-1109, the VM may be migrated from remote endpoint 2 to the WTRU.

At 1110, WTRU may send a PDU session establishment request message or a PDU session modification request message to SMF, including 5GLAN group/network name/ID, TSI ID1 identifying a tenant system interface of the VM that was migrated on the UE, its related TSI state (e.g. set to "associated"), and possibly a hot migration flag. In the case where TSI ID1 is not unique in the VN (e.g. a PDU session ID is used as TSI ID1), the message may additionally include an identity of the source UE (e.g. a GPSI), and/or the source TSI ID (e.g. source PDU session ID).

At 1111, SMF may send a N4 session establishment request message or a N4 session modification request message to PSA UPF, including a NVE locator, a VN Name/ID, TSI ID1, the TSI state, the hot migration flag. In the case where TSI ID1 is not unique in the VN (e.g. a PDU session ID is used as TSI ID1), the message may additionally include an identity of the source UE (e.g. a GPSI), and/or the source TSI ID (e.g. source PDU session ID).

At 1112, if this PSA UPF is not yet connected to NVE for communicating with the VN, the PSA UPF initiates this connection (e.g., by sending a VN_Connect message as described in FIG. 9).

At 1113, PSA UPF may send a TSI_Associate message to NVE, including TSI ID1 and the hot migration flag. In the case where TSI ID1 is not unique in the VN (e.g. PDU session ID is used as TSI ID1), the message may additionally include an identity of the source UE (e.g. a GPSI), and/or the source TSI ID (e.g. source PDU session ID).

At 1114, NVE may communicate mapping tuple(s) (e.g., 5GLAN/inner IP/MAC address(es), NVE outer IP address, the hot migration flag) with NVA, and therefore the mapping tuples may be deployed in all relevant network nodes including NVEs connected to this VN, replacing old mappings. In the case where TSI ID1 is not unique in the VN, the mapping tuple(s) may include additional IEs enabling matching old and new connection to the VM, e.g. source UE GPSI and/or source TSI ID.

At 1115, remote NVE2 may start forwarding any buffered traffic towards NVE, and NVE may buffer this traffic since the TSI state is associated.

At 1116, NVE may send a TSI_Associate response message to PSA UPF.

At 1117, PSA UPF may send a N4 session establishment response message or a N4 session modification response message to SMF.

At 1118, SMF may send a PDU session establishment command message or a PDU session modification command message to the WTRU, including 5GLAN group/network name/ID, TSI ID1 and/or TSI state "associated".

AT 1119, the WTRU may set the VM in a running state.

At 1120, the WTRU may send a PDU session modification message to SMF, including 5GLAN group/network name/ID, TSI ID1, and setting its related TSI state to "activated"). Although the hot migration flag may be present in this message and following ones, it may be omitted since it may have been stored by SMF, UPF and/or NVE at an earlier stage (it is therefore not represented in messages but may be present).

At 1121, SMF may send a N4 session modification request message to PSA UPF, including TSI ID1 and its related TSI state.

At 1122, PSA UPF may send a TSI_Activate message to NVE, including TSI ID1.

At 1123, with support from NVE-NVA messages, traffic filters related to new mapping may be applied in all relevant network nodes including NVEs connected to this VN. NVE may start sending buffered traffic downlink towards the WTRU.

At 1124, NVE may send a TSI_Activate response message to PSA UPF.

At 1125, PSA UPF may send a N4 session modification response message to SMF.

At 1126, SMF may send a PDU session modification command to the WTRU, including 5GLAN group/network name/ID, TSI ID1 and/or effective TSI state "associated".

At this point, the WTRU-hosted VM may communicate over 5GLAN, with any member of the 5GLAN group and of the interconnected VN, including remote endpoint 1. VM-remote endpoint 1 user plane traffic is encapsulated between NVE and remote NVE1.

Two alternative embodiments may be derived from the processes shown in FIG. 10 and FIG. 11.

In a first alternative embodiment, after the migration, the destination WTRU/endpoint may directly connect the TSI to the network in the activated state, instead of connecting in the associated state and then transitioning to the activated state.

In a second alternative embodiments, similar mechanisms may enable interconnection between another mobile network (e.g. based on 4G LTE technology) and a datacenter server, e.g. carrying hot migration flag, TSI ID/state, 5GLAN/TSI priority over bearer establishment/modification signaling.

While the above embodiment focused on VM migration, in a third alternative embodiment, the same mechanisms may be used to support maintaining connectivity between a 5G WTRU and a datacenter server across PSA UPF relocation (i.e. change of network attachment point for a WTRU resulting in the change of anchor point). For example, a datacenter server-WTRU connectivity can be maintained across a session continuity mode 3 (make-before break) or more 2 (break-before-make) procedure in 5G, by exposing a hot migration flag, a TSI ID and/or a TSI state to the VN through the PSA UPF. To apply the procedures in FIG. 10 and FIG. 11 to PSA UPF relocation, it may be sufficient to consider the WTRU and remote endpoint 2 are the same WTRU, and replace the processes where a VM is actually paused and relocated, with the WTRU PSA relocation event. The PDU session initiated by remote endpoint 2 to carry the traffic from the VM is simply the new PDU session established to replace the first PDU session (as part of the normal session continuity procedure).

Active to Active 5GLAN connection support is discussed herein. A WTRU may run a critical medical application such as health monitoring or remote surgery. It may be connected over 5GLAN to multiple sensors, other WTRUs, and datacenter servers. The WTRU may connect to the 5GLAN network through an anchor UPF (e.g., PSA UPF) located nearby in a city. Since it is a critical application, the network operator may allow the WTRU to also connect to the same 5GLAN network through a different radio access network and a different anchor UPF, e.g. locally at home or in a hospital, thus providing a fully separate redundant access network path. The WTRU may either use both paths concurrently or set one as active and the other as backup, while possibly using the same IP and/or MAC address to communicate over both paths.

A WTRU may include the same inner address(es) in more than one PDU session. A new information element "5GLAN connection priority", e.g. an integer value, is provided by the WTRU in PDU session establishment request messages and may subsequently be modified using a PDU session modification request message. The highest value(s) may be interpreted as being active connections. Any lower priority may designate a standby connection. When higher priority 5GLAN connections are detected as down (e.g. PDU session is released or lost connectivity, or links beyond the PSA UPF are down), all remaining next highest priority connection(s) become active. In an alternative solution the priority may be replaced with a standby flag.

Figure 12:
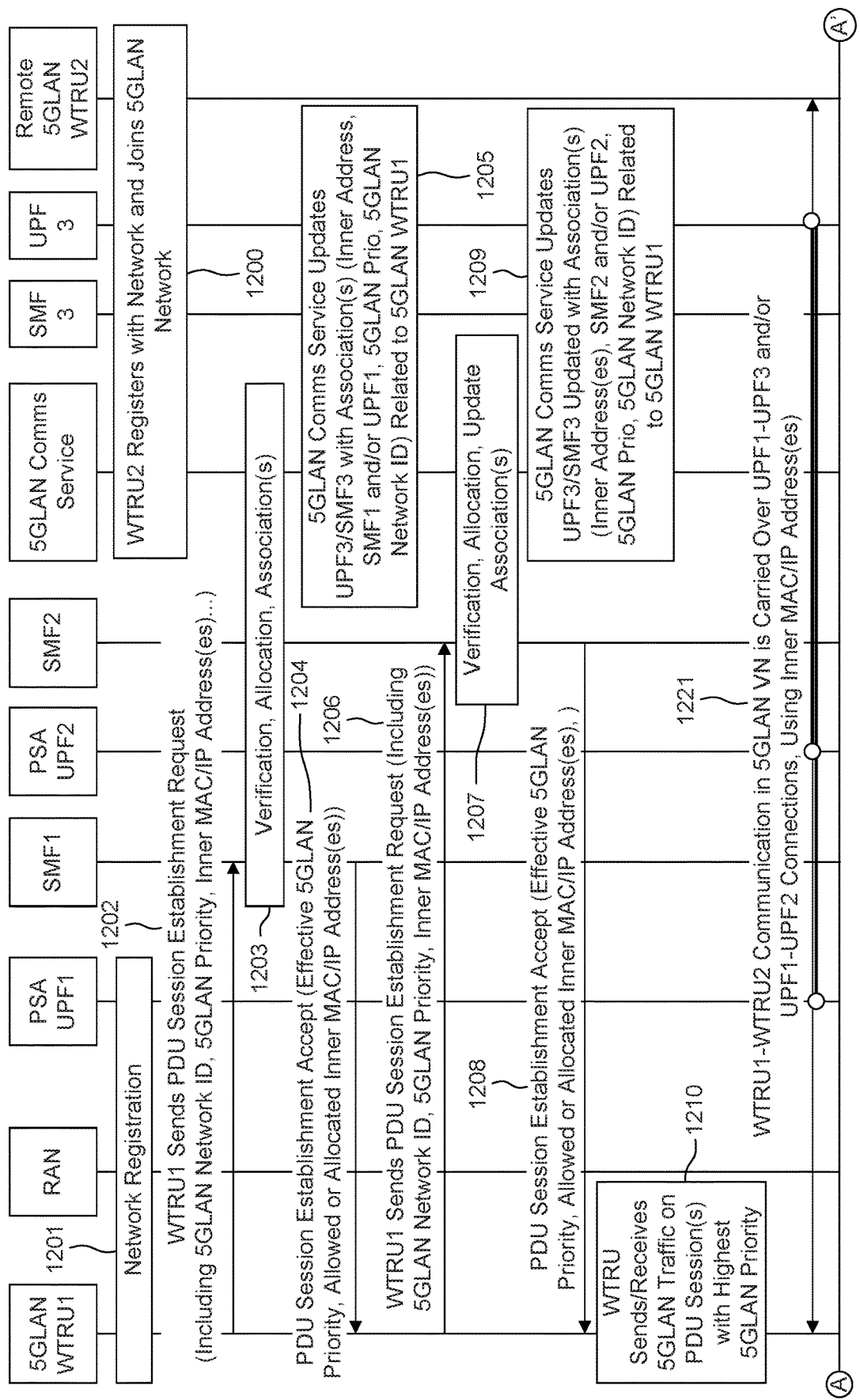
FIG. 12 shows an example flow diagram for active-active and active standby 5GLAN connection support.
Figure 12:
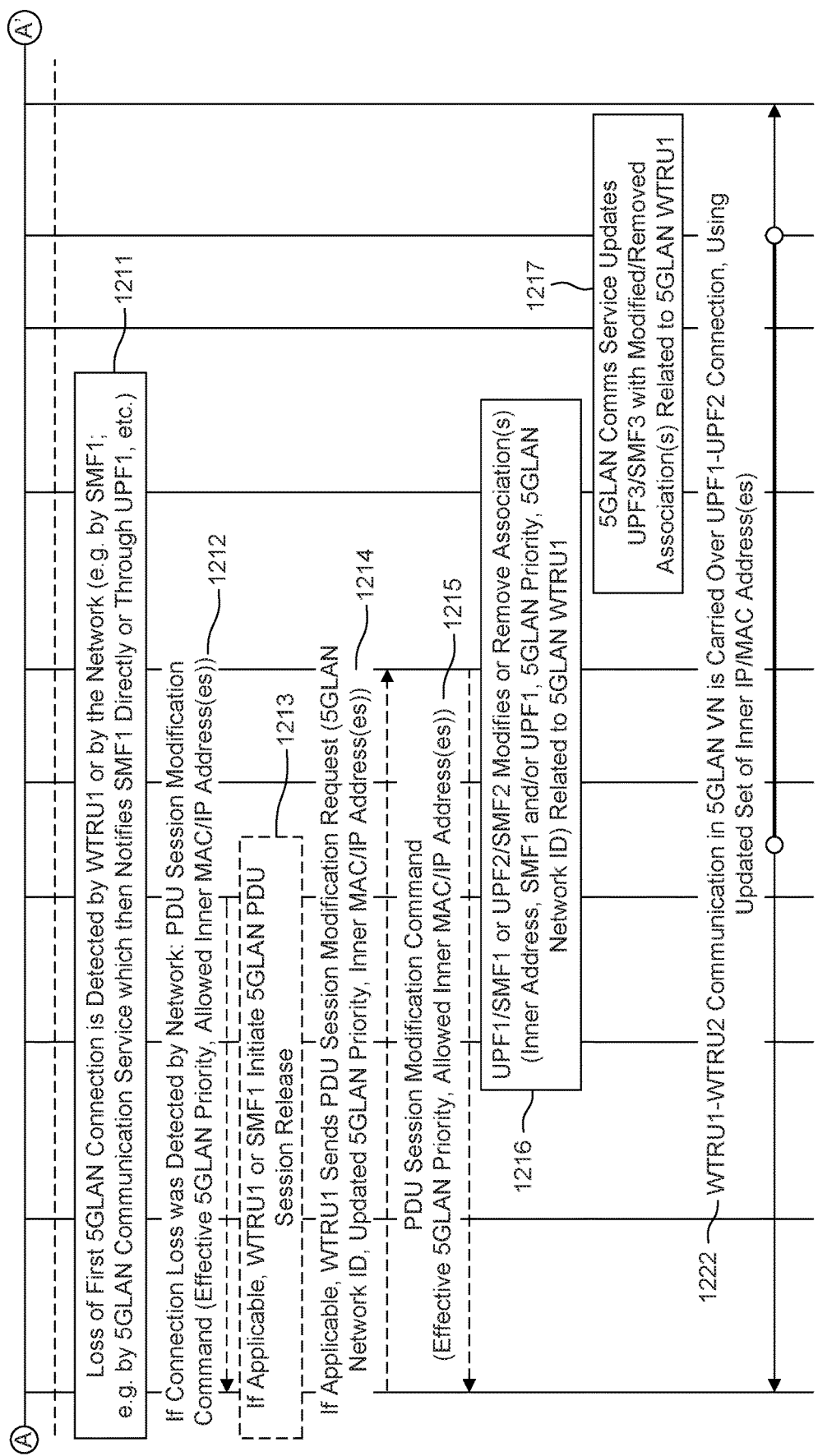

FIG. 12 describes how a WTRU joins a 5GLAN network over two PDU sessions through different PSA UPFs (e.g., PSA UPF1 and PSA UPF2), in an active-active or active-standby configuration. At some point a connection is lost, and the remaining PDU session enables continuity of the 5GLAN connection.

At 1200, WTRU2 may register with the 5G network and join a 5GLAN virtual network (e.g. using a mechanism such as described below for WTRU1). Then, at 1201, WTRU1 may register with the 5G network. Then, at 1202, WTRU1 may send a PDU session establishment request message including a 5GLAN network ID/name, a 5GLAN connection priority, e.g. with a value of 10, and inner MAC/IP address(es). Upon reception of the message, at 1203, SMF1 may request verification/allocation from the 5GLAN communication service and then register association tuples (e.g., the inner MAC/IP address(es), SMF1 and/or UPF1, the 5GLAN communication priority, the 5GLAN network ID/name) with this service. SMF1 and/or the 5GLAN communication service may adjust the 5GLAN connection priority value (e.g. to keep it between a given validity range, to enforce same or different priorities for redundant connections, etc.).

At 1204, SMF1 may send a PDU session establishment accept message including the effective 5GLAN connection priority and a list of allowed/allocated inner MAC/IP address(es). That is, at 1204, WTRU1 may receive the PDU session establishment accept message. Then, at 1205, the 5GLAN communication service may update UPF3/SMF3 with the new association tuples. That is, the new association tuples are now available at the 5GLAN communication service and may be requested by and/or sent to any UPFs/SMFs participating to the 5GLAN network.

Based on application request (through API) and/or local policy and/or network registration accept information element and/or PDU session accept IE(s), WTRU1 may decide to open a second channel of communication for some of its inner addresses in this 5GLAN. WTRU1 may connect to the same 5GLAN by sending a PDU session request with a 5GLAN network ID and a priority e.g. 10 (for active-active) or 5 (for active-standby). The processes at 1206-1209 are similar to the ones at 1202-1205 described above but substituting UPF1/SMF1 with UPF2/SMF2, using either the same or a different 5GLAN connection priority, and using at least some inner addresses which are the same as above. WTRU1 is therefore creating a redundant 5GLAN connection for at least one inner address.

From this point on, at 1210, WTRU1 may send/receive 5GLAN traffic on PDU session(s) with highest 5GLAN priority. In an active-passive configuration (e.g. WTRU1 used priority 5 at the process at 1206), WTRU1 may send traffic through UPF1 as long as the first PDU session is active. In case of an active-active configuration (e.g. WTRU1 used priority 10 at the process at 1206), WTRU1 may use a load balancing algorithm to distributed sent traffic, e.g. on a per-packet or per-flow basis. A 5GLAN endpoint may therefore send/receive traffic using a given inner address, over one or more PDU sessions. For example, a logical network interface may be set on the WTRU1, and traffic sent through this interface may be multiplexed over one or more PDU session, depending on the priorities of these PDU sessions. WTRU1 may use MPTCP to load balance TCP traffic over an active-active 5GLAN connection or use active and standby MPTCP subflows to properly use an active-standby 5GLAN connection. The WTRU may interwork with its local implementation of MPTCP to identify individual subflows to/from the same inner IP address (e.g. using TCP ports). A this point, as shown at 1221, WTRU1-WTRU2 communication in 5GLAN VN may be carried over UPF1-UPF3 and/or UPF1-UPF2 connection(s), using inner MAC/IP address(es).

Then, at 1211, loss of first 5GLAN connection may be detected by WTRU1 or by the network (e.g. by SMF1; e.g. by 5GLAN communication service which then notifies SMF1 directly or through UPF1, etc.). If the connection loss or degradation was detected by the network, SMF1 may either trigger modify the first PDU session to lower its 5GLAN connection priority (step 12), or trigger the release of the first PDU session, e.g. if its sole purpose was for the 5GLAN communication link that was disrupted.

After detecting the 5GLAN connectivity loss/degradation, then at 1212, SMF1 may send a PDU session modification command setting the effective 5GLAN priority to a lower value, e.g. 0, on the first PDU session. After detecting the 5GLAN connectivity loss, then at 1213, SMF1 may send a PDU session release command to release the first PDU session. If a connection loss or degradation was detected by WTRU1 (e.g. RAN connectivity degradation or loss), WTRU1 may modify the second PDU session to increase its priority above 10, which ensures that traffic from WTRU1 and from all other WTRUs in the 5GLAN network will be sent over the second PDU session.

The, at 1214, WTRU1 may send towards SMF2 a PDU session modification request including an updated value for 5GLAN communication connectivity, e.g. 15. Then, at 1215, SMF2 may send a PDU Session modification command confirming the effective new priority. Whether connection loss/degradation was detected by the network or WTRU1, at 1216, UPF1/SMF1 or UPF2/SMF2 are at this point aware that a 5GLAN communication priority (in first or second PDU session) changed, or that the first PDU session was released. Therefore, UPF1/SMF1 or UPF2/SMF2 communicate either updated or removed association tuples to the 5GLAN Communication Service.

Then, at 1217, the 5GLAN communication service may update UPF3/SMF3 with modified/removed association tuples. That is, the updated set of association tuples are now available at the 5GLAN communication service and may be requested by and/or sent to any UPFs/SMFs participating to the 5GLAN network. From this point on, as shown at 1222, 5GLAN communication traffic between WTRU1 and other WTRUs members of the 5GLAN is enabled over the $2^{nd}$ PDU session.

A detailed solution including a datacenter is discussed as follows with reference to FIG. 13. FIG. 13 describes the procedure enabling an end-to-end redundant path between a WTRU and a datacenter server or another WTRU, over a datacenter virtual network. It is based on the reference system described prior.

In this procedure, the term 5GLAN/TSI priority is used to indicate that the same priority value can be designated as "5GLAN priority" in the 5GLAN context, and "TSI priority" in the VN context. A 5GLAN/TSI priority value may be associated with a given TSI ID, or alternatively with multiple TSI IDs (e.g. all TSI IDs carried over a PDU session). In a simple case, a single TSI ID, a TSI state and a priority will be associated to the PDU session, nevertheless, it is possible that multiple TSI IDs, TIS states and priorities IEs may be associated with a PDU session (e.g. if the WTRU hosts multiple VMs connecting at the same time to the same 5GLAN/VN).

The twenty-one processes associated with FIG. 13 are described directly below.

At 1301, remote endpoint 1 may connect a TSI to VN. Redundant NVEs may or may not be used (i.e. remote endpoint 1 may or may not use the mechanism used by the WTRU in this procedure).

At 1302, a WTRU-hosted VM is started in running state.

At 1303-1307, the WTRU may trigger the creation of a PDU session for connectivity over a 5GLAN group/network interconnected with a VN, as described in FIG. 9. The PDU session is terminated at PSA UPF1.

Additionally, a requested 5GLAN/TSI priority (e.g. a priority associated to each TSI ID, or a single priority for multiple TSI IDs) may be present in PDU session establishment request and N4 session establishment request. Effective 5GLAN/TSI priority(ies) may be present in response messages, to confirm which priority(ies) have been applied.

A 5GLAN/TSI priority may be included with each mapping tuple corresponding to its TSI ID, which is deployed in the VN. For example, this makes it possible for NVEs to set a corresponding priority to the applied traffic filters.

At 1308-1312, the WTRU may trigger the creation of a PDU session for connectivity over a 5GLAN group/network interconnected with a VN, as shown in the processes at 1303-1307. The PDU session is terminated at PSA UPF2. A same or different 5GLAN/TSI priority may be used.

At 1313, the WTRU may send/receive 5GLAN traffic on PDU session with highest 5GLAN priority or can split traffic between PDU sessions if a same priority was used.

As shown at 1331, UE-remote endpoint 1 communication over 5GLAN and VN is carried through PSA1 and/or PSA2, using inner MAC/IP address(es).

At 1314, following a communication failure, TSI ID1 may be not connected to PSA UPF1 any longer (e.g. PDU session is released or modified by network to have a lower priority). The following steps may occur as part of the release or modification procedure.

At 1315, SMF may send a N4 session modification or release request to PSA UPF1, including the affected TSI ID(s) and if applicable (e.g. in modification message) its related TSI state(s), e.g. set to "associated" or "disassociated".

At 1316, PSA1 may sends one or more TSI_Deactivate to NVE1, including the TSI ID(s). In some cases, e.g. if SMF sent a N4 session release request message, PSA UPF1 may instead send a VN_Disconnect message, which implicitly also deactivate any activated TSI ID associated with the connection.

At 1317, NVE1 may disable traffic filters related to TSI(s), notifies NVA. Related mapping(s) and traffic filters may be removed from network nodes. NVE1 may start buffering downlink (in-flight) traffic. Since there is another downlink path to same TSI/address (e.g. known through mapping tuples deployed on NVE1 in step 5), NVE1 may forwards downlink traffic to NVE2.

At 1318, NVE1 may send a TSI_Deactivate response to PSA UPF1.

At 1319, if applicable (e.g. the PDU session is released), PSA UPF1 may send additional messages to NVE, e.g. TSI_Deassociate and possibly VN_Disconnect.

At 1320, PSA UPF1 may send N4 session modification or release response to SMF.

At 1321, the SMF may then complete the PDU session modification or release procedure.

At this point, as shown at 1332, WTRU-remote endpoint 1 communication over 5GLAN and VN may be carried over PSA2, using inner MAC/IP address(es).

The following novel mechanisms are defined to enable transferring IP/MAC addresses from a WTRU to another WTRU, and to pause a PDU session entirely or partially. These mechanisms may be used in multiple use cases, independently from each other. The mechanisms are described here in a VM migration scenarios between two WTRUs. It should be noted that in a typical example where the PDU sessions from WTRU1 and WTRU2 are within the same 5GLAN group, SMF1 and SMF2 will be the same SMF. Nevertheless, these mechanisms may also be suitable in a more general cases where an IP or MAC address on a first WTRU should be transferred to a second WTRU.

Figure 14:
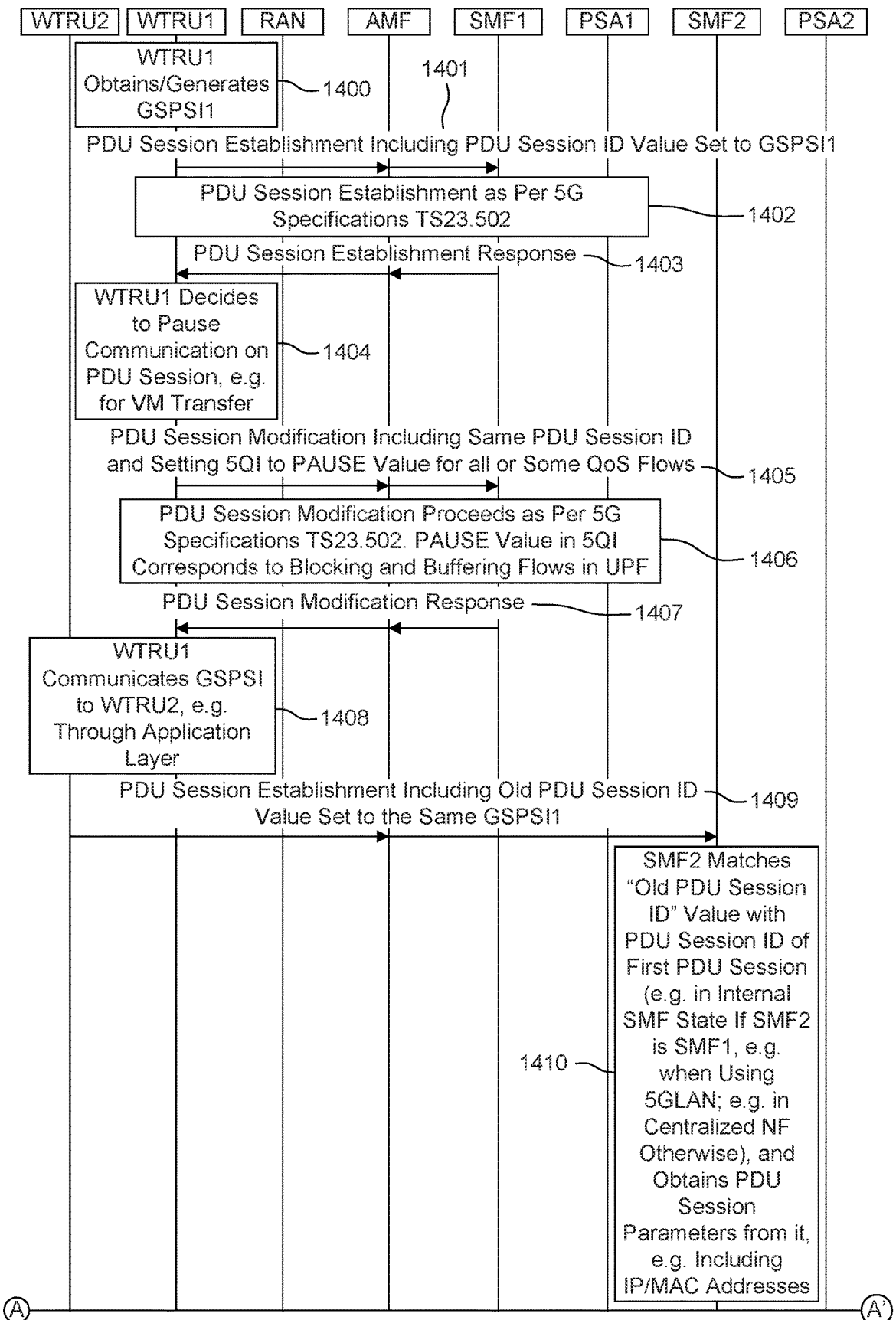
FIG. 14 shows an example flow diagram for Group-scoped PDU session ID and PAUSE 5QI mechanisms used in a VM migration scenario.
Figure 14:
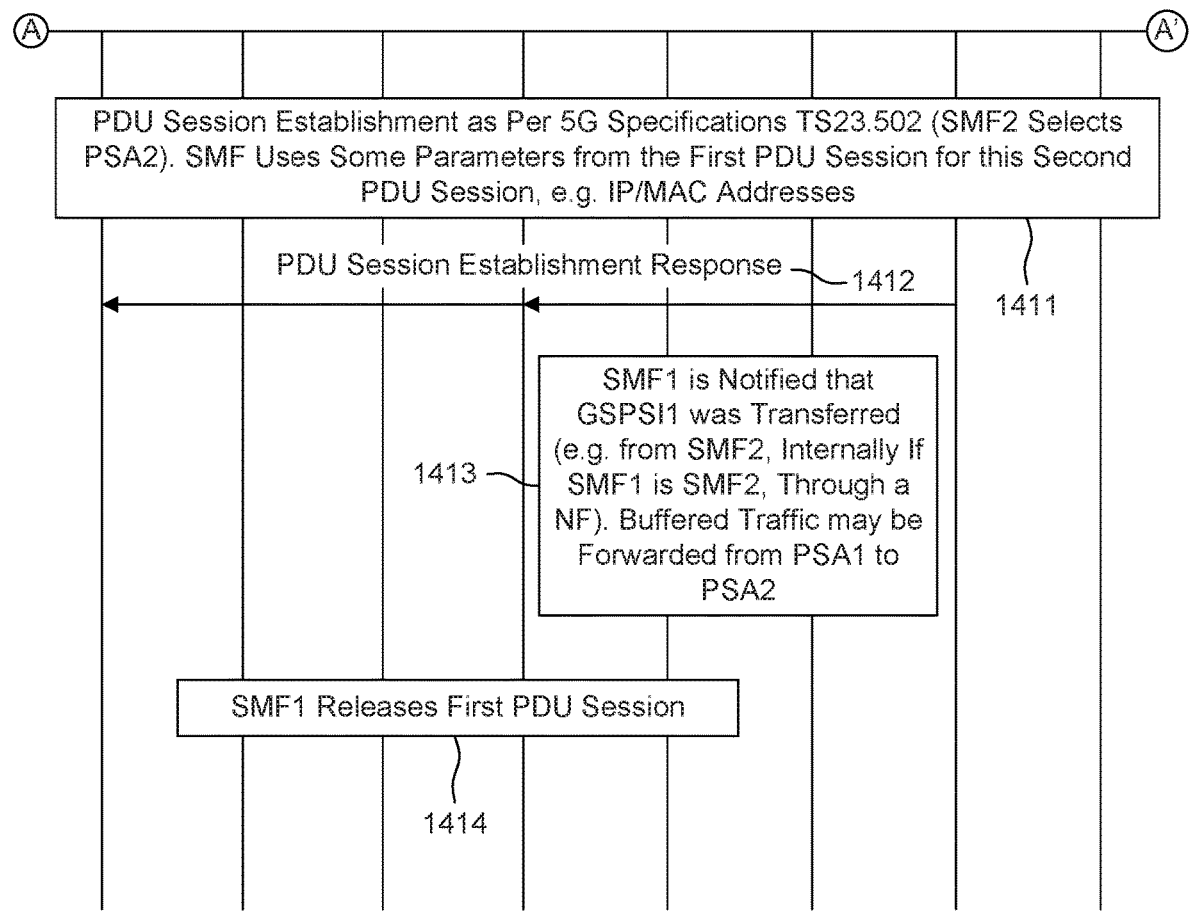

Group-scoped PDU session ID and PAUSE 5QI mechanisms may be used in a VM migration scenario. FIG. 14 shows an example flow diagram of Group-scoped PDU session ID and PAUSE 5QI mechanisms used in a VM migration scenario. The Group-scoped PDU session ID and the PAUSE 5QI (e.g., PAUSE 5QI values) may also be used to convey states between WTRUs in order to set or change TSI states.

At 1400-1401, WTRU1 may obtain/generate a PDU session ID using a novel method, and then, WTRU1 may send a PDU Session establishment message using the PDU session ID. This PDU session ID may be a "group-scoped PDU session ID" (hereinafter GSPSI) that has the same format as a PDU session ID and may be used as a regular PDU session ID in any existing message and procedure. A GSPSI has the property to be unique within the scope of a group (e.g. a 5GLAN group; all UEs connected to given DNN; or other types of groups). For example, WTRU1 configuration and/or subscription information may include a GSPSI prefix, which is uniquely allocated, e.g. by a network operator, to the subscriber and/or WTRU for a given group. In the WTRU1 configuration and/or subscription information the GSPSI prefix may be associated with IEs (e.g. ID and type) of the group it relates to. The WTRU1 may then generate a PDU session ID by appending a suffix to the GSPSI prefix, thus ensuring that the generated PDU session ID is both unique for this WTRU1 (as usual) and across all UEs connected to this group. A WTRU may use a GSPSI obtained from a given GSPSI prefix for all PDU sessions that are related to this group (e.g. all PDU sessions related to a given 5GLAN group, or DNN). A WTRU may not reuse (e.g., for a given time) a GSPSI in cases where a migration may have occurred for a PDU session associated with this GSPSI.

At 1402-1403, the PDU session establishment may complete as usual, although additionally the SMF may verify that this GSPSI was not recently used, in which case it could reject the request.

At 1404, WTRU1 may decide to pause communication on PDU session, e.g. for VM transfer.

At 1405, WTRU1 may send a PDU Session modification including same the PDU session ID and setting 5QI to a "PAUSE" value for all or some QoS flows on this PDU session. "PAUSE" is a proposed novel standardized 5QI parameter value which would correspond to both blocking and buffering traffic towards this PDU session (e.g. downstream on UPF PSA, upstream on UE).

At 1406-1407, PDU session modification proceeds as per 5G specifications. Some or all flows on the PDU session are set to be buffered on PSA UPF and on WTRU.

At 1408, WTRU1 may communicate GSPSI to WTRU2, e.g. through application layer. For example, the GSPSI is communicated along with VM management messages between WTRU1 and WTRU2.

At 1409, WTRU2 may send a PDU Session establishment message including an "Old PDU Session ID" set to the same GSPSI1 as in the first PDU session.

At 1410, SMF2 may match the "old PDU session ID" value with the PDU session ID of first PDU session (e.g. in internal SMF state if SMF2 is SMF1, which could occur for example when using 5GLAN; e.g. in another case, using a centralized NF to perform the matching) and obtains PDU session parameters from the first PDU session, e.g. including IP/MAC addresses. First PDU session parameters may for example be obtained from internal state, or from SMF1.

At 1411-1412, PDU session establishment may proceed as usual. SMF may use some parameters from the first PDU session for this second PDU session, e.g. IP/MAC addresses.

The processes at 1413-1414 may occur before or concurrently to the processes at 1411-1412. In the processes at

1413-1414, SMF1 is notified that GSPSI1 was transferred (e.g. by message from SMF2; e.g. internally if SMF1 is SMF2; e.g. from SMF2 through another NF). SMF1 notifies PSA1 to forward buffered traffic towards PSA2. SMF1 may release the first PDU session.

In some scenarios this procedure could also be performed without the processes at 1404-1407, i.e. without pausing the PDU session. In this case, WTRU1 may continue to send/receive traffic on the first PDU session until the second PDU session is established or until the first PDU session is released.

It should be noted that while several of the figures referred to throughout this application refer to a specific sequence and number of steps, these are provided for purposes of example only. Any of these steps may be removed or reordered and still be within the scope of the described embodiments.

In an alternative or addition to solutions described above, the 5G system (e.g. SMF) may derive information elements ("VN-related IEs") that are needed to interface with the VN (e.g. TSI ID, inner IP/MAC addresses, TSI state, hot VM migration flag, TSI priority). This method makes it possible to minimize the changes to PDU session establishment/modification messages, since the VN-related IEs do not need to be explicitly carried in those messages. For example, the SMF may derive some of these VN-related IEs and provide them to PSA UPF (e.g. over N4 session create/update messages), which may use them as described above for communicating with NVE (e.g. using TSI_associate, TSI_activate, and other related messages). In this alternative embodiment, the procedures described in the FIGS. 6, 7, 9, 10, 11, 12 and 13 may be followed, with the following changes: WTRU may send PDU session establishment/modification messages not including explicit VN-related IEs, but using existing information elements (sometimes using novel techniques to generate those information elements, as described below); SMF derives the VN-related IEs by interpreting PDU session establishment/modification messages from UE in a novel context.

A mix between this alternative embodiment and the base solution is possible, e.g. SMF may derive the TSI ID and the hot migration flag, the TSI priorities, and obtain the TSI state and the inner MAC/IP addresses from explicit IEs in PDU session establishment/modification messages; or other combinations may be used.

A SMF will interpret signaling in a novel context and derive VN-related IEs when it determines that a 5GLAN group or DNN is associated with one or more VNs, e.g. as described with reference to the process at 904 in FIG. 9. For example, in an alternative embodiment of FIG. 9, WTRU may send a PDU session establishment request omitting explicit VN-related IEs (i.e. the process at 901 does not explicitly include one or more of TSI ID, TSI state and inner IP/MAC addresses); following the process at 904, SMF may know that a VN is associated with the requested 5GLAN group or DNN; SMF therefore may proceed with deriving the values of VN-related IEs not explicitly included in the PDU session establishment message, e.g. following methods described below; the procedure may then proceed as per the processes after 905 in FIG. 9, with the possible exception that at 917, the SMF may decide not to include some of the derived information elements (e.g. TSI ID, TSI states) in the PDU session establishment accept message. Alternate procedures may similarly be derived from procedures described in FIGS. 6, 7, 10, 11, 12 and 13.

A TSI ID may be derived by the SMF. The WTRU may use a GSPSI as PDU session ID, e.g. using a GSPSI prefix as described above. Upon receiving a PDU session establishment message, the SMF determines if the 5GLAN group or DNN identifier associated with the PDU session establishment request is interconnected with one or more VNs. If SMF finds an associated VN, SMF may generate a TSI ID e.g. equal to the GSPSI value or derived from it using a hash function or another transform. GSPSI prefixes may be allocated in such a way that the TSI ID space may be split in non-overlapping segments between the 5G system and the VN, therefore enabling TSI IDs to be unique among all interconnected 5GLAN members and VN members. In such an example, a TSI ID would typically be associated with a single PDU session, and all inner IP/MAC addresses carried over the PDU session may be associated with this single TSI ID.

Inner IP/MAC address(es), i.e. address(es) corresponding to a tenant system (e.g. VM) interface or 5GLAN endpoint and used for communicating with other 5GLAN and VN members, may be derived and allocated by SMF. Inner IP/MAC addresses or address ranges may be configured in subscription profiles, and/or in 5GC (e.g. SMF) configuration, in association with a specific 5GLAN group or DNN. Upon PDU session creation or update, SMF may retrieve free (e.g. not-yet allocated) inner IP/MAC address(es) from the WTRU subscription profile (e.g. obtained from UDM), or from 5GC/SMF configuration. SMF may then provide this(ese) address(es) to PSA UPF in N4 session create/update message, and to the WTRU in a PDU session establishment/modification response or IPv6 router advertisement. PSA UPF may communicate inner IP/MAC address(es) with NVE as previously described, e.g. in FIG. 9. A WTRU may configure the allocated inner IP/MAC address(es) on the tenant system interface.

When a second WTRU sends a PDU session establishment after a VM migration, as in FIGS. 10 and 11, the second WTRU should set the original or previous TSI ID (e.g. TSI ID/GSPSI used in original or previous connection prior to this VM migration) as "Old PDU session ID". The second WTRU may obtain the original/previous TSI ID/GSPSI over an out-of-band channel, e.g. through an application-layer (from 5GC standpoint) signaling channel used to operate the VM migration. Since datacenter servers and 5G WTRUs share the same TSI ID space, a TSI ID used by a datacenter server may therefore be used as Old PDU session ID, in cases where the VM migration occurred from a datacenter server to a WTRU. SMF detects a migration when the "Old PDU session ID" value is outside of the GSPSI space for this WTRU (e.g. its prefix is different from the GSPSI prefix associated with this WTRU). SMF then matches the TSI ID present in the "Old PDU session ID" field of the new connection with the TSI ID of an older connection to the 5GLAN or VN and, after determining that this is a valid VM migration (e.g. by performing checks as described below), it may proceed with a VM migration procedure, e.g. as per FIG. 10 or 11. If inner IP/MAC address(es) are not explicitly provided in a PDU session establishment message, the SMF reuse the inner IP/MAC address(es) originally used by the tenant system over the older connection (e.g. original addresses may be obtained by SMF from its own internal state or from NVA).

The TSI State may be derived by SMF. In alternative procedures based on FIGS. 7, 9, 10, 11, WTRU may set a "PAUSE" 5QI value for one or more flows on the PDU session to indicate that the TSI state associated with this PDU session is "associated" and not set a "PAUSE" 5QI to indicate that the TSI state is "activated". Upon reception of a PDU session establishment/modification message, and if the PDU session 5GLAN group or DNN is associated with a VN, SMF derives the TSI state value from the presence of a "PAUSE" QCI value. SMF may set the TSI state value in N4 session create/update message to PSA UPF, which the PSA UPF may use to communicate with NVE, e.g. as previously described in FIGS. 10 and 11.

A hot migration flag may be derived by SMF. When receiving a PDU session establishment request for a 5GLAN, SMF may determine that the TSI ID associated with the new ("destination") PDU session is the same as the TSI ID associated with an older ("source") PDU session, using one of the previously described method (e.g. using explicit TSI ID IE or deriving TSI ID from GSPSI in Old PDU session ID IE). SMF may further obtain the source WTRU ID if the source is a WTRU (e.g. using GSPSI). SMF may perform checks including one or more of the following: verify that source and/or destination WTRU IDs are in a list of authorized WTRUs for VM transfer (such list may be located in SMF configuration, and associated with a 5GLAN group ID or DNN); verify that VM migration is allowed for the 5GLAN group or DNN (e.g. in SMF configuration); verify that the subscription profiles associated with the source and/or destination WTRUs indicate that VM migration is allowed; verify that the source VM is in paused state. If a matching TSI ID is found and verifications were positive, SMF may set a hot migration flag in N4 session create/update message to PSA UPF, which the PSA UPF may use to communicate with NVE as previously described in FIGS. 10 and 11.

5GLAN/TSI priority may be derived by SMF. 5GLAN/TSI priority values may be associated with certain parameters such as radio access technology and/or order of PDU session creation, and such values may be configured in a subscription profile (e.g. stored on UDM) and/or 5GC (e.g. SMF) configuration. The SMF may retrieve 5GLAN/TSI priority values from the subscription profile associated with a WTRU and/or from 5GC/SMF configuration and apply the appropriate priority to a new PDU session (e.g. based on the radio access technology used for the PDU session; e.g. based on the creation order of the PDU session; e.g. based on parameters of the PDU session). SMF provides the priority to PSA UPF e.g. in N4 session create/modify message. PSA UPF may then communicate it to NVE as previously described in FIG. 13.

Procedures are described herein to provide an interconnection between a 5G device and an external VN, through a 5GLAN PDU session. Procedures may be derived, e.g. from FIG. 9, to support cases where a 5G device is interconnected with an external physical LAN through a gateway, e.g. over a tunneled connection between PSA UPF and the gateway. In this case the PSA UPF may exchange messages with the gateway instead of NVE, in order to enable data traffic to be forwarded between the physical LAN and the 5G devices members of a 5GLAN group.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of supporting virtual machine (VM) migration between a first wireless transmit/receive unit (WTRU) and a second WTRU via a 5GLAN, wherein the first WTRU is a host of a VM and the second WTRU connects to the 5GLAN, the method comprising the second WTRU:
   receiving the VM migrated from the first WTRU, wherein a tenant system interface (TSI) ID is associated with the VM;
   sending a PDU session request message to a network node of the 5GLAN, the PDU session request message comprising the TSI ID, a WTRU ID, a 5GLAN network ID, an inner address, a hot migration flag, and a TSI state; and
   receiving a PDU session response message from the network node, wherein the PDU session response message includes an indication of an establishment of a PDU session, for use by the VM, between the second WTRU and the 5GLAN and includes the TSI ID, the WTRU ID, the 5GLAN network ID, the inner address the hot migration flag, and the TSI state.

2. The method of claim 1, wherein the TSI ID is a unique ID across the 5GLAN.

3. The method of claim 1, wherein the TSI ID is a group-scoped PDU session ID (GSPSI).

4. The method of claim 1, wherein the TSI ID is a PDU session ID.

5. The method of claim 1, wherein the TSI state enables traffic to or from the VM.

6. A wireless transmit/receive unit (WTRU) configured to connect to a 5GLAN, the WTRU comprising:
   a receiver configured to receive a VM migrated from a first WTRU, wherein a tenant system interface (TSI) ID is associated with the VM; and
   a transmitter configured to send a PDU session request message to a network node of the 5GLAN, the PDU session request message comprising the TSI ID, a WTRU ID, a 5GLAN network ID, an inner address, a hot migration flag, and a TSI state;
   the receiver further configured to receive a PDU session response message from the network node, wherein the PDU session response message includes an establishment of a PDU session, for use by the VM, between the WTRU and the 5GLAN and includes the TSI ID, the WTRU ID, the 5GLAN ID, the inner address, the hot migration flag, and the TSI state.

7. The WTRU of claim 6, wherein the TSI ID is a unique ID across the 5GLAN.

8. The WTRU of claim 6, wherein the TSI ID is a group-scoped PDU session ID (GSPSI).

9. The WTRU of claim 6, wherein the TSI state te enables traffic to or from the VM.

* * * * *